US006420331B1

(12) United States Patent
Bettiol et al.

(10) Patent No.: US 6,420,331 B1
(45) Date of Patent: Jul. 16, 2002

(54) DETERGENT COMPOSITIONS COMPRISING A MANNANASE AND A BLEACH SYSTEM

(75) Inventors: Jean-Luc Philippe Bettiol, Brussels (BE); Michael Stanford Showell, Cincinnati, OH (US); André Cesar Baeck, Bonheiden (BE); Christiaan Arthur Jacques Kamiel Thoen, West Chester, OH (US)

(73) Assignee: Procter & Gamble Company, Cincinnati, OH (US)

(*) Notice: Subject to any disclaimer, the term of this patent is extended or adjusted under 35 U.S.C. 154(b) by 0 days.

(21) Appl. No.: 09/503,565

(22) Filed: Feb. 14, 2000

Related U.S. Application Data

(63) Continuation-in-part of application No. PCT/US98/12023, filed on Jun. 10, 1998, now abandoned, and a continuation-in-part of application No. PCT/US98/12024, filed on Jun. 10, 1998, now abandoned.

(51) Int. Cl.[7] .............................. C11D 3/00; C11D 7/42; C12S 9/00

(52) U.S. Cl. ....................... 510/392; 510/392; 510/305; 510/320; 510/137; 510/312; 510/530

(58) Field of Search ................................ 510/305, 392, 510/137, 530, 312, 320

(56) References Cited

U.S. PATENT DOCUMENTS

| | | | | |
|---|---|---|---|---|
| 3,929,678 A | | 12/1975 | Laughlin et al. | 252/526 |
| 4,228,044 A | | 10/1980 | Cambre | 252/547 |
| 4,412,934 A | | 11/1983 | Chung et al. | 252/186.38 |
| 4,483,781 A | | 11/1984 | Hartman | 252/714.12 |
| 4,565,647 A | | 1/1986 | Lienado | 252/354 |
| 4,634,551 A | | 1/1987 | Burns et al. | 252/102 |
| 5,478,489 A | | 12/1995 | Fredj et al. | 252/99 |
| 5,523,434 A | * | 6/1996 | Burns et al. | 510/530 |
| 5,565,145 A | | 10/1996 | Watson et al. | 510/350 |
| 5,569,645 A | | 10/1996 | Dinniwell et al. | 510/350 |
| 5,574,005 A | | 11/1996 | Welch et al. | 510/444 |
| 5,679,630 A | | 10/1997 | Baeck et al. | 510/305 |
| 5,691,297 A | | 11/1997 | Nassano et al. | 510/444 |
| 5,998,350 A | * | 12/1999 | Burns et al. | 510/530 |
| 6,060,299 A | * | 5/2000 | Sreekrishna | 510/530 |

FOREIGN PATENT DOCUMENTS

| | | | | |
|---|---|---|---|---|
| EP | 0 133354 | | 1/1989 | A61K/7/30 |
| EP | WO 94/25576 | * | 11/1994 | 510/530 |
| JP | 63036775 | | 2/1988 | C12N/1/20 |
| JP | 63056289 | | 3/1988 | C12N/9/42 |
| JP | 03047076 | | 2/1991 | C12N/9/42 |
| JP | 08051975 | | 2/1996 | C12N/1/20 |
| WO | WO 91/18974 | | 12/1991 | C12N/9/00 |
| WO | WO 93/24622 | | 12/1993 | C12N/9/42 |
| WO | WO 94/25576 | | 11/1994 | C12N/9/18 |
| WO | WO 95/17495 | | 6/1995 | C12D/3/386 |
| WO | WO 97/11164 | | 3/1997 | C12N/9/42 |
| WO | WO 97/35591 | | 10/1997 | A61K/31/70 |
| WO | WO 97/35806 | | 10/1997 | C01B/15/10 |

OTHER PUBLICATIONS

Mendoza et al., "Purification and Properties of Mannanase from *Bacillus subtilis*", World J. Microbio. Biotech, vol. 10, No. 5, pp. 551–555 (1994).

Talbot et al., "Purification and Characterization of Thermostable β–Mannanase and α–Galactosidase from *Bacillus stearothermophilus*", Appl. Environ. Microbiol., vol. 56, No. 11, pp. 3505–3510 (Nov 1990).

* cited by examiner

*Primary Examiner*—Yogendra N. Gupta
*Assistant Examiner*—Eisa Elhilo
(74) *Attorney, Agent, or Firm*—C. Brant Cook; K. W. Zerby; Steve W. Miller

(57) ABSTRACT

The present invention relates to detergent compositions comprising a mannasase enzyme and a bleach system preferably comprising a source of hydrogen peroxide and optionally, but preferably, a hydrophobic bleach activator for superior cleaning, stain removal and/or whiteness performance.

17 Claims, No Drawings

SEQUENCE LISTING

```
<160> NUMBER OF SEQ ID NOS: 6

<210> SEQ ID NO 1
<211> LENGTH: 1482
<212> TYPE: DNA
<213> ORGANISM: Bacillus sp.
```

-continued

<400> SEQUENCE: 1

```
atgaaaaaaa agttatcaca gatttatcat ttaattattt gcacacttat aataagtgtg     60
ggaataatgg ggattacaac gtccccatca gcagcaagta caggctttta tgttgatggc    120
aatacgttat atgacgcaaa tgggcagcca tttgtcatga gaggtattaa ccatggacat    180
gcttggtata aagacaccgc ttcaacagct attcctgcca ttgcagagca aggcgccaac    240
acgattcgta ttgttttatc agatggcggt caatgggaaa aagacgacat tgacaccatt    300
cgtgaagtca ttgagcttgc ggagcaaaat aaaatggtgg ctgtcgttga agttcatgat    360
gccacgggtc gcgattcgcg cagtgattta aatcgagccg ttgattattg gatagaaatg    420
aaagatgcgc ttatcggtaa agaagatacg gttattatta acattgcaaa cgagtggtat    480
gggagttggg atggctcagc ttgggccgat ggctatattg atgtcattcc gaagcttcgc    540
gatgccggct taacacacac cttaatggtt gatgcagcag gatgggggca atatccgcaa    600
tctattcatg attacggaca agatgtgttt aatgcagatc cgttaaaaaa tacgatgttc    660
tccatccata tgtatgagta tgctggtggt gatgctaaca ctgttagatc aaatattgat    720
agagtcatag atcaagacct tgctctcgta ataggtgaat tcggtcatag acatactgat    780
ggtgatgttg atgaagatac aatccttagt tattctgaag aaactggcac agggtggctc    840
gcttggtctt ggaaaggcaa cagtaccgaa tgggactatt tagacctttc agaagactgg    900
gctggtcaac atttaactga ttgggggaat agaattgtcc acggggccga tggcttacag    960
gaaacctcca aaccatccac cgtatttaca gatgataacg gtggtcaccc tgaaccgcca   1020
actgctacta ccttgtatga ctttgaagga agcacacaag ggtggcatgg aagcaacgtg   1080
accggtggcc cttggtccgt aacagaatgg ggtgcttcag gtaactactc tttaaaagcc   1140
gatgtaaatt taacctcaaa ttcttcacat gaactgtata gtgaacaaag tcgtaatcta   1200
cacggatact ctcagctcaa cgcaaccgtt cgccatgcca attggggaaa tcccggtaat   1260
ggcatgaatg caagacttta cgtgaaaacg ggctctgatt atacatggca tagcggtcct   1320
tttacacgta tcaatagctc caactcagga acaacgttat cttttgattt aaacaacatc   1380
gaaaatagtc atcatgttag ggaaataggc gtgcaatttt cagcggcaga taatagcagt   1440
ggtcaaactg ctctatacgt tgataacgtt actttaagat ag                      1482
```

<210> SEQ ID NO 2
<211> LENGTH: 493
<212> TYPE: PRT
<213> ORGANISM: Bacillus sp.

<400> SEQUENCE: 2

```
Met Lys Lys Lys Leu Ser Gln Ile Tyr His Leu Ile Ile Cys Thr Leu
  1               5                  10                  15

Ile Ile Ser Val Gly Ile Met Gly Ile Thr Thr Ser Pro Ser Ala Ala
             20                  25                  30

Ser Thr Gly Phe Tyr Val Asp Gly Asn Thr Leu Tyr Asp Ala Asn Gly
         35                  40                  45

Gln Pro Phe Val Met Arg Gly Ile Asn His Gly His Ala Trp Tyr Lys
     50                  55                  60

Asp Thr Ala Ser Thr Ala Ile Pro Ala Ile Ala Glu Gln Gly Ala Asn
 65                  70                  75                  80

Thr Ile Arg Ile Val Leu Ser Asp Gly Gly Gln Trp Glu Lys Asp Asp
                 85                  90                  95
```

-continued

```
Ile Asp Thr Ile Arg Glu Val Ile Glu Leu Ala Glu Gln Asn Lys Met
            100                 105                 110

Val Ala Val Val Glu Val His Asp Ala Thr Gly Arg Asp Ser Arg Ser
        115                 120                 125

Asp Leu Asn Arg Ala Val Asp Tyr Trp Ile Glu Met Lys Asp Ala Leu
    130                 135                 140

Ile Gly Lys Glu Asp Thr Val Ile Ile Asn Ile Ala Asn Glu Trp Tyr
145                 150                 155                 160

Gly Ser Trp Asp Gly Ser Ala Trp Ala Asp Gly Tyr Ile Asp Val Ile
                165                 170                 175

Pro Lys Leu Arg Asp Ala Gly Leu Thr His Thr Leu Met Val Asp Ala
            180                 185                 190

Ala Gly Trp Gly Gln Tyr Pro Gln Ser Ile His Asp Tyr Gly Gln Asp
        195                 200                 205

Val Phe Asn Ala Asp Pro Leu Lys Asn Thr Met Phe Ser Ile His Met
    210                 215                 220

Tyr Glu Tyr Ala Gly Gly Asp Ala Asn Thr Val Arg Ser Asn Ile Asp
225                 230                 235                 240

Arg Val Ile Asp Gln Asp Leu Ala Leu Val Ile Gly Glu Phe Gly His
                245                 250                 255

Arg His Thr Asp Gly Asp Val Asp Glu Asp Thr Ile Leu Ser Tyr Ser
            260                 265                 270

Glu Glu Thr Gly Thr Gly Trp Leu Ala Trp Ser Trp Lys Gly Asn Ser
        275                 280                 285

Thr Glu Trp Asp Tyr Leu Asp Leu Ser Glu Asp Trp Ala Gly Gln His
    290                 295                 300

Leu Thr Asp Trp Gly Asn Arg Ile Val His Gly Ala Asp Gly Leu Gln
305                 310                 315                 320

Glu Thr Ser Lys Pro Ser Thr Val Phe Thr Asp Asp Asn Gly Gly His
                325                 330                 335

Pro Glu Pro Pro Thr Ala Thr Thr Leu Tyr Asp Phe Glu Gly Ser Thr
            340                 345                 350

Gln Gly Trp His Gly Ser Asn Val Thr Gly Gly Pro Trp Ser Val Thr
        355                 360                 365

Glu Trp Gly Ala Ser Gly Asn Tyr Ser Leu Lys Ala Asp Val Asn Leu
    370                 375                 380

Thr Ser Asn Ser Ser His Glu Leu Tyr Ser Glu Gln Ser Arg Asn Leu
385                 390                 395                 400

His Gly Tyr Ser Gln Leu Asn Ala Thr Val Arg His Ala Asn Trp Gly
                405                 410                 415

Asn Pro Gly Asn Gly Met Asn Ala Arg Leu Tyr Val Lys Thr Gly Ser
            420                 425                 430

Asp Tyr Thr Trp His Ser Gly Pro Phe Thr Arg Ile Asn Ser Ser Asn
        435                 440                 445

Ser Gly Thr Thr Leu Ser Phe Asp Leu Asn Asn Ile Glu Asn Ser His
    450                 455                 460

His Val Arg Glu Ile Gly Val Gln Phe Ser Ala Ala Asp Asn Ser Ser
465                 470                 475                 480

Gly Gln Thr Ala Leu Tyr Val Asp Asn Val Thr Leu Arg
                485                 490
```

-continued

<210> SEQ ID NO 3
<211> LENGTH: 1407
<212> TYPE: DNA
<213> ORGANISM: Bacillus sp.

<400> SEQUENCE: 3

```
atgaaaaaaa agttatcaca gatttatcat ttaattattt gcacacttat aataagtgtg     60

ggaataatgg ggattacaac gtccccatca gcagcaagta caggctttta tgttgatggc    120

aatacgttat atgacgcaaa tgggcagcca tttgtcatga gaggtattaa ccatggacat    180

gcttggtata aagacaccgc ttcaacagct attcctgcca ttgcagagca aggcgccaac    240

acgattcgta ttgttttatc agatggcggt caatgggaaa aagacgacat tgacaccatt    300

cgtgaagtca ttgagcttgc ggagcaaaat aaaatggtgg ctgtcgttga agttcatgat    360

gccacgggtc gcgattcgcg cagtgattta aatcgagccg ttgattattg gatagaaatg    420

aaagatgcgc ttatcggtaa agaagatacg gttattatta acattgcaaa cgagtggtat    480

gggagttggg atggctcagc ttgggccgat ggctatattg atgtcattcc gaagcttcgc    540

gatgccggct taacacacac cttaatggtt gatgcagcag gatgggggca atatccgcaa    600

tctattcatg attacggaca agatgtgttt aatgcagatc cgttaaaaaa tacgatgttc    660

tccatccata tgtatgagta tgctggtggt gatgctaaca ctgttagatc aaatattgat    720

agagtcatag atcaagacct tgctctcgta ataggtgaat tcggtcatag acatactgat    780

ggtgatgttg atgaagatac aatccttagt tattctgaag aaactggcac agggtggctc    840

gcttggtctt ggaaaggcaa cagtaccgaa tgggactatt tagacctttc agaagactgg    900

gctggtcaac atttaactga ttgggggaat agaattgtcc acggggccga tggcttacag    960

gaaacctcca aaccatccac cgtatttaca gatgataacg gtggtcaccc tgaaccgcca   1020

actgctacta ccttgtatga ctttgaagga agcacacaag ggtggcatgg aagcaacgtg   1080

accggtggcc cttggtccgt aacagaatgg ggtgcttcag gtaactactc tttaaaagcc   1140

gatgtaaatt taacctcaaa ttcttcacat gaactgtata gtgaacaaag tcgtaatcta   1200

cacggatact ctcagctcaa cgcaaccgtt cgccatgcca attggggaaa tcccggtaat   1260

ggcatgaatg caagacttta cgtgaaaacg ggctctgatt atacatggca tagcggtcct   1320

tttacacgta tcaatagctc caactcagga acaacgttat cttttgattt aaacaacatc   1380

gaaaatatca tcatgttagg gaaatag                                       1407
```

<210> SEQ ID NO 4
<211> LENGTH: 468
<212> TYPE: PRT
<213> ORGANISM: Bacillus sp.

<400> SEQUENCE: 4

```
Met Lys Lys Lys Leu Ser Gln Ile Tyr His Leu Ile Ile Cys Thr Leu
  1               5                  10                  15

Ile Ile Ser Val Gly Ile Met Gly Ile Thr Thr Ser Pro Ser Ala Ala
             20                  25                  30

Ser Thr Gly Phe Tyr Val Asp Gly Asn Thr Leu Tyr Asp Ala Asn Gly
         35                  40                  45

Gln Pro Phe Val Met Arg Gly Ile Asn His Gly His Ala Trp Tyr Lys
     50                  55                  60

Asp Thr Ala Ser Thr Ala Ile Pro Ala Ile Ala Glu Gln Gly Ala Asn
 65                  70                  75                  80
```

-continued

```
Thr Ile Arg Ile Val Leu Ser Asp Gly Gly Gln Trp Glu Lys Asp Asp
                85                  90                  95

Ile Asp Thr Ile Arg Glu Val Ile Glu Leu Ala Glu Gln Asn Lys Met
            100                 105                 110

Val Ala Val Val Glu Val His Asp Ala Thr Gly Arg Asp Ser Arg Ser
        115                 120                 125

Asp Leu Asn Arg Ala Val Asp Tyr Trp Ile Glu Met Lys Asp Ala Leu
    130                 135                 140

Ile Gly Lys Glu Asp Thr Val Ile Ile Asn Ile Ala Asn Glu Trp Tyr
145                 150                 155                 160

Gly Ser Trp Asp Gly Ser Ala Trp Ala Asp Gly Tyr Ile Asp Val Ile
                165                 170                 175

Pro Lys Leu Arg Asp Ala Gly Leu Thr His Thr Leu Met Val Asp Ala
            180                 185                 190

Ala Gly Trp Gly Gln Tyr Pro Gln Ser Ile His Asp Tyr Gly Gln Asp
        195                 200                 205

Val Phe Asn Ala Asp Pro Leu Lys Asn Thr Met Phe Ser Ile His Met
    210                 215                 220

Tyr Glu Tyr Ala Gly Gly Asp Ala Asn Thr Val Arg Ser Asn Ile Asp
225                 230                 235                 240

Arg Val Ile Asp Gln Asp Leu Ala Leu Val Ile Gly Glu Phe Gly His
                245                 250                 255

Arg His Thr Asp Gly Asp Val Asp Glu Asp Thr Ile Leu Ser Tyr Ser
            260                 265                 270

Glu Glu Thr Gly Thr Gly Trp Leu Ala Trp Ser Trp Lys Gly Asn Ser
        275                 280                 285

Thr Glu Trp Asp Tyr Leu Asp Leu Ser Glu Asp Trp Ala Gly Gln His
    290                 295                 300

Leu Thr Asp Trp Gly Asn Arg Ile Val His Gly Ala Asp Gly Leu Gln
305                 310                 315                 320

Glu Thr Ser Lys Pro Ser Thr Val Phe Thr Asp Asp Asn Gly Gly His
                325                 330                 335

Pro Glu Pro Pro Thr Ala Thr Thr Leu Tyr Asp Phe Glu Gly Ser Thr
            340                 345                 350

Gln Gly Trp His Gly Ser Asn Val Thr Gly Gly Pro Trp Ser Val Thr
        355                 360                 365

Glu Trp Gly Ala Ser Gly Asn Tyr Ser Leu Lys Ala Asp Val Asn Leu
    370                 375                 380

Thr Ser Asn Ser Ser His Glu Leu Tyr Ser Glu Gln Ser Arg Asn Leu
385                 390                 395                 400

His Gly Tyr Ser Gln Leu Asn Ala Thr Val Arg His Ala Asn Trp Gly
                405                 410                 415

Asn Pro Gly Asn Gly Met Asn Ala Arg Leu Tyr Val Lys Thr Gly Ser
            420                 425                 430

Asp Tyr Thr Trp His Ser Gly Pro Phe Thr Arg Ile Asn Ser Ser Asn
        435                 440                 445

Ser Gly Thr Thr Leu Ser Phe Asp Leu Asn Asn Ile Glu Asn Ile Ile
    450                 455                 460

Met Leu Gly Lys
465
```

-continued

<210> SEQ ID NO 5
<211> LENGTH: 1029
<212> TYPE: DNA
<213> ORGANISM: Bacillus sp.

<400> SEQUENCE: 5

```
aattggcgca tactgtgtcg cctgtgaatc ctaatgccca gcagacaaca aaaacagtga      60

tgaactggct tgcgcacctg ccgaaccgaa cggaaaacag agtcctttcc ggagcgttcg     120

gaggttacag ccatgacaca ttttctatgg ctgaggctga tagaatccga agcgccaccg     180

ggcaatcgcc tgctatttat ggctgcgatt atgccagagg atggcttgaa acagcaaata     240

ttgaagattc aatagatgta agctgcaacg gcgatttaat gtcgtattgg aaaaatggcg     300

gaattccgca aatcagtttg cacctggcga accctgcttt tcagtcaggg cattttaaaa     360

caccgattac aaatgatcag tataaaaaca tattagattc agcaacagcg gaagggaagc     420

ggctaaatgc catgctcagc aaaattgctg acggacttca agagttggag aaccaaggtg     480

tgcctgttct gttcaggccg ctgcatgaaa tgaacggcga atggttttgg tggggactca     540

catcatataa ccaaaaggat aatgaaagaa tctctctata taaacagctc tacaagaaaa     600

tctatcatta tatgaccgac acaagaggac ttgatcattt gatttgggtt tactctcccg     660

acgccaaccg agattttaaa actgattttt acccgggcgc gtcttacgtg gatattgtcg     720

gattagatgc gtattttcaa gatgcctact cgatcaatgg atacgatcag ctaacagcgc     780

ttaataaacc atttgctttt acagaagtcg gcccgcaaac agcaaacggc agcttcgatt     840

acagcctgtt catcaatgca ataaaacaaa aatatcctaa aaccatttac tttctggcat     900

ggaatgatga atggagcgca gcagtaaaca agggtgcttc agctttatat catgacagct     960

ggacactcaa caagggagaa atatggaatg gtgattcttt aacgccaatc gttgagtgaa    1020

tccgggatc                                                            1029
```

<210> SEQ ID NO 6
<211> LENGTH: 362
<212> TYPE: PRT
<213> ORGANISM: Bacillus sp.

<400> SEQUENCE: 6

```
Leu Phe Lys Lys His Thr Ile Ser Leu Leu Ile Ile Phe Leu Leu Ala
  1               5                  10                  15

Ser Ala Val Leu Ala Lys Pro Ile Glu Ala His Thr Val Ser Pro Val
             20                  25                  30

Asn Pro Asn Ala Gln Gln Thr Thr Lys Thr Val Met Asn Trp Leu Ala
         35                  40                  45

His Leu Pro Asn Arg Thr Glu Asn Arg Val Leu Ser Gly Ala Phe Gly
     50                  55                  60

Gly Tyr Ser His Asp Thr Phe Ser Met Ala Glu Ala Asp Arg Ile Arg
 65                  70                  75                  80

Ser Ala Thr Gly Gln Ser Pro Ala Ile Tyr Gly Cys Asp Tyr Ala Arg
                 85                  90                  95

Gly Trp Leu Glu Thr Ala Asn Ile Glu Asp Ser Ile Asp Val Ser Cys
            100                 105                 110

Asn Gly Asp Leu Met Ser Tyr Trp Lys Asn Gly Gly Ile Pro Gln Ile
        115                 120                 125

Ser Leu His Leu Ala Asn Pro Ala Phe Gln Ser Gly His Phe Lys Thr
    130                 135                 140
```

-continued

```
Pro Ile Thr Asn Asp Gln Tyr Lys Asn Ile Leu Asp Ser Ala Thr Ala
145                 150                 155                 160

Glu Gly Lys Arg Leu Asn Ala Met Leu Ser Lys Ile Ala Asp Gly Leu
                165                 170                 175

Gln Glu Leu Glu Asn Gln Gly Val Pro Val Leu Phe Arg Pro Leu His
            180                 185                 190

Glu Met Asn Gly Glu Trp Phe Trp Trp Gly Leu Thr Ser Tyr Asn Gln
        195                 200                 205

Lys Asp Asn Glu Arg Ile Ser Leu Tyr Lys Gln Leu Tyr Lys Lys Ile
    210                 215                 220

Tyr His Tyr Met Thr Asp Thr Arg Gly Leu Asp His Leu Ile Trp Val
225                 230                 235                 240

Tyr Ser Pro Asp Ala Asn Arg Asp Phe Lys Thr Asp Phe Tyr Pro Gly
                245                 250                 255

Ala Ser Tyr Val Asp Ile Val Gly Leu Asp Ala Tyr Phe Gln Asp Ala
            260                 265                 270

Tyr Ser Ile Asn Gly Tyr Asp Gln Leu Thr Ala Leu Asn Lys Pro Phe
        275                 280                 285

Ala Phe Thr Glu Val Gly Pro Gln Thr Ala Asn Gly Ser Phe Asp Tyr
    290                 295                 300

Ser Leu Phe Ile Asn Ala Ile Lys Gln Lys Tyr Pro Lys Thr Ile Tyr
305                 310                 315                 320

Phe Leu Ala Trp Asn Asp Glu Trp Ser Ala Ala Val Asn Lys Gly Ala
                325                 330                 335

Ser Ala Leu Tyr His Asp Ser Trp Thr Leu Asn Lys Gly Glu Ile Trp
            340                 345                 350

Asn Gly Asp Ser Leu Thr Pro Ile Val Glu
        355                 360
```

DETERGENT COMPOSITIONS COMPRISING A MANNANASE AND A BLEACH SYSTEM

CROSS REFERENCES TO RELATED APPLICATIONS

This application is a continuation-in-part of PCT International patent application Ser. No. PCT/US98/12023 filed Jun. 10, 1998 now abandoned, and is a continuation-in-part of U.S. patent application Ser. No. PCT/US98/12024 filed Jun. 10, 1998 now abandoned.

FIELD OF THE INVENTION

The present invention relates to detergent compositions comprising a mannanase, a bleach system comprising one or more of the following components: a source of hydrogen peroxide and a hydrophobic bleach activator.

BACKGROUND OF THE INVENTION

Performance of a detergent product is judged by a number of factors, including the ability to remove soils, and the ability to prevent the redeposition of the soils, or the breakdown products of the soils on the articles in the wash. Therefore, detergent compositions include nowadays a complex combination of active ingredients which fulfil certain specific needs. In particular, current detergent formulations generally include surfactants, bleaching agents and detergent enzymes.

Indeed, bleaching systems comprising an hydrophobic bleach activator and a source of hydrogen peroxide are known in the art to provide significant whitening, cleaning and greasy stain removal benefits such as on cosmetic and food greasy stains.

Perborate is well-known in the art as a laundry or dish additive that provide available oxygen via a hydrogen peroxide release mechanism. Perborate is broadly used in laundry or dish detergent due to its high performance and its attractive cost.

However it has been recognised in the art that the side product formed during the release of hydrogen peroxide from perborate, i.e. meta borate derivatives, complex with sugar polymers such as starch and leads to cleaning negative (EP-A-736 085). It has been surprisingly found that mannose polymers such as guar gum also cross-link with perborate thereby rendering the food or cosmetic stains even harder to remove by perborate-containing detergents. It has additionally been surprisingly found that the borate cross-linking with guar gum reduces the activity of the enzyme on such gum/borate complex substrates.

Food and cosmetic stains/soils represent the majority of consumer relevant stains/soils and often comprise food additives such as thickener/stabiliser agents. Indeed, hydrocolloids gums and emulsifiers are commonly used food additives. The term "gum" denotes a group of industrially useful polysaccharides (long chain polymer) or their derivatives that hydrate in hot or cold water to from viscous solutions, dispersions or gels. Gums are classified as natural and modified. Natural gums include seaweed extracts, plant extrudates, gums from seed or root, and gums obtained by microbial fermentation. Modified (semisynthetic) gums include cellulose and starch derivatives and certain synthetic gums such as low methoxyl pectin, propylene glycol alginate, and carboxymethyl and hydropropyl guar gum (Gums in *Encyclopedia Chemical Technology* $4^{th}$ Ed. Vol. 12, pp 842–862, J. Baird, Kelco division of Merck). See also Carbohydrate Chemistry for Food Scientists (Eagan Press-1997) by R. L. Whistler and J. N. BeMiller, Chap 4, pp 63–89 and Direct Food Additives in Fruit Processing by P. Laslo, Bioprinciples and Applications, Vol 1, Chapter II, pp313–325 (1996) Technomie publishing. Some of these gums such as guar gum (E412), locust bean (E410) are widely used alone or in combinations in many food applications (Gums in *ECT* $4^{th}$ Ed., Vol. 12 pp 842–862, J. Baird, Kelco division of Merck).

The guar gum used in these food and cosmetic stains is obtained from the seed endosperm of the leguminous plant *Cyamopsis tetragonoloba*. The guar gum (also called guaran) extracted from the dicotyledonous seed is composed of a 1–4, b-D-mannopyranosyl unit backbone and is used as a thickening agent in dressing and frozen products and cosmetics (H. -D. Belitz, Food Chemistry pp 243, English version of the second edition, Springer-verlag, 1987, ISBN 0-387-15043-9 (US)) & (Carbohydrate Chemistry for Food Scientists, R. L. Wilstler, eagan press, 1997, ISBN 0-913250-92-9) & (Industrial Gum, second editions, R. L. Whistler pp 308, Academic Press, 1973, ISBN, 0-12-74-6252-x). The locus bean gum (also called carob bean gum or St Jon's bread) is also used in the food industry and is extracted from the seed of an evergreen cultivated in the Mediterranean area. The locus bean gum probably differs from the structure of guar gum only in smaller number of D-galactosyl side chains and have the same 1–4, b-D-mannopyranosyl backbone. In leguminous seeds, water-soluble galactomanann is the main storage carbohydrate, comprising up to 20% of the total dry weight in some cases. Galactomannan has a $\alpha$-galactose linked to O-6 of mannose residues and it can also be acetylated to various degree on O-2 and O-3 of the mannose residues.

It is known that these hydrocolloid gums have a very high affinity for cellulose materials and are hard to remove, even with modem bleaching agents.

As described above, there is a continuous need to formulate detergent compositions which provide superior cleaning performance, especially on cosmetic and food stains, and superior whiteness performance. This objective has been met by formulating detergent compositions comprising a mannanase and a bleaching system preferably comprising a hydrophobic bleach activator and a source of hydrogen peroxide.

Additionally, the action of percarbonate on bleacheable stains is broadly known in the art. The active ingredient released from percarbonate, i.e. $H_2O_2$, is identical to the active ingredient released from perborate, but without the release of borate material. It has now been surprisingly discovered that the combined use of percarbonate and mannanase, especially at specific levels, provides a synergetic removal of difficult stains such as food and cosmetic stains comprising mannans, in particular at low temperatures.

It has further been found that the ternary system consisting of percarbonate/mannanase/protease at specific levels provides an even better result on said stains.

It has been surprisingly found that such compositions provide superior cleaning and whitening due to the synergistic effect of hydrophobic bleach activator bleaching system providing significant cleaning and removing greasy stains and the mannanase enzyme degrading residual hydrocolloid gums. This bleach—enzyme mixed system delivers an outstanding cleaning and whitening effect, especially on these cosmetic and food stains.

It has been further found that the performance of the detergent compositions of the present invention is enhanced by the addition of a cationic surfactant, a chelant and/or mixtures thereof.

Mannanases have been identified in several Bacillus organisms. For example, Talbot et al., Appl. Environ. Microbiol., vol. 56, No. 11, pp. 3505–3510 (1990) describes a β-mannanase derived from *Bacillus stearothermophilus* in dimer form having a MW of 162 kDa and an optimum pH of 5.5–7.5. Mendoza et al., World J. Micobio. Boitech., vol. 10, no. 5, pp. 551–555 (1994) describes a β-mannanase derived from *Bacillus subtilisis* having a MW of 38 kDa, an optimum activity at pH 5.0/55° C. and a pI of 4.8. J0304706 discloses a β-mannanase derived from Bacillus sp. having a MW of 37+/− 3 kDa measured by gel filtration, an optimum pH of 8–10 and a pI of 5.3–5.4. J63056289 describes the production of an alkaline, thermostable β-mannase, which hydrolyses β-1,4-D-mannopyranoside bonds of e.g. mannans and produces manno:oligo:saccharides. J63036774 relates to a Bacillus micro-organism FERM P-8856 which produces β-mannanase and β-mannosidase, at an alkaline pH. A purified mannanase from *Bacillus amyloliquefaciens* and its method of preparation useful in the bleaching of pulp and paper, is disclosed in WO97/11164. WO91/18974 describes an hemicellulase such as a glucanase, xylanase or mannanase, active at extreme pH and temperature and the production thereof. WO94/25576 describes an enzyme exhibiting a mannanase activity derived from *Aspergillus aculeatus* CBS 101.43, that might be used for various purposes for which degradation or modification of plant or algae cell wall material is desired. WO93/24622 discloses a mannanase isolated from *Trichoderma reesie* for bleaching lignocellulosic pulps.

However, the synergistic combination of a mannanase and a bleach system for superior whitening, stain removal, dingy cleaning and/or superior cleaning performance in a detergent composition, has never been previously recognised.

SUMMARY OF THE INVENTION

The present invention relates to detergent compositions comprising a mannanase and a bleach system, preferably a source of hydrogen peroxide, more preferably percarbonate, and optionally, but preferably, a hydrophobic bleach activator. These compositions provide superior cleaning performance, stain removal, especially on cosmetic and food stains, especially mannans-containing cosmetic and/or food stains, dingy cleaning and/or superior whiteness performance.

DETAILED DESCRIPTION OF THE INVENTION

Bleaching agents are known in the detergent field to provide greasy stain removal. It is known that modern cosmetic and food compositions contain more and more additives such as hydrocolloid gums used as thickeners. Mannans, Guar gum and Locus Bean are used in several cosmetic and food composition (see Industrial Gum, second editions, R. L. Whistler pp 308, Academic Press, 1973, ISBN, 0-12-74-6252-x). It has been found that these hydrocolloid gums have a very high affinity for cellulose materials.

It has been found that stains containing hydrocolloid gums are difficult to remove, even with the help of modem bleaching agents. Without wishing to be bound by theory, it is believed that the efficiency of a bleaching system to bleach and remove these hydrocolloid gum containing cosmetic and food stains is reduced because the hydrocolloid gums glue the greasy stains on fabrics. It has been surprisingly found that the use of a mannanase enzyme in combination with a bleaching system preferably comprising a hydrophobic bleach activator, results in significant cleaning and whitening benefits. Indeed, it has been found that a bleaching system preferably comprising a hydrophobic bleach activator bleaches and removes greasy stains and that the mannanase enzyme degrade residual hydrocolloid gums which are then easily removed by conventional detergent ingredient such as surfactants. The use of this bleaching-enzyme mix system delivers an outstanding cleaning effect, especially on cosmetic and food stains an superior whiteness performance.

The Mannanase Enzyme

An essential element of the detergent compositions of the present invention is a mannanase enzyme.

Encompassed in the present invention are the following three mannans-degrading enzymes: EC 3.2.1.25: β-mannosidase, EC 3.2.1.78: Endo-1,4-β-mannosidase, referred therein after as "mannanase" and EC 3.2.1.100: 1,4-β-mannobiosidase (IUPAC Classification-Enzyme nomenclature, 1992 ISBN 0-12-227165-3 Academic Press).

More preferably, the detergent compositions of the present invention comprise a β-1,4-Mannosidase (E.C. 3.2.1.78) referred to as Mannanase. The term "mannanase" or "galactomannanase" denotes a mannanase enzyme defined according to the art as officially being named mannan endo-1,4-beta-mannosidase and having the alternative names beta-mannanase and endo-1,4-mannanase and catalysing the reaction: random hydrolysis of 1,4-beta-D-mannosidic linkages in mannans, galactomannans, glucomannans, and galactoglucomannans.

In particular, Mannanases (EC 3.2.1.78) constitute a group of polysaccharases which degrade mannans and denote enzymes which are capable of cleaving polyose chains contaning mannose units, i.e. are capable of cleaving glycosidic bonds in mannans, glucomannans, galactomannans and galactogluco-mannans. Mannans are polysaccharides having a backbone composed of β-1,4-linked mannose; glucomannans are polysaccharides having a backbone or more or less regularly alternating β1,4 linked mannose and glucose; galactomannans and galactoglucomannans are mannans and glucomannans with α-1,6 linked galactose sidebranches. These compounds may be acetylated.

The degradation of galactomannans and galactogluco-mannans is facilitated by full or partial removal of the galactose sidebranches. Further the degradation of the acetylated mannans, glucomannans, galactomannans and galactogluco-mannans is facilitated by full or partial deacetylation. Acetyl groups can be removed by alkali or by mannan acetylesterases. The oligomers which are released from the mannanases or by a combination of mannanases and α-galactosidase and/or mannan acetyl esterases can be further degraded to release free maltose by β-mannosidase and/or β-glucosidase.

Mannanases have been identified in several Bacillus organisms. For example, Talbot et al., Appl. Environ. Microbiol., Vol. 56, No. 11, pp. 3505–3510 (1990) describes a beta-mannanase derived from *Bacillus stearothermophilus* in dimer form having molecular weight of 162 kDa and an optimum pH of 5.5–7.5. Mendoza et al., World J. Microbiol. Biotech., Vol. 10, No. 5, pp. 551–555 (1994) describes a beta-mannanase derived from *Bacillus subtilis* having a molecular weight of 38 kDa, an optimum activity at pH 5.0 and 55C and a pI of 4.8. JP-0304706 discloses a beta-mannanase derived from Bacillus sp., having a molecular weight of 373 kDa measured by gel filtration, an optimum pH of 8–10 and a pI of 5.3–5.4. JP-63056289 describes the production of an alkaline, thermostable beta-mannanase which hydrolyses beta-1,4-D-mannopyranoside bonds of e.g. mannans and produces manno-oligosaccharides. JP-63036774 relates to the Bacillus microorganism FERM P-8856 which produces beta-mannanase and beta-mannosidase at an alkaline pH. JP-08051975 discloses alkaline beta-mannanases from alkalophilic Bacillus sp. AM-001. A purified mannanase from *Bacillus amyloliquefaciens* useful in the bleaching of pulp and paper and a method of preparation thereof is disclosed in WO 97/11164. WO 91/18974 describes a hemicellulase such as a glucanase, xylanase or mannanase active at an extreme pH and temperature. WO 94/25576 discloses an enzyme from *Aspergillus aculeatus*, CBS 101.43, exhibiting mannanase activity which may be useful for degradation or modification of plant or algae cell wall material. WO 93/24622 discloses a mannanase isolated from *Trichoderma reseei* useful for bleaching lignocellulosic pulps. An hemicellulase capable of degrading mannan-containing hemicellulose is described in WO91/18974 and a purified mannanase from *Bacillus amyloliquefaciens* is described in WO97/11164.

In particular, this mannanase enzyme will be an alkaline mannanase as defined below, most preferably, a mannanase originating from a bacterial source. Especially, the laundry detergent composition of the present invention will comprise an alkaline mannanase selected from the mannanase from the strain *Bacillus agaradherens* and/or *Bacillus subtilisis* strain 168, gene yght.

The term "alkaline mannanase enzyme" is meant to encompass an enzyme having an enzymatic activity of at least 10%, preferably at least 25%, more preferably at least 40% of its maximum activity at a given pH ranging from 7 to 12, preferably 7.5 to 10.5.

Most preferably, the detergent compositions of the present invention will comprise the alkaline mannanase from *Bacillus agaradherens*. Said mannanase is i) a polypeptide produced by *Bacillus agaradherens*, NCIMB 40482, or ii) a polypeptide comprising an amino acid sequence as shown in positions 32–343 of SEQ ID NO:2 or iii) an analogue of the polypeptide defined in i) or ii) which is at least 70% homologous with said polypeptide, or is derived from said polypeptide by substitution, deletion or addition of one or several amino acids, or is immunologically reactive with a polyclonal antibody raised against said polypeptide in purified form.

The present invention also encompasses an isolated polypeptide having mannanase activity selected from the group consisting of (a) polynucleotide molecules encoding a polypeptide having mannanase activity and comprising a sequence of nucleotides as shown in SEQ ID NO: 1 from nucleotide 97 to nucleotide 1029;

(b) species homologs of (a);

(c) polynucleotide molecules that encode a polypeptide having mannanase activity that is at least 70% identical to the amino acid sequence of SEQ ID NO: 2 from amino acid residue 32 to amino acid residue 343;

(d) molecules complementary to (a), (b) or (c); and (e) degenerate nucleotide sequences of (a), (b), (c) or (d).

The plasmid pSJ1678 comprising the polynucleotide molecule (the DNA sequence) encoding a mannanase of the present invention has been transformed into a strain of the *Escherichia coli* which was deposited by the inventors according to the Budapest Treaty on the International Recognition of the Deposit of Microorganisms for the Purposes of Patent Procedure at the Deutsche Sammlung von Mikroorganismen und Zellkulturen GmbH, Mascheroder Weg 1 b, D-38124 Braunschweig, Federal Republic of Germany, on May 18, 1998 under the deposition number DSM 12180.

A second most preferred enzyme is the mannanase from the *Bacillus subtilisis* strain 168, which mannanase:

i) is encoded by the coding part of the DNA sequence shown in SED ID No. 5 or an analogue of said sequence and/or ii) a polypeptide comprising an amino acid sequence as shown SEQ ID NO:6 or iii) an analogue of the polypeptide defined in ii) which is at least 70% homologous with said polypeptide, or is derived from said polypeptide by substitution, deletion or addition of one or several amino acids, or is immunologically reactive with a polyclonal antibody raised against said polypeptide in purified form.

The present invention also encompasses an isolated polypeptide having mannanase activity selected from the group consisting of (a) polynucleotide molecules encoding a polypeptide having mannanase activity and comprising a sequence of nucleotides as shown in SEQ ID NO:5

(b) species homologs of (a);

(c) polynucleotide molecules that encode a polypeptide having mannanase activity that is at least 70% identical to the amino acid sequence of SEQ ID NO: 6;

(d) molecules complementary to (a), (b) or (c); and (e) degenerate nucleotide sequences of (a), (b), (c) or (d).

DEFINITIONS

Prior to discussing this invention in further detail, the following terms will first be defined:

The term "ortholog" (or "species homolog") denotes a polypeptide or protein obtained from one species that has homology to an analogous polypeptide or protein from a different species.

The term "paralog" denotes a polypeptide or protein obtained from a given species that has homology to a distinct polypeptide or protein from that same species.

The term "expression vector" denotes a DNA molecule, linear or circular, that comprises a segment encoding a polypeptide of interest operably linked to additional segments that provide for its transcription. Such additional segments may include promoter and terminator sequences, and may optionally include one or more origins of replication, one or more selectable markers, an enhancer, a polyadenylation signal, and the like. Expression vectors are generally derived from plasmid or viral DNA, or may contain elements of both. The expression vector of the invention may be any expression vector that is conveniently subjected to recombinant DNA procedures, and the choice of vector will often depend on the host cell into which the vector it is to be introduced. Thus, the vector may be an autonomously replicating vector, i.e. a vector which exists as an extra chromosomal entity, the replication of which is independent of chromosomal replication, e.g. a plasmid. Alternatively, the vector may be one which, when introduced into a host cell, is integrated into the host cell genome and replicated together with the chromosome(s) into which it has been integrated.

The term "recombinant expressed" or "recombinantly expressed" used herein in connection with expression of a polypeptide or protein is defined according to the standard definition in the art. Recombinantly expression of a protein is generally performed by using an expression vector as described immediately above.

The term "isolated", when applied to a polynucleotide molecule, denotes that the polynucleotide has been removed from its natural genetic milieu and is thus free of other extraneous or unwanted coding sequences, and is in a form suitable for use within genetically engineered protein production systems. Such isolated molecules are those that are separated from their natural environment and include cDNA and genomic clones. Isolated DNA molecules of the present invention are free of other genes with which they are ordinarily associated, but may include naturally occurring 5' and 3' untranslated regions such as promoters and terminators. The identification of associated regions will be evident to one of ordinary skill in the art (see for example, Dynan and Tijan, Nature 316:774–78, 1985).

The term "an isolated polynucleotide" may alternatively be termed "a cloned polynucleotide". When applied to a protein/polypeptide, the term "isolated" indicates that the protein is found in a condition other than its native environment. In a preferred form, the isolated protein is substantially free of other proteins, particularly other homologous proteins (i.e. "homologous impurities" (see below)). It is preferred to provide the protein in a greater than 40% pure form, more preferably greater than 60% pure form. Even more preferably it is preferred to provide the protein in a highly purified form, i.e., greater than 80% pure, more preferably greater than 95% pure, and even more preferably greater than 99% pure, as determined by SDS-PAGE.

The term "isolated protein/polypeptide may alternatively be termed "purified protein/polypeptide".

The term "homologous impurities" means any impurity (e.g. another polypeptide than the polypeptide of the invention) which originate from the homologous cell where the polypeptide of the invention is originally obtained from.

The term "obtained from" as used herein in connection with a specific microbial source, means that the polynucleotide and/or polypeptide produced by the specific source, or by a cell in which a gene from the source have been inserted.

The term "operably linked", when referring to DNA segments, denotes that the segments are arranged so that they function in concert for their intended purposes, e.g. transcription initiates in the promoter and proceeds through the coding segment to the terminator.

The term "polynucleotide" denotes a single- or double-stranded polymer of deoxyribonucleotide or ribonucleotide bases read from the 5' to the 3' end. Polynucleotides include RNA and DNA, and may be isolated from natural sources, synthesized in vitro, or prepared from a combination of natural and synthetic molecules.

The term "complements of polynucleotide molecules" denotes polynucleotide molecules having a complementary base sequence and reverse orientation as compared to a reference sequence. For example, the sequence 5' ATGCACGGG 3' is complementary to 5' CCCGTGCAT 3'.

The term "degenerate nucleotide sequence" denotes a sequence of nucleotides that includes one or more degenerate codons (as compared to a reference polynucleotide molecule that encodes a polypeptide). Degenerate codons contain different triplets of nucleotides, but encode the same amino acid residue (i.e., GAU and GAC triplets each encode Asp).

The term "promoter" denotes a portion of a gene containing DNA sequences that provide for the binding of RNA polymerase and initiation of transcription. Promoter sequences are commonly, but not always, found in the 5' non-coding regions of genes.

The term "secretory signal sequence" denotes a DNA sequence that encodes a polypeptide (a "secretory peptide") that, as a component of a larger polypeptide, directs the larger polypeptide through a secretory pathway of a cell in which it is synthesized. The larger peptide is commonly cleaved to remove the secretory peptide during transit through the secretory pathway.

HOW TO USE A SEQUENCE OF THE INVENTION TO GET OTHER RELATED SEQUENCES

The disclosed sequence information herein relating to a polynucleotide sequence encoding a mannanase of the invention can be used as a tool to identify other homologous mannanases. For instance, polymerase chain reaction (PCR) can be used to amplify sequences encoding other homologous mannanases from a variety of microbial sources, in particular of different Bacillus species.

ASSAY FOR ACTIVITY TEST

A polypeptide of the invention having mannanase activity may be tested for mannanase activity according to standard test procedures known in the art, such as by applying a solution to be tested to 4 mm diameter holes punched out in agar plates containing 0.2% AZCL galactomannan (carob), i.e. substrate for the assay of endo-1,4-beta-D-mannanase available as CatNo.I-AZGMA from the company Megazyme for US$110.00 per 3 grams (Megazyme's Internet address: http://www.megazyme.com/Purchase/index.html).

POLYNUCLEOTIDES

An isolated polynucleotide of the invention will hybridize to similar sized regions of SEQ ID No. 1, or a sequence complementary thereto, under at least medium stringency conditions.

In particular polynucleotides of the invention will hybridize to a denatured double-stranded DNA probe comprising either the full sequence shown in positions 97–1029 of SEQ ID NO:1 or any probe comprising a subsequence of SEQ ID NO:1 having a length of at least about 100 base pairs under at least medium stringency conditions, but preferably at high stringency conditions as described in detail below. Suitable experimental conditions for determining hybridization at medium, or high stringency between a nucleotide probe and a homologous DNA or RNA sequence involves presoaking of the filter containing the DNA fragments or RNA to hybridize in 5×SSC (Sodium chloride/Sodium citrate, Sambrook et al. 1989) for 10 min, and prehybridization of the filter in a solution of 5×SSC, 5×Denhardt's solution (Sambrook et al. 1989), 0.5% SDS and 100 $\mu$g/ml of denatured sonicated salmon sperm DNA (Sambrook et al. 1989), followed by hybridization in the same solution containing a concentration of 10 ng/ml of a random-primed (Feinberg, A. P. and Vogelstein, B. (1983) Anal. Biochem. 132:6–13), 32P-dCTP-labeled (specific activity higher than 1×109 cpm/$\mu$g) probe for 12 hours at ca. 45° C. The filter is then washed twice for 30 minutes in 2×SSC, 0.5% SDS at least 60° C. (medium stringency), still more preferably at least 65° C. (medium/high stringency), even more preferably at least 70° C. (high stringency), and even more preferably at least 75° C. (very high stringency).

Molecules to which the oligonucleotide probe hybridizes under these conditions are detected using a x-ray film.

As previously noted, the isolated polynucleotides of the present invention include DNA and RNA. Methods for isolating DNA and RNA are well-known in the art. DNA and RNA encoding genes of interest can be cloned in Gene Banks or DNA libraries by means of methods known in the art.

Polynucleotides encoding polypeptides having mannanase activity of the invention are then identified and isolated by, for example, hybridization or PCR.

The present invention further provides counterpart polypeptides and polynucleotides from different bacterial strains (orthologs or paralogs). Of particular interest are mannanase polypeptides from gram-positive alkalophilic strains, including species of Bacillus.

Species homologues of a polypeptide with mannanase activity of the invention can be cloned using information and compositions provided by the present invention in combination with conventional cloning techniques. For example, a DNA sequence of the present invention can be cloned using chromosomal DNA obtained from a cell type that expresses the protein. Suitable sources of DNA can be identified by probing Northern blots with probes designed from the sequences disclosed herein. A library is then prepared from chromosomal DNA of a positive cell line. A DNA sequence of the invention encoding an polypeptide having mannanase activity can then be isolated by a variety of methods, such as by probing with probes designed from the sequences disclosed in the present specification and claims or with one or more sets of degenerate probes based on the disclosed sequences. A DNA sequence of the invention can also be cloned using the polymerase chain reaction, or PCR (Mullis, U.S. Pat. No. 4,683,202), using primers designed from the sequences disclosed herein. Within an additional method, the DNA library can be used to transform or transfect host cells, and expression of the DNA of interest can be detected with an antibody (mono-clonal or polyclonal) raised against the mannanase cloned from *B. agaradherens*, NCIMB 40482, expressed and purified as described in Materials and Methods and Example 1, or by an activity test relating to a polypeptide having mannanase activity.

The mannanase encoding part of the DNA sequence cloned into plasmid pSJ1678 present in *Escherichia coli* DSM 12180 and/or an analogue DNA sequence of the invention may be cloned from a strain of the bacterial species *Bacillus agaradherens*, preferably the strain NCIMB 40482, producing the enzyme with mannan degrading activity, or another or related organism as described herein.

Alternatively, the analogous sequence may be constructed on the basis of the DNA sequence obtainable from the plasmid present in *Escherichia coli* DSM 12180 (which is believed to be identical to the attached SEQ ID NO:1), e.g be a sub-sequence thereof, and/or by introduction of nucleotide substitutions which do not give rise to another amino acid sequence of the mannanase encoded by the DNA sequence, but which corresponds to the codon usage of the host organism intended for production of the enzyme, or by introduction of nucleotide substitutions which may give rise to a different amino acid sequence (i.e. a variant of the mannan degrading enzyme of the invention).

POLYPEPTIDES

The sequence of amino acids nos. 32–343 of SEQ ID NO: 2 is a mature mannanase sequence.

The present invention also provides mannanase polypeptides that are substantially homologous to the polypeptide of SEQ ID NO:2 and species homologs (paralogs or orthologs) thereof. The term "substantially homologous" is used herein to denote polypeptides having 70%, preferably at least 80%, more preferably at least 85%, and even more preferably at least 90%, sequence identity to the sequence shown in amino acids nos. 32–343 of SEQ ID NO:2 or their orthologs or paralogs. Such polypeptides will more preferably be at least 95% identical, and most preferably 98% or more identical to the sequence shown in amino acids nos. 32–343 of SEQ ID NO:2 or its orthologs or paralogs. Percent sequence identity is determined by conventional methods, by means of computer programs known in the art such as GAP provided in the GCG program package (Program Manual for the Wisconsin Package, Version 8, August 1994, Genetics Computer Group, 575 Science Drive, Madison, Wis., USA 53711) as disclosed in Needleman, S. B. and Wunsch, C. D., (1970), Journal of Molecular Biology, 48, 443–453, which is hereby incorporated by reference in its entirety. GAP is used with the following settings for polypeptide sequence comparison: GAP creation penalty of 3.0 and GAP extension penalty of 0.1.

Sequence identity of polynucleotide molecules is determined by similar methods using GAP with the following settings for DNA sequence comparison: GAP creation penalty of 5.0 and GAP extension penalty of 0.3.

The enzyme preparation of the invention is preferably derived from a microorganism, preferably from a bacterium, an archea or a fungus, especially from a bacterium such as a bacterium belonging to Bacillus, preferably to an alkalophilic Bacillus strain which may be selected from the group consisting of the species *Bacillus agaradherens* and highly related Bacillus species in which all species preferably are at least 95%, even more preferably at least 98%, homologous to *Bacillus agaradherens* based on aligned 16S rDNA sequences.

Substantially homologous proteins and polypeptides are characterized as having one or more amino acid substitutions, deletions or additions. These changes are preferably of a minor nature, that is conservative amino acid substitutions (see Table 2) and other substitutions that do not significantly affect the folding or activity of the protein or polypeptide; small deletions, typically of one to about 30 amino acids; and small amino- or carboxyl-terminal extensions, such as an amino-terminal methionine residue, a small linker peptide of up to about 20–25 residues, or a small extension that facilitates purification (an affinity tag), such as a poly-histidine tract, protein A (Nilsson et al., *EMBO J.* 4:1075, 1985; Nilsson et al., *Methods Enzymol.* 198:3, 1991. See, in general Ford et al., *Protein Expression and Purification* 2: 95–107, 1991, which is incorporated herein by reference. DNAs encoding affinity tags are available from commercial suppliers (e.g., Pharmacia Biotech, Piscataway, N.J.; New England Biolabs, Beverly, Mass.).

However, even though the changes described above preferably are of a minor nature, such changes may also be of a larger nature such as fusion of larger polypeptides of up to 300 amino acids or more both as amino- or carboxyl-terminal extensions to a Mannanase polypeptide of the invention.

TABLE 1

| Conservative amino acid substitutions | |
|---|---|
| Basic | arginine, lysine, histidine |
| Acidic | glutamic acid, aspartic acid |
| Polar | glutamine, asparagine |

TABLE 1-continued

| Conservative amino acid substitutions | |
|---|---|
| Hydrophobic | leucine, isoleucine, valine |
| Aromatic | phenylalanine, tryptophan, tyrosine |
| Small | glycine, alanine, serine, threonine, methionine |

In addition to the 20 standard amino acids, non-standard amino acids (such as 4-hydroxyproline, 6-N-methyl lysine, 2-aminoisobutyric acid, isovaline and a-methyl serine) may be substituted for amino acid residues of a polypeptide according to the invention. A limited number of non-conservative amino acids, amino acids that are not encoded by the genetic code, and unnatural amino acids may be substituted for amino acid residues. "Unnatural amino acids" have been modified after protein synthesis, and/or have a chemical structure in their side chain(s) different from that of the standard amino acids. Unnatural amino acids can be chemically synthesized, or preferably, are commercially available, and include pipecolic acid, thiazolidine carboxylic acid, dehydroproline, 3- and 4-methylproline, and 3,3-dimethylproline.

Essential amino acids in the mannanase polypeptides of the present invention can be identified according to procedures known in the art, such as site-directed mutagenesis or alanine-scanning mutagenesis (Cunningham and Wells, Science 244: 1081–1085, 1989). In the latter technique, single alanine mutations are introduced at every residue in the molecule, and the resultant mutant molecules are tested for biological activity (i.e mannanase activity) to identify amino acid residues that are critical to the activity of the molecule. See also, Hilton et al., *J. Biol. Chem.* 271:4699–4708, 1996. The active site of the enzyme or other biological interaction can also be determined by physical analysis of structure, as determined by such techniques as nuclear magnetic resonance, crystallography, electron diffraction or photoaffinity labeling, in conjunction with mutation of putative contact site amino acids. See, for example, de Vos et al., *Science* 255:306–312, 1992; Smith et al., *J. Mol. Biol.* 224:899–904, 1992; Wlodaver et al., *FEBS Lett.* 309:59–64, 1992. The identities of essential amino acids can also be inferred from analysis of homologies with polypeptides which are related to a polypeptide according to the invention.

Multiple amino acid substitutions can be made and tested using known methods of mutagenesis, recombination and/or shuffling followed by a relevant screening procedure, such as those disclosed by Reidhaar-Olson and Sauer (*Science* 241:53–57, 1988), Bowie and Sauer (*Proc. Natl. Acad. Sci. USA* 86:2152–2156, 1989), WO95/17413, or WO 95/22625. Briefly, these authors disclose methods for simultaneously randomizing two or more positions in a polypeptide, or recombination/shuffling of different mutations (WO95/17413, WO95/22625), followed by selecting for functional a polypeptide, and then sequencing the mutagenized polypeptides to determine the spectrum of allowable substitutions at each position. Other methods that can be used include phage display (e.g., Lowman et al., *Biochem.* 30:10832–10837, 1991; Ladner et al., U.S. Pat. No. 5,223,409; Huse, WIPO Publication WO 92/06204) and region-directed mutagenesis (Derbyshire et al., *Gene* 46:145, 1986; Ner et al., *DNA* 7:127, 1988).

Mutagenesis/shuffling methods as disclosed above can be combined with high-throughput, automated screening methods to detect activity of cloned, mutagenized polypeptides in host cells. Mutagenized DNA molecules that encode active polypeptides can be recovered from the host cells and rapidly sequenced using modern equipment. These methods allow the rapid determination of the importance of individual amino acid residues in a polypeptide of interest, and can be applied to polypeptides of unknown structure.

Using the methods discussed above, one of ordinary skill in the art can identify and/or prepare a variety of polypeptides that are substantially homologous to residues 32 to 343 of SEQ ID NO: 2 and retain the mannanase activity of the wild-type protein.

PROTEIN PRODUCTION

The proteins and polypeptides of the present invention, including full-length proteins, fragments thereof and fusion proteins, can be produced in genetically engineered host cells according to conventional techniques. Suitable host cells are those cell types that can be transformed or transfected with exogenous DNA and grown in culture, and include bacteria, fungal cells, and cultured higher eukaryotic cells. Bacterial cells, particularly cultured cells of gram-positive organisms, are preferred. Gram-positive cells from the genus of Bacillus are especially preferred, such as from the group consisting of *Bacillus subtilis, Bacillus lentus, Bacillus brevis, Bacillus stearothermophilus, Bacillus alkalophilus, Bacillus amyloliquefaciens, Bacillus coagulans, Bacillus circulans, Bacillus lautus, Bacillus thuringiensis, Bacillus licheniformis*, and *Bacillus agaradherens*, in particular *Bacillus agaradherens.*

Techniques for manipulating cloned DNA molecules and introducing exogenous DNA into a variety of host cells are disclosed by Sambrook et al., *Molecular Cloning: A Laboratory Manual*, 2nd ed., Cold Spring Harbor Laboratory Press, Cold Spring Harbor, N.Y., 1989; Ausubel et al. (eds.), *Current Protocols in Molecular Biology*, John Wiley and Sons, Inc., NY, 1987; and "*Bacillus subtilis* and Other Gram-Positive Bacteria", Sonensheim et al., 1993, American Society for Microbiology, Washington D.C., which are incorporated herein by reference.

In general, a DNA sequence encoding a mannanase of the present invention is operably linked to other genetic elements required for its expression, generally including a transcription promoter and terminator within an expression vector. The vector will also commonly contain one or more selectable markers and one or more origins of replication, although those skilled in the art will recognize that within certain systems selectable markers may be provided on separate vectors, and replication of the exogenous DNA may be provided by integration into the host cell genome. Selection of promoters, terminators, selectable markers, vectors and other elements is a matter of routine design within the level of ordinary skill in the art. Many such elements are described in the literature and are available through commercial suppliers.

To direct a polypeptide into the secretory pathway of a host cell, a secretory signal sequence (also known as a leader sequence, prepro sequence or pre sequence) is provided in the expression vector. The secretory signal sequence may be that of the polypeptide, or may be derived from another secreted protein or synthesized de novo. Numerous suitable secretory signal sequences are known in the art and reference is made to "*Bacillus subtilis* and Other Gram-Positive Bacteria", Sonensheim et al., 1993, American Society for Microbiology, Washington D.C.; and Cutting, S. M.(eds.) "Molecular Biological Methods for Bacillus", John Wiley and Sons, 1990, for further description of suitable secretory signal sequences especially for secretion in a Bacillus host cell. The secretory signal sequence is joined to the DNA sequence in the correct reading frame. Secretory signal sequences are commonly positioned 5' to the DNA sequence encoding the polypeptide of interest, although certain signal sequences may be positioned elsewhere in the DNA sequence of interest (see, e.g., Welch et al., U.S. Pat. No. 5,037,743; Holland et al., U.S. Pat. No. 5,143,830).

Transformed or transfected host cells are cultured according to conventional procedures in a culture medium containing nutrients and other components required for the growth of the chosen host cells. A variety of suitable media, including defined media and complex media, are known in the art and generally include a carbon source, a nitrogen source, essential amino acids, vitamins and minerals. Media may also contain such components as growth factors or serum, as required. The growth medium will generally select for cells containing the exogenously added DNA by, for example, drug selection or deficiency in an essential nutrient which is complemented by the selectable marker carried on the expression vector or co-transfected into the host cell.

PROTEIN ISOLATION

When the expressed recombinant polypeptide is secreted the polypeptide may be purified from the growth media. Preferably the expression host cells are removed from the media before purification of the polypeptide (e.g. by centrifugation).

When the expressed recombinant polypeptide is not secreted from the host cell, the host cell are preferably disrupted and the polypeptide released into an aqueous "extract" which is the first stage of such purification techniques. Preferably the expression host cells are collected from the media before the cell disruption (e.g. by centrifugation). The cell disruption may be performed by conventional techniques such as by lysozyme digestion or by forcing the cells through high pressure. See (Robert K. Scobes, Protein Purification, Second edition, Springer-Verlag) for further description of such cell disruption techniques.

Whether or not the expressed recombinant polypeptides (or chimeric polypeptides) is secreted or not it can be purified using fractionation and/or conventional purification methods and media.

Ammonium sulfate precipitation and acid or chaotrope extraction may be used for fractionation of samples. Exemplary purification steps may include hydroxyapatite, size exclusion, FPLC and reverse-phase high performance liquid chromatography. Suitable anion exchange media include derivatized dextrans, agarose, cellulose, polyacrylamide, specialty silicas, and the like. PEI, DEAE, QAE and Q derivatives are preferred, with DEAE Fast-Flow Sepharose (Pharmacia, Piscataway, N.J.) being particularly preferred. Exemplary chromatographic media include those media derivatized with phenyl, butyl, or octyl groups, such as Phenyl-Sepharose FF (Pharmacia), Toyopearl butyl 650 (Toso Haas, Montgomeryville, Pa.), Octyl-Sepharose (Pharmacia) and the like; or polyacrylic resins, such as Amberchrom CG 71 (Toso Haas) and the like. Suitable solid supports include glass beads, silica-based resins, cellulosic resins, agarose beads, cross-linked agarose beads, polystyrene beads, cross-linked polyacrylamide resins and the like that are insoluble under the conditions in which they are to be used. These supports may be modified with reactive groups that allow attachment of proteins by amino groups, carboxyl groups, sulfhydryl groups, hydroxyl groups and/or carbohydrate moieties. Examples of coupling chemistries include cyanogen bromide activation, N-hydroxysuccinimide activation, epoxide activation, sulfhydryl activation, hydrazide activation, and carboxyl and amino derivatives for carbodiimide coupling chemistries. These and other solid media are well-known and widely used in the art, and are available from commercial suppliers.

Selection of a particular method is a matter of routine design and is determined in part by the properties of the chosen support. See, for example, *Affinity Chromatography: Principles & Methods*, Pharmacia LKB Biotechnology, Uppsala, Sweden, 1988.

Polypeptides of the invention or fragments thereof may also be prepared through chemical synthesis. Polypeptides of the invention may be monomers or multimers; glycosylated or non-glycosylated; pegylated or non-pegylated; and may or may not include an initial methionine amino acid residue.

Based on the sequence information disclosed herein a full length DNA sequence encoding a mannanase of the invention and comprising the DNA sequence shown in SEQ ID No 1, at least the DNA sequence from position 97 to position 1029, may be cloned.

Cloning is performed by standard procedures known in the art such as by, preparing a genomic library from a Bacillus strain, especially the strain *B. agaradherens*, NCIMB 40482;

plating such a library on suitable substrate plates;

identifying a clone comprising a polynucleotide sequence of the invention by standard hybridization techniques using a probe based on SEQ ID No 1; or by identifying a clone from said *Bacillus agaradherens* NCIMB 40482 genomic library by an Inverse PCR strategy using primers based on sequence information from SEQ ID No 1. Reference is made to M. J. MCPherson et al. ("PCR A practical approach" Information Press Ltd, Oxford England) for further details relating to Inverse PCR.

Based on the sequence information disclosed herein (SEQ ID No 1, SEQ ID No 2) is it routine work for a person skilled in the art to isolate homologous polynucleotide sequences encoding homologous mannanase of the invention by a similar strategy using genomic libraries from related microbial organisms, in particular from genomic libraries from other strains of the genus Bacillus such as alkalophilic species of Bacillus.

Alternatively, the DNA encoding the mannan or galactomannan-degrading enzyme of the invention may, in accordance with well-known procedures, conveniently be cloned from a suitable source, such as any of the above mentioned organisms, by use of synthetic oligonucleotide probes prepared on the basis of the DNA sequence obtainable from the plasmid present in *Escherichia coli* DSM 12180.

Accordingly, the polynucleotide molecule of the invention may be isolated from *Escherichia coli*, DSM 12180, in which the plasmid obtained by cloning such as described above is deposited. Also, the present invention relates to an isolated substantially pure biological culture of the strain *Escherichia coli*, DSM 12180.

In the present context, the term "enzyme preparation" is intended to mean either a conventional enzymatic fermentation product, possibly isolated and purified, from a single species of a microorganism, such preparation usually comprising a number of different enzymatic activities; or a mixture of monocomponent enzymes, preferably enzymes derived from bacterial or fungal species by using conventional recombinant techniques, which enzymes have been fermented and possibly isolated and purified separately and which may originate from different species, preferably fungal or bacterial species; or the fermentation product of a microorganism which acts as a host cell for expression of a recombinant mannanase, but which microorganism simultaneously produces other enzymes, e.g. pectin degrading enzymes, proteases, or cellulases, being naturally occurring fermentation products of the microorganism, i.e. the enzyme complex conventionally produced by the corresponding naturally occurring microorganism.

A method of producing the enzyme preparation of the invention, the method comprising culturing a microorganism, eg a wild-type strain, capable of producing the mannanase under conditions permitting the production of the enzyme, and recovering the enzyme from the culture. Culturing may be carried out using conventional fermentation techniques, e.g. culturing in shake flasks or fermentors with agitation to ensure sufficient aeration on a growth medium inducing production of the mannanase enzyme. The growth medium may contain a conventional N-source such as peptone, yeast extract or casamino acids, a reduced amount of a conventional C-source such as dextrose or sucrose, and an inducer such as guar gum or locust bean gum. The recovery may be carried out using conventional techniques, e.g. separation of bio-mass and supernatant by centrifugation or filtration, recovery of the supernatant or disruption of cells if the enzyme of interest is intracellular, perhaps followed by further purification as described in EP 0 406 314 or by crystallization as described in WO 97/15660.

IMMUNOLOGICAL CROSS-REACTIVITY

Polyclonal antibodies to be used in determining immunological cross-reactivity may be prepared by use of a purified mannanase enzyme. More specifically, antiserum against the mannanase of the invention may be raised by immunizing rabbits (or other rodents) according to the procedure described by N. Axelsen et al. in: A Manual of Quantitative Immunoelectrophoresis, Blackwell Scientific Publications, 1973, Chapter 23, or A. Johnstone and R. Thorpe, Immunochemistry in Practice, Blackwell Scientific Publications, 1982 (more specifically p. 27–31). Purified immunoglobulins may be obtained from the antisera, for example by salt precipitation ($(NH_4)_2 SO_4$), followed by dialysis and ion exchange chromatography, e.g. on DEAE-Sephadex. Immunochemical characterization of proteins may be done either by Outcherlony double-diff-usion analysis (O. Ouchterlony in: Handbook of Experimental Immunology (D. M. Weir, Ed.), Blackwell Scientific Publications, 1967, pp. 655–706), by crossed immunoelectrophoresis (N. Axelsen et al., supra, Chapters 3 and 4), or by rocket immunoelectrophoresis (N. Axelsen et al., Chapter 2).

Examples of useful bacteria producing the enzyme or the enzyme preparation of the invention are Gram positive bacteria, preferably from the Bacillus/Lactobacillus subdivision, preferably a strain from the genus Bacillus, more preferably a strain of *Bacillus agaradherens*, especially the strain *Bacillus agaradherens*, NCIMB 40482.

The present invention includes an isolated mannanase having the properties described above and which is free from homologous impurities, and is produced using conventional recombinant techniques.

DETERMINATION OF CATALYTIC ACTIVITY (ManU) OF MANNANASE

Colorimetric Assay:Substrate:0.2% AZCL-Galactomannan (Megazyme, Australia) from carob in 0.1 M Glycin buffer, pH10.0. The assay is carried out in an Eppendorf Micro tube 1.5 ml on a thermomixer with stirring and temperature control of 40° C. Incubation of 0.750 ml substrate with 0.05 ml enzyme for 20 min) stop by centrifugation for 4 minutes at 15000 rpm. The color of the supernatant is measured at 600 nm in a 1 cm cuvette. One ManU (Mannanase units) gives 0.24 abs in 1 cm.

OBTENTION OF THE BACILLUS AGARADHERENS MANNANASE NCIMB 40482

Strains

*Bacillus agaradherens* NCIMB 40482 comprises the mannanase enzyme encoding DNA sequence.

*E. coli* strain: Cells of *E. coli* SJ2 (Diderichsen, B., Wedsted, U., Hedegaard, L., Jensen, B. R., Sjøholm, C. (1990) Cloning of aldB, which encodes alpha-acetolactate decarboxylase, an exoenzyme from *Bacillus brevis*. J. Bacteriol., 172, 4315–4321), were prepared for and transformed by electroporation using a Gene Pulser™ electroporator from BIO-RAD as described by the supplier.

*B. subtilis* PL2306. This strain is the *B. subtilis* DN1885 with disrupted apr and npr genes (Diderichsen, B., Wedsted, U., Hedegaard, L., Jensen, B. R., Sjøholm, C. (1990) Cloning of aldB, which encodes alpha-acetolactate decarboxylase, an exoenzyme from *Bacillus brevis*. J. Bacteriol., 172, 4315–4321) disrupted in the transcriptional unit of the known *Bacillus subtilis* cellulase gene, resulting in cellulase negative cells. The disruption was performed essentially as described in (Eds. A. L. Sonenshein, J. A. Hoch and Richard Losick (1993) *Bacillus subtilis* and other Gram-Positive Bacteria, American Society for microbiology, p.618).

Competent cells were prepared and transformed as described by Yasbin, R. E., Wilson, G. A. and Young, F. E. (1975) Transformation and transfection in lysogenic strains of *Bacillus subtilis*: evidence for selective induction of prophage in competent cells. J. Bacteriol, 121:296–304.

Plasmids pSJ1678 (as described in detail in WO 94/19454 which is hereby incorporated by reference in its entirety).

pMOL944: This plasmid is a pUB110 derivative essentially containing elements making the plasmid propagatable in *Bacillus subtilis*, kanamycin resistance gene and having a strong promoter and signal peptide cloned from the amyL gene of *B. licheniformis* ATCC14580. The signal peptide contains a SacII site making it convenient to clone the DNA encoding the mature part of a protein in-fusion with the signal peptide. This results in the expression of a Pre-protein which is directed towards the exterior of the cell.

The plasmid was constructed by means of conventional genetic engineering techniques which are briefly described in the following.

Construction of pMOL944:

The pUB110 plasmid (McKenzie, T. et al., 1986, Plasmid 15:93–103) was digested with the unique restriction enzyme NciI. A PCR fragment amplified from the amyL promoter encoded on the plasmid pDN1981 (P. L. Jørgensen et al., 1990, Gene, 96, p37–41.) was digested with NciI and inserted in the NciI digested pUB110 to give the plasmid pSJ2624.

The two PCR primers used have the following sequences:

#LWN5494 5'-GTCGCCGGGGCGGCCGCTATCAATTGGTAACTGTATCTCAGC-3'

#LWN5495 5'-GTCGCCCGGGAGCTCTGATCAGGTACCAAGCTTGTCGACCTGCAGAATGAGGCAGCAAGAAGAT-3'

The primer #LWN5494 inserts a NotI site in the plasmid.

The plasmid pSJ2624 was then digested with SacI and NotI and a new PCR fragment amplified on amyL promoter encoded on the pDN1981 was digested with SacI and NotI and this DNA fragment was inserted in the SacI-NotI digested pSJ2624 to give the plasmid pSJ2670.

This cloning replaces the first amyL promoter cloning with the same promoter but in the opposite direction. The two primers used for PCR amplification have the following sequences:

#LWN5938 5'-GTCGGCGGCCGCTGATCACGTACCAAGCTTGTCGACCTGCAGAATGAGGCAGCAAGAAGAT-3'

#LWN5939 5'-GTCGGAGCTCTATCAATTGGTAACTGTATCTCAGC-3'

The plasmid pSJ2670 was digested with the restriction enzymes PstI and BclI and a PCR fragment amplified from a cloned DNA sequence encoding the alkaline amylase SP722 (disclosed in the International Patent Application published as WO95/26397 which is hereby incorporated by reference in its entirety) was digested with PstI and BclI and inserted to give the plasmid pMOL944. The two primers used for PCR amplification have the following sequence:

#LWN7864 5'-AACAGCTGATCACGACTGATCTTTTAGCTTGGCAC-3'

#LWN7901 5'-AACTGCAGCCGCGGCACATCATAATGGGACAAATGGG-3'

The primer #LWN7901 inserts a SacII site in the plasmid.

Cloning of the Mannanase Gene from *Bacillus Agaradherens*

Genomic DNA Preparation:

Strain *Bacillus agaradherens* NCIMB 40482 was propagated in liquid medium as described in WO94/01532. After 16 hours incubation at 30° C. and 300 rpm, the cells were harvested, and genomic DNA isolated by the method described by Pitcher et al. (Pitcher, D. G., Saunders, N. A., Owen, R. J. (1989). Rapid extraction of bacterial genomic DNA with guanidium thiocyanate. Lett. Appl. Microbiol., 8, 151–156).

Genomic Library Construction:

Genomic DNA was partially digested with restriction enzyme Sau3A, and size-fractionated by electrophoresis on a 0.7% agarose gel. Fragments between 2 and 7 kb in size was isolated by electrophoresis onto DEAE-cellulose paper (Dretzen, G., Bellard, M., Sassone-Corsi, P., Chambon, P. (1981) A reliable method for the recovery of DNA fragments from agarose and acrylamide gels. Anal. Biochem., 112, 295–298).

Isolated DNA fragments were ligated to BamHI digested pSJ1678 plasmid DNA, and the ligation mixture was used to transform *E. coli* SJ2.

Identification of Positive Clones:

A DNA library in *E. coli*, constructed as described above, was screened on LB agar plates containing 0.2% AZCL-galactomannan (Megazyme) and 9 μg/ml Chloramphenicol and incubated overnight at 37° C. Clones expressing mannanase activity appeared with blue diffusion halos. Plasmid DNA from one of these clone was isolated by Qiagen plasmid spin preps on 1 ml of overnight culture broth (cells incubated at 37° C. in TY withh 9 μg/ml Chloramphenicol and shaking at 250 rpm).

This clone (MB525) was further characterized by DNA sequencing of the cloned Sau3A DNA fragment. DNA sequencing was carried out by primerwalking, using the Taq deoxy-terminal cycle sequencing kit (Perkin-Elmer, USA), fluorescent labelled terminators and appropriate oligonucleotides as primers.

Analysis of the sequence data was performed according to Devereux et al. (1984) Nucleic Acids Res. 12, 387–395. The sequence encoding the mannanase is shown in SEQ ID No 1. The derived protein sequence is shown in SEQ ID No.2.

Subcloning and Expression of Mannanase in *B. Subtilis:*

The mannanase encoding DNA sequence of the invention was PCR amplified using the PCR primer set consisting of these two oligo nucleotides:

Mannanase.upper.SacII 5'-CAT TCT GCA G<u>CC GCG G</u>CA GCA AGT ACA GGC TTT TAT GTT GAT GG-3'

Mannanase.lower.NotI 5'-GAC GAC GTA CAA <u>GCG GCC GC</u>G CTA TTT CCC TAA CAT GAT GAT ATT TTC G-3'

Restriction Sites SacII and NotII are Underlined.

Chromosomal DNA isolated from *B. agaradherens* NCIMB 40482 as described above was used as template in a PCR reaction using Amplitaq DNA Polymerase (Perkin Elmer) according to manufacturers instructions. The PCR reaction was set up in PCR buffer (10 mM Tris-HCl, pH 8.3, 50 mM KCl, 1.5 mM $MgCl_2$, 0.01% (w/v) gelatin) containing 200 μM of each dNTP, 2.5 units of AmpliTaq polymerase (Perkin-Elmer, Cetus, USA) and 100 pmol of each primer.

The PCR reaction was performed using a DNA thermal cycler (Landgraf, Germany). One incubation at 94° C. for 1 min followed by thirty cycles of PCR performed using a cycle profile of denaturation at 94° C. for 30 sec, annealing at 60° C. for 1 min, and extension at 72° C. for 2 min. Five-μl aliquots of the amplification product was analysed by electrophoresis in 0.7% agarose gels (NuSieve, FMC). The appearance of a DNA fragment size 1.4 kb indicated proper amplification of the gene segment.

Subcloning of PCR Fragment.

Fortyfive-μl aliquots of the PCR products generated as described above were purified using QIAquick PCR purification kit (Qiagen, USA) according to the manufacturer's instructions. The purified DNA was eluted in 50 μl of 10 mM Tris-HCl, pH 8.5.

5 μg of pMOL944 and twentyfive-μl of the purified PCR fragment was digested with SacII and NotI, electrophoresed in 0.8% low gelling temperature agarose (SeaPlaque GTG, FMC) gels, the relevant fragments were excised from the gels, and purified using QIAquick Gel extraction Kit (Qiagen, USA) according to the manufacturer's instructions. The isolated PCR DNA fragment was then ligated to the SacII-NotI digested and purified pMOL944. The ligation was performed overnight at 16° C. using 0.5 μg of each DNA fragment, 1 U of T4 DNA ligase and T4 ligase buffer (Boehringer Mannheim, Germany).

The ligation mixture was used to transform competent *B. subtilis* PL2306. The transformed cells were plated onto LBPG-10 μg/ml of Kanamycin plates. After 18 hours incubation at 37° C. colonies were seen on plates. Several clones were analysed by isolating plasmid DNA from overnight culture broth.

One such positive clone was restreaked several times on agar plates as used above, this clone was called MB594. The clone MB594 was grown overnight in TY-10 μg/ml kanamycin at 37° C., and next day 1 ml of cells were used to isolate plasmid from the cells using the Qiaprep Spin Plasmid Miniprep Kit #27106 according to the manufacturers recommendations for *B. subtilis* plasmid preparations. This DNA was DNA sequenced and revealed the DNA sequence corresponding to the mature part of the mannanase, i.e. positions 94–1404 of the appended SEQ ID NO:3. The derived mature protein is shown in SEQ ID NO:4. It will appear that the 3' end of the mannanse encoded by the sequence of SEQ ID NO:1 was changed to the one shown in SEQ ID NO:3 due to the design of the lower primer used in the PCR. The resulting amino acid sequence is shown in SEQ ID NO:4 and it is apparent that the C terminus of the SEQ ID NO:2 (SHHVREIGVQFSAADNSSGQTALYVDNVTLR) is changed to the C terminus of SEQ ID NO:4 (IIMLGK).

Media:

TY (as described in Ausubel, F. M. et al. (eds.) "Current protocols in Molecular Biology". John Wiley and Sons, 1995).

LB agar (as described in Ausubel, F. M. et al. (eds.) "Current protocols in Molecular Biology". John Wiley and Sons, 1995).

LBPG is LB agar (see above) supplemented with 0.5% Glucose and 0.05 M potassium phosphate, pH 7.0

BPX media is described in EP 0 506 780 (WO 91/09129).

Expression, Purification and Characterisation of Mannanase from *Bacillus Agaradherens*

The clone MB 594 obtained as described above under Materials and Methods was grown in 25×200 ml BPX media with 10 μg/ml of Kanamycin in 500 ml two baffled shake-flasks for 5 days at 37° C. at 300 rpm.

6500 ml of the shake flask culture fluid of the clone MB 594 (batch #9813) was collected and pH adjusted to 5.5. 146 ml of cationic agent (C521) and 292 ml of anionic agent (A130) was added during agitation for flocculation. The flocculated material was separated by centrifugation using a Sorval RC3B centrifuge at 9000 rpm for 20 min at 6° C. The supernatant was clarified using Whatman glass filters GF/D and C and finally concentrated on a filtron with a cut off of 10 kDa.

750 ml of this concentrate was adjusted to pH 7.5 using sodium hydroxide. The clear solution was applied to anion-exchange chromatography using a 900 ml Q-Sepharose column equilibrated with 50 mmol Tris pH 7.5. The mannanase activity bound was eluted using a sodium chloride gradient.

The pure enzyme gave a single band in SDS-PAGE with a molecular weight of 38 kDa. The amino acid sequence of the mannanase enzyme, i.e. the translated DNA sequence, is shown in SEQ ID No.2.

Determination of Kinetic Constants:

Substrate: Locust bean gum (carob) and reducing sugar analysis (PHBAH). Locust bean gum from Sigma (G-0753).

Kinetic determination using different concentrations of locust bean gum and incubation for 20 min at 40° C. at pH 10 gave Kcat: 467 per sec.

$K_m$: 0.08 gram per 1

MW: 38 kDa pI (isoelectric point): 4.2

The temperature optimum of the mannanase was found to be 60° C.

The pH activity profile showed maximum activity between pH 8 and 10.

DSC differential scanning calometry gives 77° C. as melting point at pH 7.5 in Tris buffer indicating that this enzyme is very thermostable.

Detergent compatibility using 0.2% AZCL-Galactomannan from carob as substrate and incubation as described above at 40° C. shows excellent compatibility with conventional liquid detergents and good compatibility with conventional powder detergents.

OBTENTION OF THE *BACILLUS SUBTILISIS* MANNANASE 168

The *Bacillus subtilisis* β-mannanase was characterised and purified as follows: The *Bacillus subtilis* genome was searched for homology with a known Bacillus sp β-Mannanase gene sequence (Mendoza et al., *Biochemica et Biophysica Acta* 1243:552–554, 1995). The coding region of ydhT, whose product was unknown, showed a 58% similarity to the known Bacillus β-Mannanase. The following oligonucleotides were designed to amplify the sequences coding for the mature portion of the putative β-Mannanase: 5'-GCT CAA TTG GCG CAT ACT GTG TCG CCT GTG-3' and 5'-GAC GGA TCC CGG ATT CAC TCA ACG ATT GGC G-3'. Total genomic DNA from *Bacillus subtilis* strain 1A95 was used as a template to amplify the ydhT mature region using the aforementioned primers. PCR is performed using the GENE-AMP PCR Kit with AMPLITAQ DNA Polymerase (Perkin Elmer, Applied Biosystems, Foster City, Calif.) An initial melting period at 95° C. for 5 min was followed by 25 cycles of the following program: melting at 95° C. for 1 min, annealing at 55° C. for 2 min, and extension at 72° C. for 2 min. After the last cycle, the reaction was held at 72° C. for 10 min to complete extension. The PCR products were purified using QIAquick PCR purification kit (Qiagen, Chatsworth, Calif.)

The ydhT mature region amplified from *Bacillus subtilis* strain 1A95 was inserted into the expression vector pPG1524 (previously described) as follows. The amplified 1028 bp fragment was digested with Mfe I and BamH I. The expression vector pPG1527 was digested with EcoR I and BamH I. The restriction products were purified using QIAquick PCR purification kit (Qiagen, Chatsworth, Calif.) The two fragments were ligated using T4 DNA ligase (13 hr, 16° C.) and used to transform competent *E. coli* strain DH5-α. Ampicilin resistant colonies were cultured for DNA preparations. The DNA was then characterized by restriction analysis. Plasmid pPG3200 contains the mature region of the ydhT gene. Plasmid pPG3200 was then used to transform competent *Bacillus subtilis* strain PG 632 (Saunders et al., 1992).

Seven kanamycin resistant *Bacillus subtilis* clones and one PG 632 control clone were picked and grown in 20 ml of 20/20/5 media (20 g/l tryptone, 20 g/l yeast extract, 5 g/l NaCl) supplemented with 1 ml 25% maltrin, 120 μl 10 mM $MnCl_2$, and 20 μl of 50 mg/ml kanamycin. Clones were grown overnight in 250 ml baffled flasks shaking at 250 rpm at 37° C. for expression of the protein. Cells were spun out at 14,000 rpm for 15 minutes. One μl of each supernatant was diluted in 99 μl of 50 mM sodium acetate (pH 6.0). One μl of this dilution was assayed using the endo-1,4-β-Mannanase Beta-Mannazyme Tabs (Megazyme, Ireland) according to the manufacturers instructions. Absorbance was read at 590 nm on a Beckman DU640 spectrophotometer. Clone 7 showed the highest Absorbance of 1.67. The PG632 control showed no Absorbance at 590 nm.

Supernatant was analyzed by SDS-PAGE on a 10–20% Tris-Glycine gel (Novex, San Diego, Calif.) to confirm expected protein size of 38 kDa. Samples were prepared as follows. A 500 μl sample of ydhT clone 7 and PG 632 supernatants were precipitated with 55.5 μl 100% Trichloroacetic acid (Sigma), washed with 100 μl 5% Trichloroacetic, resuspended in 50 μl of Tris-glycine SDS sample buffer (Novex) and boiled for five minutes. One μl of each sample was electrophoresed on the gel at 30 mA for 90 minutes. A large band of protein was observed to run at 38 kDa for ydhT clone 7.

A 10 l fermentation of *Bacillus subtilis* ydhT clone 7 was performed in a B. Braun Biostat C fermentator. Fermentation conditions were as follows. Cells were grown for 18 h in a rich media similar to 20/20/5 at 37° C. At the end of the fermentation run, the cells were removed and the supernatant concentrated to 1 liter using a tangential flow filtration system. The final yield of β-Mannanase in the concentrated supernatant was determined to be 3 g/l.

The purification of the β-Mannanase from the fermentation supernatant was performed as follows: 500 ml of supernatant was centrifuged at 10,000 rpm for 10 min at 4° C. The centrifuged supernatant was then dialyzed overnight at 4° C. in two 4 1 changes of 10 mM potassium phosphate (pH 7.2) through Spectrapor 12,000–14,000 mol.wt. cutoff membrane (Spectrum). The dialyzed supernatant was centrifuged at 10,000 rpm for 10 min at 4° C. A 200 ml Q Sepharose fast flow (Pharmacia) anion exchange column was equilibrated with 1 liter of 10 mM potassium phosphate (pH 7.2) at 20° C. and 300 ml of supernatant was loaded on column. Two flow through fractions of 210 ml (sample A) and 175 ml (sample B) were collected. The two fractions were assayed as before, except that the samples were diluted with 199 μl of 50 mM sodium acetate (pH 6.0), and they showed Absorbance of 0.38 and 0.52 respectively. Two μl of each sample was added to 8 μl of Tris-glycine SDS sample buffer (Novex, CA) and boiled for 5 min. The resulting samples were electrophoresed on a 10–20% Tris-Glycine gel (Novex, Ca) at 30 mA for 90 minutes. A major band corresponding to 38 kDa was present in each sample and comprised greater than 95% of the total protein. A BCA protein assay (Pierce) was performed on both samples according to the manufacturers instructions, using bovine serum albumin as standard. Samples A and B contained 1.3 mg/ml and 1.6 mg/ml of β-Mannanase respectively. The identity of the protein was confirmed by ion spray mass spectrometry and amino terminal amino acid sequence analysis.

The purified β-Mannanase samples were used to characterize the enzymes activity as follows. All assays used endo-1,4-β-Mannanase Beta-Mannazyme Tabs (Megazyme, Ireland) as described earlier. Activity at pH range 3.0–9.0 were performed in 50 mM citrate phosphate buffer, for activity determination at pH 9.5, 50 mM CAPSO (Sigma), and for pH 10.0–11.0 range 50 mM CAPS buffer was employed. The optimum pH for the *Bacillus subtilis* β-Mannanase was found to be pH 6.0–6.5. Temperature activity profiles were performed in 50 mM citrate phosphate buffer (pH 6.5). The enzyme showed optimum activity at 40–45° C. The *Bacillus subtilis* β-Mannanase retained significant activity at less than 15° C. and greater than 80° C. Specific activity against β-1,4-Galactomannan was determined to be 160,000 μmol/min.mg β-Mannanase using endo-1,4-β-Mannanase Beta-Mannazyme Tabs (Megazyme, Ireland) according to the manufacturers directions. The nucleotide and amino acid sequences of the *Bacillus subtilisis* β-mannanase are shown in SEQ. ID. No. 5 and 6.

The mannanase is incorporated into the compositions of the invention preferably at a level of from 0.0001% to 2%, more preferably from 0.0005% to 0.1%, most preferred from 0.001% to 0.02% pure enzyme by weight of the composition.

The enzyme of the invention, in addition to the enzyme core comprising the catalytically domain, also comprise a cellulose binding domain (CBD), the cellulose binding domain and enzyme core (the catalytically active domain) of the enzyme being operably linked. The cellulose binding domain (CBD) may exist as an integral part of the encoded enzyme, or a CBD from another origin may be introduced into the enzyme thus creating an enzyme hybrid. In this context, the term "cellulose-binding domain" is intended to be understood as defined by Peter Tomme et al. "Cellulose-Binding Domains: Classification and Properties" in "Enzymatic Degradation of Insoluble Carbohydrates", John N. Saddler and Michael H. Penner (Eds.), ACS Symposium Series, No. 618, 1996. This definition classifies more than 120 cellulose-binding domains into 10 families (I–X), and demonstrates that CBDs are found in various enzymes such as cellulases, xylanases, mannanases, arabinofuranosidases, acetyl esterases and chitinases. CBDs have also been found in algae, e.g. the red alga Porphyra purpurea as a non-hydrolytic polysaccharide-binding protein, see Tomme et al., op.cit. However, most of the CBDs are from cellulases and xylanases, CBDs are found at the N and C termini of proteins or are internal. Enzyme hybrids are known in the art, see e.g. WO 90/00609 and WO 95/16782, and may be prepared by transforming into a host cell a DNA construct comprising at least a fragment of DNA encoding the cellulose-binding domain ligated, with or without a linker, to a DNA sequence encoding the mannanase enzyme and growing the host cell to express the fused gene. Enzyme hybrids may be described by the following formula:

CBD-MR-X wherein CBD is the N-terminal or the C-terminal region of an amino acid sequence corresponding to at least the cellulose-binding domain; MR is the middle region (the linker), and may be a bond, or a short linking group preferably of from about 2 to about 100 carbon atoms, more preferably of from 2 to 40 carbon atoms; or is preferably from about 2 to to about 100 amino acids, more preferably of from 2 to 40 amino acids; and X is an N-terminal or C-terminal region of the enzyme of the invention.

The above-mentioned enzymes may be of any suitable origin, such as vegetable, animal, bacterial, fungal and yeast origin. Origin can further be mesophilic or extremophilic (psychrophilic, psychrotrophic, thermophilic, barophilic, alkalophilic, acidophilic, halophilic, etc.). Purified or non-purified forms of these enzymes may be used. Nowadays, it is common practice to modify wild-type enzymes via protein/genetic engineering techniques in order to optimise their performance efficiency in the cleaning compositions of the invention. For example, the variants may be designed such that the compatibility of the enzyme to commonly encountered ingredients of such compositions is increased. Alternatively, the variant may be designed such that the optimal pH, bleach or chelant stability, catalytic activity and the like, of the enzyme variant is tailored to suit the particular cleaning application.

In particular, attention should be focused on amino acids sensitive to oxidation in the case of bleach stability and on surface charges for the surfactant compatibility. The isoelectric point of such enzymes may be modified by the substitution of some charged amino acids, e.g. an increase in isoelectric point may help to improve compatibility with anionic surfactants. The stability of the enzymes may be further enhanced by the creation of e.g. additional salt bridges and enforcing metal binding sites to increase chelant stability.

The Bleaching System

An essential element of the present invention is a bleach system, preferably comprising a source of hydrogen peroxide capable of releasing hydrogen peroxide in aqueous solution, and optionally, but preferably, a hydrophobic bleach activator.

It has been surprisingly found that the combination of a mannanase with a bleach system preferably comprising a source of hydrogen peroxide and optionally, but preferably, a hydrophobic bleach activator demonstrates enhanced overall cleaning, superior cleaning on a wider range of stains/soils and improved whiteness performance benefits.

It is generally believed that the bleach activator undergoes nucleophilic attack by a perhydroxide anion, which is generated from the hydrogen peroxide evolved by the peroxygen bleach, to form a peroxycarboxylic acid. This reaction is commonly referred to as perhydrolysis.

The detergent compositions of the present invention include bleaching agents such as hydrogen peroxide and/or other sources of hydrogen peroxide such as perborate (PB1, PB4) and percarbonate with a particle size of 400–800 microns, preferably percarbonate. These bleaching agent components can include one or more oxygen bleaching agents and, depending upon the bleaching agent chosen, one or more bleach activators.

The detergent compositions herein typically contain from 0.1% to 50%, preferably from 0.5% to 35% by weight, most preferably from 1% to 25% by weight of a hydrogen peroxide source, most preferably an alkali metal percarbonate bleach in the form of particles having a mean size from 250 to 900 micrometers, preferably 500 to 700 micrometers. Laundry additives typically contain from 20% to 80% of said hydrogen peroxide source.

Preferred detergent compositions according to the present invention comprise a level of mannanase (pure enzyme by weight of total composition) of from 0.0001% to 2% and a level of hydrogen peroxide source of from 0.1% to 50% by weight of the total composition, preferably a mannanase level of from 0.0005% to 0.5% and a hydrogen peroxide source level of from 0.5% to 35%, more preferably a level of mannanase of from 0.001% to 0.1% and a hydrogen peroxide source level of from 1% to 25%

The hydrogen peroxide source, preferably the perborate and percarbonate bleaches, more preferably the alkali metal percarbonate bleach is usually in the form of the sodium salt. Sodium percarbonate is an addition compound having a formula corresponding to $2Na_2CO_33H_2O_2$. To enhance storage stability the percarbonate bleach can be coated with e.g. a further mixed salt of an alkali metal sulphate and carbonate. Such coatings together with coating processes have previously been described in GB-1,466,799, granted to Interox on Mar. 9th, 1977. The weight ratio of the mixed salt coating material to percarbonate lies in the range from 1:2000 to 1:4, more preferably from 1:99 to 1:9, and most preferably from 1:49 to 1:19. Preferably, the mixed salt is of sodium sulphate and sodium carbonate which has the general formula Na2SO4.n.Na2CO3 wherein n is from 0.1 to 3, preferably n is from 0.3 to 1.0 and most preferably n is from 0.2 to 0.5.

Suitable percarbonate for the purpose of the present invention is the sodium percarbonate described in WO97/35591 being characterised by an intrinsic mean particle size of 500 to 100 mu m, not more than 20% below 350 mu m and a moisture pick-up of no more than 30 g per 1000 g sample at 80% relative humidity and 32° C. in 24 h or characterised by a mean particle size of 500 to 1200 mu m and a 7-days aged heat emission at 40° C. of below 3 mu W/g in 16 h. Also suitable is the sodium percarbonate manufactured from hydrogen peroxide and sodium carbonate in aqueous medium without the use of chloride salting-out agent as described in WO97/35806.

Other suitable coating materials are sodium silicate, of $SiO_2:Na_2O$ ratio from 1.6:1 to 2.8:1, and magnesium silicate.

Commercially available carbonate/sulphate coated percarbonate bleach may include a low level of a heavy metal sequestrant such as EDTA, 1-bydroxyethylidene 1,1-diphosphonic acid (HEDP) or an aminophosphonate, that is incorporated during the manufacturing process. Preferred heavy metal sequestrants for incorporation as described herein above include the organic phosphonates and amino alkylene poly(alkylene phosphonates) such as the alkali metal ethane 1-hydroxy diphosphonates, the nitrilo trimethylene phsphonates, the ethylene diamine tetra methylene phosphonates and the diethylene triamine penta methylene phosphonates.

Alternative sources of available oxygen encompass percarboxylic acid bleaching agents and salts thereof. Suitable examples of this class of agents include magnesium monoperoxyphthalate hexahydrate, the magnesium salt of meta-chloro perbenzoic acid, 4-nonylamino-4-oxoperoxybutyric acid and diperoxydodecanedioic acid. Such bleaching agents are disclosed in U.S. Pat. No. 4,483,781, U.S. patent application Ser. No. 740,446, European Patent Application 0,133,354 and U.S. Pat. No. 4,412,934. Highly preferred bleaching agents also include 6-nonylamino-6-oxoperoxycaproic acid as described in U.S. Pat. No. 4,634,551.

The hydrogen peroxide may also be present by adding an enzymatic system (i.e. an enzyme and a substrate therefore) which is capable of generating hydrogen peroxide at the beginning or during the washing and/or rinsing process. Such enzymatic systems are disclosed in EP Patent Application 91202655.6 filed Oct. 9, 1991.

Another category of bleaching agents that can be used encompasses the halogen bleaching agents. Examples of hypohalite bleaching agents, for example, include trichloro isocyanuric acid and the sodium and potassium dichloroisocyanurates and N-chloro and N-bromo alkane sulphonamides. Such materials are normally added at 0.5–10% by weight of the finished product, preferably 1–5% by weight.

The hydrogen peroxide releasing agents can be and preferably are used in combination with hydrophobic bleach activators such as nonanoyloxybenzene-sulfonate (NOBS, described in U.S. Pat. No. 4,412,934), 3,5,-trimethylhexanoloxybenzenesulfonate (ISONOBS, described in EP 120,591) or Phenolsulfonate ester of N-nonanoyl-6-aminocaproic acid (NACA-OBS, described in WO94/28106), which are perhydrolyzed to form a peracid as the active bleaching species, leading to improved bleaching effect. Their acid form can also be used such as the nonyl amide of peroxy succinic acid, nonylamide of peroxy adipic acid or nonanoyl oxybenzene peroxy acid as described in our co-pending application U.S. Ser. No. 08/136,626. Other suitable hydrophobic bleach activators are unsymetrical acyclic imide bleach activators of the following formula as disclosed in the Procter & Gamble co-pending patent applications U.S. Ser. No. 60/022,786 (filed Jul. 30, 1996) and Ser. No. 60/028,122 (filed Oct. 15, 1996):

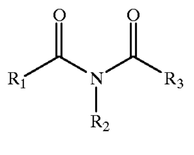

wherein $R_1$ is a $C_7$–$C_{13}$ linear or branched chain saturated or unsaturated alkyl group, $R_2$ is a $C_1$–$C_8$, linear or branched chain saturated or unsaturated alkyl group and $R_3$ is a $C_1$–$C_4$ linear or branched chain saturated or unsaturated alkyl group. Preferred bleach activators for the purpose of the present invention are nonanoyloxybenzene-sulfonate (NOBS, described in U.S. Pat. No. 4,412,934), 3,5,-trimethylhexanoloxybenzenesulfonate (ISONOBS, described in EP 120,591) and Phenolsulfonate ester of N-nonanoyl-6-aminocaproic acid (NACA-OBS, described in WO94/28106).

The hydrophobic bleach activator is generally comprised at level of from 0.01% to 20%, preferably 0.25% to 15%, more preferably from 0.5% to 10% by weight of total composition.

Useful bleaching agents, including peroxyacids and bleaching systems comprising bleach activators and peroxygen bleaching compounds for use in detergent compositions according to the invention are described in our co-pending applications U.S. Ser. No. 08/136,626, PCT/US95/07823, WO95/27772, WO95/27773, WO95/27774 and WO95/27775.

In addition to the hydrogen peroxide source and/or hydrophobic bleach activator, the composition of the present invention, may comprise optionally other bleaching agents such as other bleach activators, photoactivated bleaches, enzyme generating bleach species and bleach catalysts.

Other bleach activators that may be used in the composition of the present invention are tetraacetylethylenediamine (TAED), pentaacetylglucose (PAG) and/or acylated citrate esters such as disclosed in Co-pending European Patent Application No. 91870207.7.

Metal-containing catalysts for use in bleach compositions, include cobalt-containing catalysts such as Pentaamine acetate cobalt(III) salts and manganese-containing catalysts such as those described in EPA 549 271; EPA 549 272; EPA 458 397; U.S. Pat. No. 5,246,621; EPA 458 398; U.S. Pat. No. 5,194,416 and U.S. Pat. No. 5,114,611. Bleaching composition comprising a peroxy compound, a manganese-containing bleach catalyst and a chelating agent is described in the patent application No 94870206.3.

Bleaching agents other than oxygen bleaching agents are also known in the art and can be utilized herein. One type of non-oxygen bleaching agent of particular interest includes photoactivated bleaching agents such as the sulfonated zinc and/or aluminum phthalocyanines. These materials can be deposited upon the substrate during the washing process. Upon irradiation with light, in the presence of oxygen, such as by hanging clothes out to dry in the daylight, the sulfonated zinc phthalocyanine is activated and, consequently, the substrate is bleached. Preferred zinc phthalocyanine and a photoactivated bleaching process are described in U.S. Pat. No. 4,033,718. Typically, detergent compositions will contain about 0.025% to about 1.25%, by weight, of sulfonated zinc phthalocyanine.

Detergent Components

The detergent compositions of the invention must contain at least one additional detergent component. The precise nature of these additional component, and levels of incorporation thereof will depend on the physical form of the composition, and the nature of the cleaning operation for which it is to be used.

The detergent compositions of the present invention preferably further comprise a detergent ingredient selected from cationic surfactants, chelants and/or mixtures thereof.

In a preferred embodiment, the present invention relates to a laundry detergent composition comprising a mannanase and a hydrophobic bleach (Examples 1–6). In a second embodiment, the present invention relates to dishwashing compositions (Examples 7–9).

The detergent compositions according to the invention can be liquid, paste, gels, bars, tablets, spray, foam, powder or granular. Granular compositions can also be in "compact" form and the liquid compositions can also be in a "concentrated" form.

The compositions of the invention may for example, be formulated as hand and machine dishwashing compositions, hand and machine laundry detergent compositions including laundry additive compositions and compositions suitable for use in the soaking and/or pretreatment of stained fabrics, and compositions for use in general household hard surface cleaning operations.

When formulated as compositions for use in manual dishwashing methods the compositions of the invention preferably contain a surfactant and preferably other detergent compounds selected from organic polymeric compounds, suds enhancing agents, group II metal ions, solvents, hydrotropes and additional enzymes.

When formulated as compositions suitable for use in a laundry machine washing method, the compositions of the invention preferably contain both a surfactant and a builder compound and additionally one or more detergent components preferably selected from organic polymeric compounds, bleaching agents, additional enzymes, suds suppressors, dispersants, lime-soap dispersants, soil suspension and anti-redeposition agents and corrosion inhibitors. Laundry compositions can also contain softening agents, as additional detergent components. Such compositions containing a mannanase and a hydrophobic bleach activator bleraching system can provide fabric cleaning, stain removal, whiteness maintenance, dye transfer inhibition and sanitisation when formulated as laundry detergent compositions.

The compositions of the invention can also be used as detergent additive products in solid or liquid form. Such additive products are intended to supplement or boost the performance of conventional detergent compositions and can be added at any stage of the cleaning process.

If needed the density of the laundry detergent compositions herein ranges from 400 to 1200 g/litre, preferably 500 to 950 g/litre of composition measured at 20° C.

The "compact" form of the compositions herein is best reflected by density and, in terms of composition, by the amount of inorganic filler salt; inorganic filler salts are conventional ingredients of detergent compositions in powder form; in conventional detergent compositions, the filler salts are present in substantial amounts, typically 17–35% by weight of the total composition. In the compact compositions, the filler salt is present in amounts not exceeding 15% of the total composition, preferably not exceeding 10%, most preferably not exceeding 5% by weight of the composition. The inorganic filler salts, such as meant in the present compositions are selected from the alkali and alkaline-earth-metal salts of sulphates and chlorides. A preferred filler salt is sodium sulphate.

Liquid detergent compositions according to the present invention can also be in a "concentrated form", in such case, the liquid detergent compositions according the present invention will contain a lower amount of water, compared to conventional liquid detergents. Typically the water content of the concentrated liquid detergent is preferably less than 40%, more preferably less than 30%, most preferably less than 20% by weight of the detergent composition.

Suitable detergent compounds for use herein are selected from the group consisting of the below described compounds.

Surfactant System

The detergent compositions according to the present invention generally comprise a surfactant system wherein the surfactant can be selected from nonionic and/or anionic and/or cationic and/or ampholytic and/or zwitterionic and/or semi-polar surfactants. Preferably, the detergent compositions of the present invention will comprise a cationic surfactant. It has been surprisingly found that such compositions further comprising a cationic surfactant, provide better cleaning and whitening performance.

The surfactant is typically present at a level of from 0.1% to 60% by weight. More preferred levels of incorporation are 1% to 35% by weight, most preferably from 1% to 30% by weight of detergent compositions in accord with the invention.

The surfactant is preferably formulated to be compatible with enzyme components present in the composition. In liquid or gel compositions the surfactant is most preferably formulated such that it promotes, or at least does not degrade, the stability of any enzyme in these compositions.

Preferred surfactant systems to be used according to the present invention comprise as a surfactant one or more of the nonionic and/or anionic surfactants described herein.

Polyethylene, polypropylene, and polybutylene oxide condensates of alkyl phenols are suitable for use as the nonionic surfactant of the surfactant systems of the present invention, with the polyethylene oxide condensates being preferred. These compounds include the condensation products of alkyl phenols having an alkyl group containing from about 6 to about 14 carbon atoms, preferably from about 8 to about 14 carbon atoms, in either a straight-chain or branched-chain configuration with the alkylene oxide. In a preferred embodiment, the ethylene oxide is present in an amount equal to from about 2 to about 25 moles, more preferably from about 3 to about 15 moles, of ethylene oxide per mole of alkyl phenol. Commercially available nonionic surfactants of this type include Igepal™ CO-630, marketed by the GAF Corporation; and Triton™ X-45, X-114, X-100 and X-102, all marketed by the Rohm & Haas Company. These surfactants are commonly referred to as alkylphenol alkoxylates (e.g., alkyl phenol ethoxylates).

The condensation products of primary and secondary aliphatic alcohols with from about 1 to about 25 moles of ethylene oxide are suitable for use as the nonionic surfactant of the nonionic surfactant systems of the present invention. The alkyl chain of the aliphatic alcohol can either be straight or branched, primary or secondary, and generally contains from about 8 to about 22 carbon atoms. Preferred are the condensation products of alcohols having an alkyl group containing from about 8 to about 20 carbon atoms, more preferably from about 10 to about 18 carbon atoms, with from about 2 to about 10 moles of ethylene oxide per mole of alcohol. About 2 to about 7 moles of ethylene oxide and most preferably from 2 to 5 moles of ethylene oxide per mole of alcohol are present in said condensation products. Examples of commercially available nonionic surfactants of this type include Tergitol™ 15-S-9 (the condensation product of $C_{11}$–$C_{15}$ linear alcohol with 9 moles ethylene oxide), Tergitol™ 24-L-6 NMW (the condensation product of $C_{12}$–$C_{14}$ primary alcohol with 6 moles ethylene oxide with a narrow molecular weight distribution), both marketed by Union Carbide Corporation; Neodol™ 45-9 (the condensation product of $C_{14}$–$C_{15}$ linear alcohol with 9 moles of ethylene oxide), Neodol™ 23-3 (the condensation product of $C_{12}$–$C_{13}$ linear alcohol with 3.0 moles of ethylene oxide), Neodol™ 45-7 (the condensation product of $C_{14}$–$C_{15}$ linear alcohol with 7 moles of ethylene oxide), Neodol™ 45-5 (the condensation product of $C_{14}$–$C_{15}$ linear alcohol with 5 moles of ethylene oxide) marketed by Shell Chemical Company, Kyro™ EOB (the condensation product of $C_{13}$–$C_{15}$ alcohol with 9 moles ethylene oxide), marketed by The Procter & Gamble Company, and Genapol LA O3O or O5O (the condensation product of $C_{12}$–$C_{14}$ alcohol with 3 or 5 moles of ethylene oxide) marketed by Hoechst. Preferred range of HLB in these products is from 8–11 and most preferred from 8–10.

Also useful as the nonionic surfactant of the surfactant systems of the present invention are the alkylpolysaccharides disclosed in U.S. Pat. No. 4,565,647, Llenado, issued Jan. 21, 1986, having a hydrophobic group containing from about 6 to about 30 carbon atoms, preferably from about 10 to about 16 carbon atoms and a polysaccharide, e.g. a polyglycoside, hydrophilic group containing from about 1.3 to about 10, preferably from about 1.3 to about 3, most preferably from about 1.3 to about 2.7 saccharide units. Any reducing saccharide containing 5 or 6 carbon atoms can be used, e.g., glucose, galactose and galactosyl moieties can be substituted for the glucosyl moieties (optionally the hydrophobic group is attached at the 2-, 3-, 4-, etc. positions thus giving a glucose or galactose as opposed to a glucoside or galactoside). The intersaccharide bonds can be, e.g., between the one position of the additional saccharide units and the 2-, 3-, 4-, and/or 6-positions on the preceding saccharide units.

The preferred alkylpolyglycosides have the formula $$R^2O(C_nH_{2n}O)_t(\text{glycosyl})_x$$

wherein $R^2$ is selected from the group consisting of alkyl, alkylphenyl, hydroxyalkyl, hydroxyalkylphenyl, and mixtures thereof in which the alkyl groups contain from about 10 to about 18, preferably from about 12 to about 14, carbon atoms; n is 2 or 3, preferably 2; t is from 0 to about 10, preferably 0; and x is from about 1.3 to about 10, preferably from about 1.3 to about 3, most preferably from about 1.3 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1-position). The additional glycosyl units can then be attached between their 1-position and the preceding glycosyl units 2-, 3-, 4- and/or 6-position, preferably predominately the 2-position.

The condensation products of ethylene oxide with a hydrophobic base formed by the condensation of propylene oxide with propylene glycol are also suitable for use as the additional nonionic surfactant systems of the present invention. The hydrophobic portion of these compounds will preferably have a molecular weight of from about 1500 to about 1800 and will exhibit water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide. Examples of compounds of this type include certain of the commercially-available Plurafac™ LF404 and Pluronic™ surfactants, marketed by BASF.

Also suitable for use as the nonionic surfactant of the nonionic surfactant system of the present invention, are the condensation products of ethylene oxide with the product resulting from the reaction of propylene oxide and ethylenediamine. The hydrophobic moiety of these products consists of the reaction product of ethylenediamine and excess propylene oxide, and generally has a molecular weight of from about 2500 to about 3000. This hydrophobic moiety is condensed with ethylene oxide to the extent that the condensation product contains from about 40% to about 80% by weight of polyoxyethylene and has a molecular weight of from about 5,000 to about 11,000. Examples of this type of nonionic surfactant include certain of the commercially available Tetronic™ compounds, marketed by BASF.

Preferred for use as the nonionic surfactant of the surfactant systems of the present invention are polyethylene oxide condensates of alkyl phenols, condensation products of primary and secondary aliphatic alcohols with from about 1 to about 25 moles of ethylene oxide, alkylpolysaccharides, and mixtures thereof. Most preferred are $C_8$–$C_{14}$ alkyl phenol ethoxylates having from 3 to 15 ethoxy groups and $C_8$–$C_{18}$ alcohol ethoxylates (preferably $C_{10}$ avg.) having from 2 to 10 ethoxy groups, and mixtures thereof.

Highly preferred nonionic surfactants are polyhydroxy fatty acid amide surfactants of the formula.

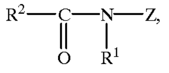

wherein $R^1$ is H, or $R^1$ is $C_{1-4}$ hydrocarbyl, 2-hydroxy ethyl, 2-hydroxy propyl or a mixture thereof, $R^2$ is $C_{5-31}$ hydrocarbyl, and Z is a polyhydroxyhydrocarbyl having a linear hydrocarbyl chain with at least 3 hydroxyls directly connected to the chain, or an alkoxylated derivative thereof. Preferably, $R_1$ is methyl, $R^2$ is a straight $C_{11-15}$ alkyl or $C_{16-18}$ alkyl or alkenyl chain such as coconut alkyl or mixtures thereof, and Z is derived from a reducing sugar such as glucose, fructose, maltose, lactose, in a reductive amination reaction.

Suitable anionic surfactants to be used are linear alkyl benzene sulfonate, alkyl ester sulfonate surfactants including linear esters of $C_8$–$C_{20}$ carboxylic acids (i.e., fatty acids) which are sulfonated with gaseous $SO_3$ according to "The Journal of the American Oil Chemists Society", 52 (1975), pp. 323–329. Suitable starting materials would include natural fatty substances as derived from tallow, palm oil, etc.

The preferred alkyl ester sulfonate surfactant, especially for laundry applications, comprise alkyl ester sulfonate surfactants of the structural formula:

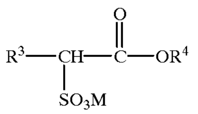

wherein $R^3$ is a $C_8$–$C_{20}$ hydrocarbyl, preferably an alkyl, or combination thereof, $R^4$ is a $C_1$–$C_6$ hydrocarbyl, preferably an alkyl, or combination thereof, and M is a cation which forms a water soluble salt with the alkyl ester sulfonate. Suitable salt-forming cations include metals such as sodium, potassium, and lithium, and substituted or unsubstituted ammonium cations, such as monoethanolamine, diethanolamine, and triethanolamine. Preferably, $R^3$ is $C_{10}$–$C_{16}$ alkyl, and $R^4$ is methyl, ethyl or isopropyl. Especially preferred are the methyl ester sulfonates wherein $R^3$ is $C_{10-C16}$ alkyl.

Other suitable anionic surfactants include the alkyl sulfate surfactants which are water soluble salts or acids of the formula $ROSO_3M$ wherein R preferably is a $C_{10}$–$C_{24}$ hydrocarbyl, preferably an alkyl or hydroxyalkyl having a $C_{10}$–$C_{20}$ alkyl component, more preferably a $C_{12}$–$C_{18}$ alkyl or hydroxyalkyl, and M is H or a cation, e.g., an alkali metal cation (e.g. sodium, potassium, lithium), or ammonium or substituted ammonium (e.g. methyl-, dimethyl-, and trimethyl ammonium cations and quaternary ammonium cations such as tetramethyl-ammonium and dimethyl piperdinium cations and quaternary ammonium cations derived from alkylamines such as ethylamine, diethylamine, triethylamine, and mixtures thereof, and the like). Typically, alkyl chains of $C_{12}$–$C_{16}$ are preferred for lower wash temperatures (e.g. below about 50° C.) and $C_{16-18}$ alkyl chains are preferred for higher wash temperatures (e.g. above about 50° C.).

Other anionic surfactants useful for detersive purposes can also be included in the detergent compositions of the present invention. These can include salts (including, for example, sodium, potassium, ammonium, and substituted ammonium salts such as mono-, di- and triethanolamine salts) of soap, $C_8$–$C_{22}$ primary of secondary alkanesulfonates, $C_8$–$C_{24}$ olefinsulfonates, sulfonated polycarboxylic acids prepared by sulfonation of the pyrolyzed product of alkaline earth metal citrates, e.g., as described in British patent specification No. 1,082,179, $C_8$–$C_{24}$ alkylpolyglycolethersulfates (containing up to 10 moles of ethylene oxide); alkyl glycerol sulfonates, fatty acyl glycerol sulfonates, fatty oleyl glycerol sulfates, alkyl phenol ethylene oxide ether sulfates, paraffin sulfonates, alkyl phosphates, isethionates such as the acyl isethionates, N-acyl taurates, alkyl succinamates and sulfosuccinates, monoesters of sulfosuccinates (especially saturated and unsaturated $C_{12}$–$C_{18}$ monoesters) and diesters of sulfosuccinates (especially saturated and unsaturated $C_6$–$C_{12}$ diesters), acyl sarcosinates, sulfates of alkylpolysaccharides such as the sulfates of alkylpolyglucoside (the nonionic nonsulfated compounds being described below), branched primary alkyl sulfates, and alkyl polyethoxy carboxylates such as those of the formula $RO(CH_2CH_2O)_k$—$CH_2COO$—M+ wherein R is a $C_8$–$C_{22}$ alkyl, k is an integer from 1 to 10, and M is a soluble salt-forming cation. Resin acids and hydrogenated resin acids are also suitable, such as rosin, hydrogenated rosin, and resin acids and hydrogenated resin acids present in or derived from tall oil.

Further examples are described in "Surface Active Agents and Detergents" (Vol. I and II by Schwartz, Perry and Berch). A variety of such surfactants are also generally disclosed in U.S. Pat. No. 3,929,678, issued Dec. 30, 1975 to Laughlin, et al. at Column 23, line 58 through Column 29, line 23 (herein incorporated by reference).

When included therein, the laundry detergent compositions of the present invention typically comprise from about 1% to about 40%, preferably from about 3% to about 20% by weight of such anionic surfactants.

Highly preferred anionic surfactants include alkyl alkoxylated sulfate surfactants hereof are water soluble salts or acids of the formula $RO(A)_m$SO3M wherein R is an unsubstituted $C_{10}$–$C_{24}$ alkyl or hydroxyalkyl group having a $C_{10}$–$C_{24}$ alkyl component preferably a $C_{12}$–$C_{20}$ alkyl or hydroxyalkyl, more preferably $C_{12}$–$C_{18}$ alkyl or hydroxyalkyl, A is an ethoxy or propoxy unit, m is greater than zero, typically between about 0.5 and about 6, more preferably between about 0.5 and about 3, and M is H or a cation which can be, for example, a metal cation (e.g., sodium, potassium, lithium, calcium, magnesium, etc.), ammonium or substituted-ammonium cation. Alkyl ethoxylated sulfates as well as alkyl propoxylated sulfates are contemplated herein. Specific examples of substituted ammonium cations include methyl-, dimethyl, trimethylammonium cations and quaternary ammonium cations such as tetramethyl-ammonium and dimethyl piperdinium cations and those derived from alkylamines such as ethylamine, diethylamine, triethylamine, mixtures thereof, and the like. Exemplary surfactants are $C_{12}$–$C_{18}$ alkyl polyethoxylate (1.0) sulfate ($C_{12}$–$C_{18}$E(1.0)M), $C_{12}$–$C_{18}$ alkyl polyethoxylate (2.25) sulfate ($C_{12}$–$C_{18}$E(2.25)M), $C_{12}$–$C_{18}$ alkyl polyethoxylate (3.0) sulfate ($C_{12}$–$C_{18}$E(3.0)M), and $C_{12}$–$C_{18}$ alkyl polyethoxylate (4.0) sulfate ($C_{12}$–$C_{18}$E(4.0)M), wherein M is conveniently selected from sodium and potassium.

The detergent compositions of the present invention may also contain cationic, ampholytic, zwitterionic, and semi-polar surfactants, as well as the nonionic and/or anionic surfactants other than those already described herein.

Cationic detersive surfactants suitable for use in the detergent compositions of the present invention are those having one long-chain hydrocarbyl group. Examples of such cationic surfactants include the ammonium surfactants such as alkyltrimethylammonium halogenides, and those surfactants having the formula:

$$[R^2(OR^3)_y][R^4(OR^3)_y]_2R^5N+X-$$

wherein $R^2$ is an alkyl or alkyl benzyl group having from about 8 to about 18 carbon atoms in the alkyl chain, each $R^3$ is selected from the group consisting of $—CH_2CH_2—$, $—CH_2CH(CH_3)—$, $—CH_2CH(CH_2OH)—$, $—CH_2CH_2CH_2—$, and mixtures thereof, each $R^4$ is selected from the group consisting of $C_1$–$C_4$ alkyl, $C_1$–$C_4$ hydroxyalkyl, benzyl ring structures formed by joining the two $R^4$ groups, $—CH_2CHOH—CHOHCOR^6CHOHCH_2OH$ wherein $R^6$ is any hexose or hexose polymer having a molecular weight less than about 1000, and hydrogen when y is not 0; $R^5$ is the same as $R^4$ or is an alkyl chain wherein the total number of carbon atoms of $R^2$ plus $R^5$ is not more than about 18; each y is from 0 to about 10 and the sum of the y values is from 0 to about 15; and X is any compatible anion.

Quaternary ammonium surfactant suitable for the present invention has the formula (I):

Formula I

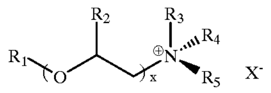

whereby R1 is a short chainlength alkyl (C6–C10) or alkylamidoalkyl of the formula (II):

Formula II

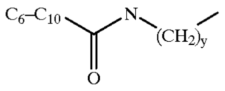

y is 2–4, preferably 3.

whereby R2 is H or a C1–C3 alkyl, whereby x is 0–4, preferably 0–2, most preferably 0, whereby R3, R4 and R5 are either the same or different and can be either a short chain alkyl (C1–C3) or alkoxylated alkyl of the formula III, whereby $X^-$ is a counterion, preferably a halide, e.g. chloride or methylsulfate.

Formula III

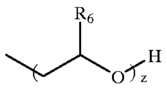

R6 is $C_1$–$C_4$ and z is 1 or 2.

Preferred quat ammonium surfactants are those as defined in formula I whereby $R_1$ is $C_8$, $C_{10}$ or mixtures thereof, x=o, $R_3$, $R_4$=$CH_3$ and $R_5$=$CH_2CH_2OH$.

Highly preferred cationic surfactants are the water-soluble quaternary ammonium compounds useful in the present composition having the formula:

$$R_1R_2R_3R_4N^+X^- \quad (i)$$

wherein $R_1$ is $C_8$–$C_{16}$ alkyl, each of $R_2$, $R_3$ and $R_4$ is independently $C_1$–$C_4$ alkyl, $C_1$–$C_4$ hydroxy alkyl, benzyl, and $—(C_2H_{40})_xH$ where x has a value from 2 to 5, and X is an anion. Not more than one of $R_2$, $R_3$ or $R_4$ should be benzyl.

The preferred alkyl chain length for $R_1$ is $C_{12}$–$C_{15}$ particularly where the alkyl group is a mixture of chain lengths derived from coconut or palm kernel fat or is derived synthetically by olefin build up or OXO alcohols synthesis. Preferred groups for $R_2R_3$ and $R_4$ are methyl and hydroxyethyl groups and the anion X may be selected from halide, methosulphate, acetate and phosphate ions.

Examples of suitable quaternary ammonium compounds of formulae (i) for use herein are:

coconut trimethyl ammonium chloride or bromide;

coconut methyl dihydroxyethyl ammonium chloride or bromide;

decyl triethyl ammonium chloride;

decyl dimethyl hydroxyethyl ammonium chloride or bromide;

$C_{12-15}$ dimethyl hydroxyethyl ammonium chloride or bromide;

coconut dimethyl hydroxyethyl ammonium chloride or bromide;

myristyl trimethyl ammonium methyl sulphate;

lauryl dimethyl benzyl ammonium chloride or bromide;

lauryl dimethyl(ethenoxy)$_4$ammonium chloride or bromide;

choline esters (compounds of formula (i) wherein $R_1$ is

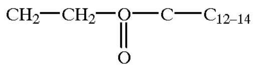 alkyl and $R_2R_3R_4$ are methyl).

di-alkyl imidazolines [compounds of formula (i)].

Other cationic surfactants useful herein are also described in U.S. Pat. No. 4,228,044, Cambre, issued Oct. 14, 1980 and in European Patent Application EP 000,224.

Typical cationic fabric softening components include the water-insoluble quaternary-ammonium fabric softening actives or thei corresponding amine precursor, the most commonly used having been di-long alkyl chain ammonium chloride or methyl sulfate. Preferred cationic softeners among these include the following:

1) ditallow dimethylammonium chloride (DTDMAC);
2) dihydrogenated tallow dimethylammonium chloride;
3) dihydrogenated tallow dimethylammonium methylsulfate;
4) distearyl dimethylammonium chloride;
5) dioleyl dimethylammonium chloride;
6) dipalmityl hydroxyethyl methylammonium chloride;
7) stearyl benzyl dimethylammonium chloride;
8) tallow trimethylammonium chloride;
9) hydrogenated tallow trimethylammonium chloride;
10) $C_{12-14}$ alkyl hydroxyethyl dimethylammonium chloride;
11) $C_{12-18}$ alkyl dihydroxyethyl methylammonium chloride;
12) di(stearoyloxyethyl)dimethylammonium chloride (DSOEDMAC);
13) di(tallow-oxy-ethyl)dimethylammonium chloride;

14) ditallow imidazolinium methylsulfate;

15) 1-(2-tallowylamidoethyl)-2-tallowyl imidazolinium methylsulfate.

Biodegradable quaternary ammonium compounds have been presented as alternatives to the traditionally used di-long alkyl chain ammonium chlorides and methyl sulfates. Such quaternary ammonium compounds contain long chain alk(en)yl groups interrupted by functional groups such as carboxy groups. Said materials and fabric softening compositions containing them are disclosed in numerous publications such as EP-A-0,040,562, and EP-A-0,239,910.

The quaternary ammonium compounds and amine precursors herein have the formula (I) or (II), below:

(I)

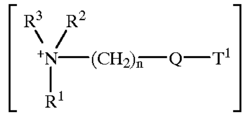

$X^-$ or (II)

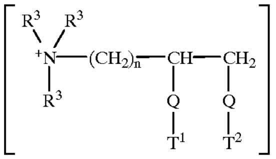

$X^-$ wherein Q is selected from —O—C(O)—, —C(O)—O—, —O—C(O)—O—, —$NR^4$—C(O)—, —C(O)—$NR^4$—;

$R^1$ is $(CH_2)_n$—Q—$T^2$ or $T^3$;

$R^2$ is $(CH_2)_m$—Q—$T^4$ or $T^5$ or $R^3$;

$R^3$ is $C_1$–$C_4$ alkyl or $C_1$–$C_4$ hydroxyalkyl or H;

$R^4$ is H or $C_1$–$C_4$ alkyl or $C_1$–$C_4$ hydroxyalkyl;

$T^1$, $T^2$, $T^3$, $T^4$, $T^5$ are independently $C_{11}$–$C_{22}$ alkyl or alkenyl;

n and m are integers from 1 to 4; and $X^-$ is a softener-compatible anion. Non-limiting examples of softener-compatible anions include chloride or methyl sulfate.

The alkyl, or alkenyl, chain $T^1$, $T^2$, $T^3$, $T^4$, $T^5$ must contain at least 11 carbon atoms, preferably at least 16 carbon atoms. The chain may be straight or branched. Tallow is a convenient and inexpensive source of long chain alkyl and alkenyl material. The compounds wherein $T^1$, $T^2$, $T^3$, $T^4$, $T^5$ represents the mixture of long chain materials typical for tallow are particularly preferred.

Specific examples of quaternary ammonium compounds suitable for use in the aqueous fabric softening compositions herein include:

1) N,N-di(tallowyl-oxy-ethyl)-N,N-dimethyl ammonium chloride;

2) N,N-di(tallowyl-oxy-ethyl)-N-methyl, N-(2-hydroxyethyl)ammonium methyl sulfate;

3) N,N-di(2-tallowl-oxy-2-oxo-ethyl)-N,N-dimethyl ammonium chloride;

4) N,N-di(2-tallowyl-oxy-ethylcarbony-oxy-ethyl)-N,N-dimethyl ammonium chloride;

5) N-(2-tallowyl-oxy-2-ethyl)-N-(2-tallowyl-oxy-2-oxo-ethyl)-N,N-dimethyl ammonium chloride;

6) N,N,N-tri(tallowyl-oxy-ethyl)-N-methyl ammonium chloride;

7) N-(2-tallowyl-oxy-2-oxo-ethyl)-N-(tallowyl-N,N-dimethyl-ammonium chloride; and 8) 1,2-ditallowyl-oxy-3-trimethylammoniopropane chloride;

and mixtures of any of the above materials.

When included therein, the detergent compositions of the present invention typically comprise from 0.2% to about 25%, preferably from about 1% to about 8% by weight of such cationic surfactants.

Ampholytic surfactants are also suitable for use in the detergent compositions of the present invention. These surfactants can be broadly described as aliphatic derivatives of secondary or tertiary amines, or aliphatic derivatives of heterocyclic secondary and tertiary amines in which the aliphatic radical can be straight- or branched-chain. One of the aliphatic substituents contains at least about 8 carbon atoms, typically from about 8 to about 18 carbon atoms, and at least one contains an anionic water-solubilizing group, e.g. carboxy, sulfonate, sulfate. See U.S. Pat. No. 3,929,678 to Laughlin et al., issued Dec. 30, 1975 at column 19, lines 18–35, for examples of ampholytic surfactants.

When included therein, the detergent compositions of the present invention typically comprise from 0.2% to about 15%, preferably from about 1% to about 10% by weight of such ampholytic surfactants.

Zwitterionic surfactants are also suitable for use in detergent compositions. These surfactants can be broadly described as derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48, for examples of zwitterionic surfactants.

When included therein, the detergent compositions of the present invention typically comprise from 0.2% to about 15%, preferably from about 1% to about 10% by weight of such zwitterionic surfactants.

Semi-polar nonionic surfactants are a special category of nonionic surfactants which include water-soluble amine oxides containing one alkyl moiety of from about 10 to about 18 carbon atoms and 2 moieties selected from the group consisting of alkyl groups and hydroxyalkyl groups containing from about 1 to about 3 carbon atoms; water-soluble phosphine oxides containing one alkyl moiety of from about 10 to about 18 carbon atoms and 2 moieties selected from the group consisting of alkyl groups and hydroxyalkyl groups containing from about 1 to about 3 carbon atoms; and water-soluble sulfoxides containing one alkyl moiety of from about 10 to about 18 carbon atoms and a moiety selected from the group consisting of alkyl and hydroxyalkyl moieties of from about 1 to about 3 carbon atoms.

Semi-polar nonionic detergent surfactants include the amine oxide surfactants having the formula

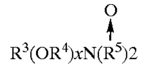

wherein $R^3$ is an alkyl, hydroxyalkyl, or alkyl phenyl group or mixtures therof containing from about 8 to about 22 carbon atoms; $R^4$ is an alkylene or hydroxyalkylene group containing from about 2 to about 3 carbon atoms or mixtures thereof; x is from 0 to about 3; and each $R^5$ is an alkyl or hydroxyalkyl group containing from about 1 to about 3 carbon atoms or a polyethylene oxide group containing from about 1 to about 3 ethylene oxide groups. The $R^5$ groups can be attached to each other, e.g., through an oxygen or nitrogen atom, to form a ring structure.

These amine oxide surfactants in particular include $C_{10}$–$C_{18}$ alkyl dimethyl amine oxides and $C_8$–$C_{12}$ alkoxy ethyl dihydroxy ethyl amine oxides.

When included therein, the cleaning compositions of the present invention typically comprise from 0.2% to about 15%, preferably from about 1% to about 10% by weight of such semi-polar nonionic surfactants.

The detergent composition of the present invention may further comprise a cosurfactant selected from the group of primary or tertiary amines.

Suitable primary amines for use herein include amines according to the formula $R_1NH_2$ wherein $R_1$ is a $C_6$–$C_{12}$, preferably $C_6$–$C_{10}$ alkyl chain or $R_4X(CH_2)_n$, X is —O—, —C(O)NH— or —NH—, $R_4$ is a $C_6$–$C_{12}$ alkyl chain n is between 1 to 5, preferably 3. $R_1$ alkyl chains may be straight or branched and may be interrupted with up to 12, preferably less than 5 ethylene oxide moieties.

Preferred amines according to the formula herein above are n-alkyl amines. Suitable amines for use herein may be selected from 1-hexylamine, 1-octylamine, 1-decylamine and laurylamine. Other preferred primary amines include C8–C10 oxypropylamine, octyloxypropylamine, 2-ethylhexyl-oxypropylamine, lauryl amido propylamine and amido propylamine.

Suitable tertiary amines for use herein include tertiary amines having the formula $R_1R_2R_3N$ wherein R1 and R2 are $C_1$–$C_8$ alkylchains or

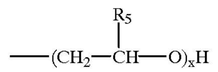

$R_3$ is either a $C_6$–$C_{12}$, preferably $C_6$–$C_{10}$ alkyl chain, or $R_3$ is $R_4X(CH_2)_n$, whereby X is —O—, —C(O)NH— or —NH—, $R_4$ is a $C_4$–$C_{12}$, n is between 1 to 5, preferably 2–3. $R_5$ is H or $C_1$–$C_2$ alkyl and x is between 1 to 6.

$R_3$ and $R_4$ may be linear or branched; $R_3$ alkyl chains may be interrupted with up to 12, preferably less than 5, ethylene oxide moieties.

Preferred tertiary amines are $R_1R_2R_3N$ where R1 is a C6–C12 alkyl chain, R2 and R3 are C1–C3 alkyl or

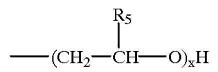

where R5 is H or CH3 and x=1–2.

Also preferred are the amidoamines of the formula:

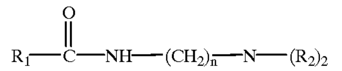

wherein $R_1$ is $C_6$–$C_{12}$ alkyl; n is 2–4, preferably n is 3; $R_2$ and $R_3$ is $C_1$–$C_4$ Most preferred amines of the present invention include 1-octylamine, 1-hexylamine, 1-decylamine, 1-dodecylamine,C8–10oxypropylamine, N coco 1-3diaminopropane, coconutalkyldimethylamine, lauryldimethylamine, lauryl bis(hydroxyethyl)amine, coco bis(hydroxyehtyl)amine, lauryl amine 2 moles propoxylated, octyl amine 2 moles propoxylated, lauryl amidopropyl-dimethylamine, C8–10 amidopropyldimethylamine and C10 amidopropyl-dimethylamine.

The most preferred amines for use in the compositions herein are 1-hexylamine, 1-octylamine, 1-decylamine, 1-dodecylamine. Especially desirable are n-dodecyldimethylamine and bishydroxyethylcoconutalkylamine and oleylamine 7 times ethoxylated, lauryl amido propylamine and cocoamido propylamine.

Other Bleach System

In addition to the hydrophobic bleach activator and the conventional source of hydrogen peroxide, the detergent compositions of the present invention may further comprise other bleaching species.

Other suitable bleach activators are tetraacetylethylenediamine (TAED) or pentaacetylglucose (PAG), which are perhydrolyzed to form a peracid as the active bleaching species, leading to improved bleaching effect. Also suitable activators are acylated citrate esters such as disclosed in Co-pending European Patent Application No. 91870207.7.

Other bleaching ingredients encompasses percarboxylic acid bleaching agents and salts thereof. Suitable examples of this class of agents include magnesium monoperoxyphthalate hexahydrate, the magnesium salt of meta-chloro perbenzoic acid, 4-nonylamino-4-oxoperoxybutyric acid and diperoxydodecanedioic acid. Such bleaching agents are disclosed in U.S. Pat. No. 4,483,781, U.S. patent application 740,446, European Patent Application 0,133,354 and U.S. Pat. No. 4,412,934. Highly preferred bleaching agents also include 6-nonylamino-6-oxoperoxycaproic acid as described in U.S. Pat. No. 4,634,551.

Another category of bleaching agents that can be used encompasses the halogen bleaching agents. Examples of hypohalite bleaching agents, for example, include trichloro isocyanuric acid and the sodium and potassium dichloroisocyanurates and N-chloro and N-bromo alkane sulphonamides. Such materials are normally added at 0.5–10% by weight of the finished product, preferably 1–5% by weight.

Metal-containing catalysts for use in bleach compositions, include cobalt-containing catalysts such as Pentaamine acetate cobalt(III) salts and manganese-containing catalysts such as those described in EPA 549 271; EPA 549 272; EPA 458 397; U.S. Pat. No. 5,246,621; EPA 458 398; U.S. Pat. No. 5,194,416 and U.S. Pat. No. 5,114,611. Bleaching composition comprising a peroxy compound, a manganese-containing bleach catalyst and a chelating agent is described in the patent application Ser. No. 94870206.3. Transition metal complexes of macropolycyclic rigid ligands are preferred metal-containing catalysts for the purpose of the present invention and are described in the Procter & Gamble co-pending patent applications filed on Mar. 7, 1997 under the U.S. Ser. No. 60/040,629; U.S. Ser. No. 60/039,915; U.S. Ser. No. 60/040,222; U.S. Ser. No. 60/040,156; U.S. Ser. No. 60/040,115; U.S. Ser. No. 60/038, 714 and U.S. Ser. No. 60/039,920.

Bleaching agents other than oxygen bleaching agents are also known in the art and can be utilized herein. One type of non-oxygen bleaching agent of particular interest includes photoactivated bleaching agents such as the sulfonated zinc and/or aluminum phthalocyanines. These materials can be deposited upon the substrate during the washing process. Upon irradiation with light, in the presence of oxygen, such as by hanging clothes out to dry in the daylight, the sulfonated zinc phthalocyanine is activated and, consequently, the substrate is bleached. Preferred zinc phthalocyanine and a photoactivated bleaching process are described in U.S. Pat. No. 4,033,718. Typically, detergent compositions will contain about 0.025% to about 1.25%, by weight, of sulfonated zinc phthalocyanine.

Useful bleaching agents, including peroxyacids and bleaching systems comprising bleach activators and peroxygen bleaching compounds for use in detergent compositions according to the invention are described in our co-pending applications WO95/27772, WO95/27774 and WO95/27775.

Builder System

The detergent compositions of the present invention can further comprise a builder. Any conventional builder system is suitable for use herein including aluminosilicate materials, silicates, polycarboxylates, alkyl- or alkenyl-succinic acid and fatty acids, materials such as ethylenediamine tetraacetate, diethylene triamine pentamethyleneacetate, metal ion sequestrants such as aminopolyphosphonates, particularly ethylenediamine tetramethylene phosphonic acid and diethylene triamine pentamethylenephosphonic acid. Phosphate builders can also be used herein.

Suitable builders can be an inorganic ion exchange material, commonly an inorganic hydrated aluminosilicate material, more particularly a hydrated synthetic zeolite such as hydrated zeolite A, X, B, HS or MAP.

Another suitable inorganic builder material is layered silicate, e.g. SKS-6 (Hoechst). SKS-6 is a crystalline layered silicate consisting of sodium silicate ($Na_2Si_2O_5$).

Suitable polycarboxylates containing one carboxy group include lactic acid, glycolic acid and ether derivatives thereof as disclosed in Belgian Patent Nos. 831,368, 821,369 and 821,370. Polycarboxylates containing two carboxy groups include the water-soluble salts of succinic acid, malonic acid, (ethylenedioxy) diacetic acid, maleic acid, diglycollic acid, tartaric acid, tartronic acid and fumaric acid, as well as the ether carboxylates described in German Offenlegenschrift 2,446,686, and 2,446,687 and U.S. Pat. No. 3,935,257 and the sulfinyl carboxylates described in Belgian Patent No. 840,623. Polycarboxylates containing three carboxy groups include, in particular, water-soluble citrates, aconitrates and citraconates as well as succinate derivatives such as the carboxymethyloxysuccinates described in British Patent No. 1,379,241, lactoxysuccinates described in Netherlands Application 7205873, and the oxypolycarboxylate materials such as 2-oxa-1,1,3-propane tricarboxylates described in British Patent No. 1,387,447.

Polycarboxylates containing four carboxy groups include oxydisuccinates disclosed in British Patent No. 1,261,829, 1,1,2,2-ethane tetracarboxylates, 1,1,3,3-propane tetracarboxylates and 1,1,2,3-propane tetracarboxylates. Polycarboxylates containing sulfo substituAnts include the sulfosuccinate derivatives disclosed in British Patent Nos. 1,398,421 and 1,398,422 and in U.S. Pat. No. 3,936,448, and the sulfonated pyrolysed citrates described in British Patent No. 1,082,179, while polycarboxylates containing phosphone substituents are disclosed in British Patent No. 1,439,000.

Alicyclic and heterocyclic polycarboxylates include cyclopentane-cis,cis,cis-tetracarboxylates, cyclopentadienide pentacarboxylates, 2,3,4,5-tetrahydro-furan-cis,cis,cis-tetracarboxylates, 2,5-tetrahydro-furan-cis-dicarboxylates, 2,2,5,5-tetrahydrofuran-tetracarboxylates, 1,2,3,4,5,6-hexane-hexacar-boxylates and and carboxymethyl derivatives of polyhydric alcohols such as sorbitol, mannitol and xylitol. Aromatic poly-carboxylates include mellitic acid, pyromellitic acid and the phthalic acid derivatives disclosed in British Patent No. 1,425,343.

Of the above, the preferred polycarboxylates are hydroxycarboxylates containing up to three carboxy groups per molecule, more particularly citrates.

Preferred builder systems for use in the present compositions include a mixture of a water-insoluble aluminosilicate builder such as zeolite A or of a layered silicate (SKS-6), and a water-soluble carboxylate chelating agent such as citric acid. Other preferred builder systems include a mixture of a water-insoluble aluminosilicate builder such as zeolite A, and a watersoluble carboxylate chelating agent such as citric acid. Preferred builder systems for use in liquid detergent compositions of the present invention are soaps and polycarboxylates.

Other builder materials that can form part of the builder system for use in granular compositions include inorganic materials such as alkali metal carbonates, bicarbonates, silicates, and organic materials such as the organic phosphonates, amino polyalkylene phosphonates and amino polycarboxylates.

Other suitable water-soluble organic salts are the homo- or co-polymeric acids or their salts, in which the polycarboxylic acid comprises at least two carboxyl radicals separated from each other by not more than two carbon atoms. Polymers of this type are disclosed in GB-A-1,596,756. Examples of such salts are polyacrylates of MW 2000–5000 and their copolymers with maleic anhydride, such copolymers having a molecular weight of from 20,000 to 70,000, especially about 40,000.

Detergency builder salts are normally included in amounts of from 5% to 80% by weight of the composition preferably from 10% to 70% and most usually from 30% to 60% by weight.

Conventional Detergent Enzymes

The detergent compositions can in addition to the mannanase enzyme further comprise one or more enzymes which provide cleaning performance, fabric care and/or sanitisation benefits.

Said enzymes include enzymes selected from cellulases, hemicellulases, peroxidases, proteases, gluco-amylases, amylases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase or mixtures thereof.

A preferred combination is a detergent composition having cocktail of conventional applicable enzymes like protease, amylase, lipase, cutinase and/or cellulase in conjunction with one or more plant cell wall degrading enzymes.

Suitable proteases are the subtilisins which are obtained from particular strains of *B. subtilis* and *B. licheniformis* (subtilisin BPN and BPN'). One suitable protease is obtained from a strain of Bacillus, having maximum activity throughout the pH range of 8–12, developed and sold as ESPERASE® by Novo Industries A/S of Denmark, hereinafter "Novo". The preparation of this enzyme and analogous enzymes is described in GB 1,243,784 to Novo. Other suitable proteases include ALCALASE®, DURAZYM® and SAVINASE® from Novo and MAXATASE®, MAXACAL®, PROPERASE® and MAXAPEM® (protein engineered Maxacal) from Gist-Brocades. Proteolytic enzymes also encompass modified bacterial serine proteases, such as those described in European Patent Application Serial Number 87 303761.8, filed Apr. 28, 1987 (particularly pages 17, 24 and 98), and which is called herein "Protease B", and in European Patent Application 199,404, Venegas, published Oct. 29, 1986, which refers to a modified bacterial serine protealytic enzyme which is called "Protease A" herein. Suitable is the protease called herein "Protease C", which is a variant of an alkaline serine protease from Bacillus in which lysine replaced arginine at position 27, tyrosine replaced valine at position 104, serine replaced asparagine at position 123, and alanine replaced threonine at position 274. Protease C is described in EP 90915958:4, corresponding to WO 91/06637, Published May 16, 1991.

Genetically modified variants, particularly of Protease C, are also included herein.

A preferred protease referred to as "Protease D" is a carbonyl hydrolase variant having an amino acid sequence not found in nature, which is derived from a precursor carbonyl hydrolase by substituting a different amino acid for a plurality of amino acid residues at a position in said carbonyl hydrolase equivalent to position +76, preferably also in combination with one or more amino acid residue positions equivalent to those selected from the group consisting of +99, +101, +103, +104, +107, +123, +27, +105, +109, +126, +128, +135, +156, +166, +195, +197, +204, +206, +210, +216, +217, +218, +222, +260, +265, and/or +274 according to the numbering of *Bacillus amyloliquefaciens* subtilisin, as described in WO95/10591 and in the patent application of C. Ghosh, et al, "Bleaching Compositions Comprising Protease Enzymes" having U.S. Ser. No. 08/322,677, filed Oct. 13, 1994. Also suitable is a carbonyl hydrolase variant of the protease described in WO95/10591, having an amino acid sequence derived by replacement of a plurality of amino acid residues replaced in the precursor enzyme corresponding to position +210 in combination with one or more of the following residues: +33, +62, +67, +76, +100, +101, +101, +103, +104, +107, +128, +129, +130, +132, +135, +156, +158, +164, +166, +167, +170, +209, +215, +217, +218, and +222, where the numbered position corresponds to naturally-occurring subtilisin from *Bacillus amyloliquefaciens* or to equivalent amino acid residues in other carbonyl hydrolases or subtilisins, such as *Bacillus lentus* subtilisin (co-pending patent application U.S. Ser. No. 60/048,550, filed Jun. 4, 1997).

Also suitable for the present invention are proteases described in patent applications EP 251 446 and WO 91/06637, protease BLAP® described in WO91/02792 and their variants described in WO 95/23221.

See also a high pH protease from Bacillus sp. NCIMB 40338 described in WO 93/18140 A to Novo. Enzymatic detergents comprising protease, one or more other enzymes, and a reversible protease inhibitor are described in WO 92/03529 A to Novo. When desired, a protease having decreased adsorption and increased hydrolysis is available as described in WO 95/07791 to Procter & Gamble. A recombinant trypsin-like protease for detergents suitable herein is described in WO 94/25583 to Novo. Other suitable proteases are described in EP 516 200 by Unilever.

The proteolytic enzymes are incorporated in the detergent compositions of the present invention a level of from 0.0001% to 2%, preferably from 0.001% to 0.2%, more preferably from 0.005% to 0.1% pure enzyme by weight of the composition.

The cellulases usable in the present invention include both bacterial or fungal cellulases. Preferably, they will have a pH optimum of between 5 and 12 and a specific activity above 50 CEVU/mg (Cellulose Viscosity Unit). Suitable cellulases are disclosed in U.S. Pat. No. 4,435,307, Barbesgoard et al, J61078384 and WO96/02653 which discloses fungal cellulase produced respectively from *Humicola insolens*, Trichoderma, Thielavia and Sporotrichum. EP 739 982 describes cellulases isolated from novel Bacillus species. Suitable cellulases are also disclosed in GB-A-2.075.028; GB-A-2.095.275; DE-OS-2.247.832 and WO95/26398.

Examples of such cellulases are cellulases produced by a strain of Humicola insolens (*Humicola grisea* var. *thermoidea*), particularly the Humicola strain DSM 1800.

Other suitable cellulases are cellulases originated from *Humicola insolens* having a molecular weight of about 50 KDa, an isoelectric point of 5.5 and containing 415 amino acids; and a ~43 kD endoglucanase derived from *Humicola insolens*, DSM 1800, exhibiting cellulase activity; a preferred endoglucanase component has the amino acid sequence disclosed in PCT Patent Application No. WO 91/17243. Also suitable cellulases are the EGIII cellulases from *Trichoderma longibrachiatum* described in WO94/21801, Genencor, published Sep. 29, 1994. Especially suitable cellulases are the cellulases having color care benefits. Examples of such cellulases are cellulases described in European patent application No. 91202879.2, filed Nov. 6, 1991 (Novo). Carezyme and Celluzyme (Novo Nordisk A/S) are especially useful. See also WO91/17244 and WO91/21801. Other suitable cellulases for fabric care and/or cleaning properties are described in WO96/34092, WO96/17994 and WO95/24471.

Said cellulases are normally incorporated in the detergent composition at levels from 0.0001% to 2% of pure enzyme by weight of the detergent composition.

Peroxidase enzymes are used in combination with oxygen sources, e.g. percarbonate, perborate, persulfate, hydrogen peroxide, etc and with a phenolic substrate as bleach enhancing molecule. They are used for "solution bleaching", i.e. to prevent transfer of dyes or pigments removed from substrates during wash operations to other substrates in the wash solution. Peroxidase enzymes are known in the art, and include, for example, horseradish peroxidase, ligninase and haloperoxidase such as chloro- and bromo-peroxidase. Peroxidase-containing detergent compositions are disclosed, for example, in PCT International Application WO 89/099813, WO89/09813 and in European Patent application EP No. 91202882.6, filed on Nov. 6, 1991 and EP No. 96870013.8, filed Feb. 20, 1996. Also suitable is the laccase enzyme.

Enhancers are generally comprised at a level of from 0.1% to 5% by weight of total composition. Preferred enhancers are substitued phenthiazine and phenoxasine 10-Phenothiazinepropionicacid (PPT), 10-ethylphenothiazine-4-carboxylic acid (EPC), 10-phenoxazinepropionic acid (POP) and 10-methylphenoxazine (described in WO 94/12621) and substitued syringates (C3–C5 substitued alkyl syringates) and phenols. Sodium percarbonate or perborate are preferred sources of hydrogen peroxide.

Said peroxidases are normally incorporated in the detergent composition at levels from 0.0001% to 2% of pure enzyme by weight of the detergent composition.

Other preferred enzymes that can be included in the detergent compositions of the present invention include lipases. Suitable lipase enzymes for detergent usage include those produced by microorganisms of the Pseudomonas group, such as *Pseudomonas stutzeri* ATCC 19.154, as disclosed in British Pat. No. 1,372,034. Suitable lipases include those which show a positive immunological cross-reaction with the antibody of the lipase, produced by the microorganism *Pseudomonas fluorescent* IAM 1057. This lipase is available from Amano Pharmaceutical Co. Ltd., Nagoya, Japan, under the trade name Lipase P "Amano," hereinafter referred to as "Amano-P". Other suitable commercial lipases include Amano-CES, lipases ex *Chromobacter viscosum*, e.g. *Chromobacter viscosum* var. *lipolyticum* NRRLB 3673 from Toyo Jozo Co., Tagata, Japan; *Chromobacter viscosum* lipases from U.S. Biochemical Corp., U.S.A. and Disoynth Co., The Netherlands, and lipases ex *Pseudomonas gladioli*. Especially suitable lipases are lipases such as M1 Lipase® and Lipomax® (Gist-Brocades) and Lipolase® and Lipolase Ultra® (Novo) which have found to be very effective when used in combination with the compositions of the present invention. Also suitables are the lipolytic enzymes described in EP 258 068, WO 92/05249 and WO 95/22615 by Novo Nordisk and in WO 94/03578, WO 95/35381 and WO 96/00292 by Unilever.

Also suitable are cutinases [EC 3.1.1.50] which can be considered as a special kind of lipase, namely lipases which do not require interfacial activation. Addition of cutinases to detergent compositions have been described in e.g. WO-A-88/09367 (Genencor); WO 90/09446 (Plant Genetic System) and WO 94/14963 and WO 94/14964 (Unilever).

The lipases and/or cutinases are normally incorporated in the detergent composition at levels from 0.0001% to 2% of pure enzyme by weight of the detergent composition.

Amylases ($\alpha$ and/or $\beta$) can be included for removal of carbohydrate-based stains. WO94/02597, Novo Nordisk A/S published Feb. 3, 1994, describes detergent compositions which incorporate mutant amylases. See also WO95/10603, Novo Nordisk A/S, published Apr. 20, 1995. Other amylases known for use in detergent compositions include both $\alpha$- and $\beta$-amylases. $\alpha$-Amylases are known in the art and include those disclosed in U.S. Pat. No. 5,003,257; EP 252,666; WO/91/00353; FR 2,676,456; EP 285,123; EP 525,610; EP 368,341; and British Patent specification no. 1,296,839 (Novo). Other suitable amylases are stability-enhanced amylases described in WO94/18314, published Aug. 18, 1994 and WO96/05295, Genencor, published Feb. 22, 1996 and amylase variants having additional modification in the immediate parent available from Novo Nordisk A/S, disclosed in WO 95/10603, published April 95. Also suitable are amylases described in EP 277 216, WO95/26397 and WO96/23873 (all by Novo Nordisk).

Examples of commercial a-amylases products are Purafect Ox Am® from Genencor and Termamyl®, Ban®, Fungamyl® and Duramyl®, all available from Novo Nordisk A/S Denmark. WO95/26397 describes other suitable amylases: $\alpha$-amylases characterised by having a specific activity at least 25% higher than the specific activity of Termamyl® at a temperature range of 25° C. to 55° C. and at a pH value in the range of 8 to 10, measured by the Phadebas® $\alpha$-amylase activity assay. Suitable are variants of the above enzymes, described in WO96/23873 (Novo Nordisk). Other amylolytic enzymes with improved properties with respect to the activity level and the combination of thermostability and a higher activity level are described in WO95/35382.

The amylolytic enzymes are incorporated in the detergent compositions of the present invention a level of from 0.0001% to 2%, preferably from 0.00018% to 0.06%, more preferably from 0.00024% to 0.048% pure enzyme by weight of the composition.

The above-mentioned enzymes may be of any suitable origin, such as vegetable, animal, bacterial, fungal and yeast origin. Origin can further be mesophilic or extremophilic (psychrophilic, psychrotrophic, thermophilic, barophilic, alkalophilic, acidophilic, halophilic, etc.). Purified or non-purified forms of these enzymes may be used. Nowadays, it is common practice to modify wild-type enzymes via protein/genetic engineering techniques in order to optimise their performance efficiency in the detergent compositions of the invention. For example, the variants may be designed such that the compatibility of the enzyme to commonly encountered ingredients of such compositions is increased. Alternatively, the variant may be designed such that the optimal pH, bleach or chelant stability, catalytic activity and the like, of the enzyme variant is tailored to suit the particular cleaning application.

In particular, attention should be focused on amino acids sensitive to oxidation in the case of bleach stability and on surface charges for the surfactant compatibility. The isoelectric point of such enzymes may be modified by the substitution of some charged amino acids, e.g. an increase in isoelectric point may help to improve compatibility with anionic surfactants. The stability of the enzymes may be further enhanced by the creation of e.g. additional salt bridges and enforcing calcium binding sites to increase chelant stability. Special attention must be paid to the cellulases as most of the cellulases have separate binding domains (CBD). Properties of such enzymes can be altered by modifications in these domains.

Said enzymes are normally incorporated in the detergent composition at levels from 0.0001% to 2% of pure enzyme by weight of the detergent composition. The enzymes can be added as separate single ingredients (prills, granulates, stabilized liquids, etc . . . containing one enzyme) or as mixtures of two or more enzymes (e.g. cogranulates).

Other suitable detergent ingredients that can be added are enzyme oxidation scavengers which are described in co-pending European Patent application 92870018.6 filed on Jan. 31, 1992. Examples of such enzyme oxidation scavengers are ethoxylated tetraethylene polyamines.

A range of enzyme materials and means for their incorporation into synthetic detergent compositions is also disclosed in WO 9307263 A and WO 9307260 A to Genencor International, WO 8908694 A to Novo, and U.S. Pat. No. 3,553,139, Jan. 5, 1971 to McCarty et al. Enzymes are further disclosed in U.S. Pat. No. 4,101,457, Place et al, Jul. 18, 1978, and in U.S. Pat. No. 4,507,219, Hughes, Mar. 26, 1985. Enzyme materials useful for liquid detergent formulations, and their incorporation into such formulations, are disclosed in U.S. Pat. No. 4,261,868, Hora et al, Apr. 14, 1981. Enzymes for use in detergents can be stabilised by various techniques. Enzyme stabilisation techniques are disclosed and exemplified in U.S. Pat. No. 3,600,319, Aug. 17, 1971, Gedge et al, EP 199,405 and EP 200,586, Oct. 29, 1986, Venegas. Enzyme stabilisation systems are also described, for example, in U.S. Pat. No. 3,519,570. A useful Bacillus, sp. AC13 giving proteases, xylanases and cellulases, is described in WO 9401532 A to Novo.

Color Care and Fabric Care Benefits

Technologies which provide a type of color care benefit can also be included. Examples of these technologies are metallo catalysts for color maintenance. Such metallo catalysts are described in co-pending European Patent Application No. 92870181.2. Dye fixing agents, polyolefin dispersion for anti-wrinkles and improved water absorbancy, perfume and amino-functional polymer (PCT/US97/16546) for color care treatment and perfume substantivity are further examples of color care/fabric care technologies and are described in the co-pending Patent Application No. 96870140.9, filed Nov. 7, 1996.

Fabric softening agents can also be incorporated into detergent compositions in accordance with the present invention. These agents may be inorganic or organic in type. Inorganic softening agents are exemplified by the smectite clays disclosed in GB-A-1 400 898 and in U.S. Pat. No. 5,019,292. Organic fabric softening agents include the water insoluble tertiary amines as disclosed in GB-A1 514 276 and EP-B0 011 340 and their combination with mono C12–C14 quaternary ammonium salts are disclosed in EP-B-0 026 527 and EP-B-0 026 528 and di-long-chain amides as disclosed in EP-B-0 242 919. Other useful organic ingredients of fabric softening systems include high molecular weight polyethylene oxide materials as disclosed in EP-A-0 299 575 and 0 313 146.

Levels of smectite clay are normally in the range from 2% to 20%, more preferably from 5% to 15% by weight, with the material being added as a dry mixed component to the remainder of the formulation. Organic fabric softening agents such as the water-insoluble tertiary amines or dilong chain amide materials are incorporated at levels of from 0.5% to 5% by weight, normally from 1% to 3% by weight whilst the high molecular weight polyethylene oxide materials and the water soluble cationic materials are added at levels of from 0.1% to 2%, normally from 0.15% to 1.5% by weight. These materials are normally added to the spray dried portion of the composition, although in some instances it may be more convenient to add them as a dry mixed particulate, or spray them as molten liquid on to other solid components of the composition.

Chelating Agents

Preferably, the detergent compositions herein will further comprise one or more iron and/or manganese chelating agents. It has been surprisingly found that such compositions further comprising a chelating agent, provide better cleaning and whitening performance.

Such chelating agents can be selected from the group consisting of amino carboxylates, amino phosphonates, polyfunctionally-substituted aromatic chelating agents and mixtures therein, all as hereinafter defined. Without intending to be bound by theory, it is believed that the benefit of these materials is due in part to their exceptional ability to remove iron and manganese ions from washing solutions by formation of soluble chelates.

Amino carboxylates useful as optional chelating agents include ethylenediaminetetracetates, N-hydroxyethylethylenediaminetriacetates, nitrilotriacetates, ethylenediamine tetraproprionates, triethylenetetra-aminehexacetates, diethylenetriaminepentaacetates, and ethanoldiglycines, alkali metal, ammonium, and substituted ammonium salts therein and mixtures therein.

Amino phosphonates are also suitable for use as chelating agents in the compositions of the invention when at lease low levels of total phosphorus are permitted in detergent compositions, and include ethylenediaminetetrakis (methylenephosphonates) as DEQUEST. Preferably, these amino phosphonates do not contain alkyl or alkenyl groups with more than about 6 carbon atoms. Polyfunctionally-substituted aromatic chelating agents are also useful in the compositions herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene.

A preferred biodegradable chelator for use herein is ethylenediamine disuccinate ("EDDS"), especially the [S,S] isomer as described in U.S. Pat. No. 4,704,233, Nov. 3, 1987, to Hartman and Perkins.

The compositions herein may also contain water-soluble methyl glycine diacetic acid (MGDA) salts (or acid form) as a chelant or co-builder useful with, for example, insoluble builders such as zeolites, layered silicates and the like.

If utilized, these chelating agents will generally comprise from about 0.1% to about 15% by weight of the detergent compositions herein. More preferably, if utilized, the chelating agents will comprise from about 0.1% to about 3.0% by weight of such compositions.

Suds Suppressor

Another optional ingredient is a suds suppressor, exemplified by silicones, and silica-silicone mixtures. Silicones can be generally represented by alkylated polysiloxane materials while silica is normally used in finely divided forms exemplified by silica aerogels and xerogels and hydrophobic silicas of various types. These materials can be incorporated as particulates in which the suds suppressor is advantageously releasably incorporated in a water-soluble or water-dispersible, substantially non-surface-active detergent impermeable carrier. Alternatively the suds suppressor can be dissolved or dispersed in a liquid carrier and applied by spraying on to one or more of the other components.

A preferred silicone suds controlling agent is disclosed in Bartollota et al. U.S. Pat. No. 3,933,672. Other particularly useful suds suppressors are the self-emulsifying silicone suds suppressors, described in German Patent Application DTOS 2 646 126 published Apr. 28, 1977. An example of such a compound is DC-544, commercially available from Dow Corning, which is a siloxane-glycol copolymer. Especially preferred suds controlling agent are the suds suppressor system comprising a mixture of silicone oils and 2-alkyl-alcanols. Suitable 2-alkyl-alkanols are 2-butyl-octanol which are commercially available under the trade name Isofol 12 R.

Such suds suppressor system are described in Co-pending European Patent application N 92870174.7 filed Nov. 10, 1992.

Especially preferred silicone suds controlling agents are described in co-pending European Patent application No92201649.8. Said compositions can comprise a silicone/silica mixture in combination with fumed nonporous silica such as Aerosil®.

The suds suppressors described above are normally employed at levels of from 0.001% to 2% by weight of the composition, preferably from 0.01% to 1% by weight.

Others

Other components used in detergent compositions may be employed, such as soil-suspending agents, soil-release agents, optical brighteners, abrasives, bactericides, tarnish inhibitors, coloring agents, and/or encapsulated or non-encapsulated perfumes.

Especially suitable encapsulating materials are water soluble capsules which consist of a matrix of polysaccharide and polyhydroxy compounds such as described in GB 1,464,616. Other suitable water soluble encapsulating materials comprise dextrins derived from ungelatinized starch acid-esters of substituted dicarboxylic acids such as described in U.S. Pat. No. 3,455,838. These acid-ester dextrins are,preferably, prepared from such starches as waxy maize, waxy sorghum, sago, tapioca and potato. Suitable examples of said encapsulating materials include N-Lok manufactured by National Starch. The N-Lok encapsulating material consists of a modified maize starch and glucose. The starch is modified by adding monofunctional substituted groups such as octenyl succinic acid anhydride.

Antiredeposition and soil suspension agents suitable herein include cellulose derivatives such as methylcellulose, carboxymethylcellulose and hydroxyethylcellulose, and homo- or co-polymeric polycarboxylic acids or their salts. Polymers of this type include the polyacrylates and maleic anhydride-acrylic acid copolymers previously mentioned as builders, as well as copolymers of maleic anhydride with ethylene, methylvinyl ether or methacrylic acid, the maleic anhydride constituting at least 20 mole percent of the copolymer. These materials are normally used at levels of from 0.5% to 10% by weight, more preferably from 0.75% to 8%, most preferably from 1% to 6% by weight of the composition.

Preferred optical brighteners are anionic in character, examples of which are disodium 4,4'-bis-(2-diethanolamino-4-anilino-s-triazin-6-ylamino)stilbene-2:2' disulphonate, disodium 4,-4'-bis-(2-morpholino-4-anilino-s-triazin-6-ylamino-stilbene-2:2'-disulphonate, disodium 4,4'-bis-(2,4-dianilino-s-triazin-6-ylamino)stilbene-2:2'-disulphonate, monosodium 4',4"-bis-(2,4-dianilino-s-tri-azin-6 ylamino) stilbene-2-sulphonate, disodium 4,4'-bis-(2-anilino-4-(N-methyl-N-2-hydroxyethylamino)-s-triazin-6-ylamino) stilbene-2,2'-disulphonate, di-sodium 4,4'-bis-(4-phenyl-2,1,3-triazol-2-yl)-stilbene-2,2' disulphonate, di-so-dium 4,4'bis(2-anilino-4-(1-methyl-2-hydroxyethylamino)-s-triazin-6-ylamino)stilbene-2,2'disulphonate, sodium 2(stilbyl-4"-(naphtho-1',2':4,5)-1,2,3-triazole-2"-sulphonate and 4,4'-bis(2-sulphostyryl)biphenyl. Highly preferred brighteners are the specific brighteners disclosed in EP 753 567.

Other useful polymeric materials are the polyethylene glycols, particularly those of molecular weight 1000–10000, more particularly 2000 to 8000 and most preferably about 4000. These are used at levels of from 0.20% to 5% more preferably from 0.25% to 2.5% by weight. These polymers and the previously mentioned homo- or co-polymeric poly-carboxylate salts are valuable for improving whiteness maintenance, fabric ash deposition, and cleaning performance on clay, proteinaceous and oxidizable soils in the presence of transition metal impurities.

Soil release agents useful in compositions of the present invention are conventionally copolymers or terpolymers of terephthalic acid with ethylene glycol and/or propylene glycol units in various arrangements. Examples of such polymers are disclosed in the commonly assigned U.S. Pat. Nos. 4,116,885 and 4,711,730 and European Published Patent Application No. 0 272 033. A particular preferred polymer in accordance with EP-A-0 272 033 has the formula $$(CH_3(PEG)_{43})_{0.75}(POH)_{0.25}[T—PO)_{2.8}(T—PEG)_{0.4}]T(PO—H)_{0.25}((PEG)_{43}CH_3)_{0.75}$$

where PEG is $—(OC_2H_4)O—$, PO is $(OC_3H_6O)$ and T is $(pcOC_6H_4CO)$.

Also very useful are modified polyesters as random copolymers of dimethyl terephthalate, dimethyl sulfoisophthalate, ethylene glycol and 1–2 propane diol, the end groups consisting primarily of sulphobenzoate and secondarily of mono esters of ethylene glycol and/or propane-diol. The target is to obtain a polymer capped at both end by sulphobenzoate groups, "primarily", in the present context most of said copolymers herein will be end-capped by sulphobenzoate groups. However, some copolymers will be less than fully capped, and therefore their end groups may consist of monoester of ethylene glycol and/or propane 1–2 diol, thereof consist "secondarily" of such species.

The selected polyesters herein contain about 46% by weight of dimethyl terephthalic acid, about 16% by weight of propane −1.2 diol, about 10% by weight ethylene glycol about 13% by weight of dimethyl sulfobenzoic acid and about 15% by weight of sulfoisophthalic acid, and have a molecular weight of about 3.000. The polyesters and their method of preparation are described in detail in EPA 311 342.

It is well-known in the art that free chlorine in tap water rapidly deactivates the enzymes comprised in detergent compositions. Therefore, using chlorine scavenger such as perborate, ammonium sulfate, sodium sulphite or polyethyleneimine at a level above 0.1% by weight of total composition, in the formulas will provide improved through the wash stability of the detergent enzymes. Compositions comprising chlorine scavenger are described in the European patent application 92870018.6 filed Jan. 31, 1992.

Alkoxylated polycarboxylates such as those prepared from polyacrylates are useful herein to provide additional grease removal performance. Such materials are described in WO 91/08281 and PCT 90/01815 at p. 4 et seq., incorporated herein by reference. Chemically, these materials comprise polyacrylates having one ethoxy side-chain per every 7–8 acrylate units. The side-chains are of the formula $—(CH_2CH_2O)_m(CH_2)_nCH_3$ wherein m is 2–3 and n is 6–12. The side-chains are ester-linked to the polyacrylate "backbone" to provide a "comb" polymer type structure. The molecular weight can vary, but is typically in the range of about 2000 to about 50,000. Such alkoxylated polycarboxylates can comprise from about 0.05% to about 10%, by weight, of the compositions herein.

Dispersants

The detergent compositions of the present invention can also contain dispersants Suitable water-soluble organic salts are the homo- or co-polymeric acids or their salts, in which the polycarboxylic acid comprises at least two carboxyl radicals separated from each other by not more than two carbon atoms. Polymers of this type are disclosed in GB-A-1,596,756. Examples of such salts are polyacrylates of MW 2000–5000 and their copolymers with maleic anhydride, such copolymers having a molecular weight of from 1,000 to 100,000. Especially, copolymer of acrylate and methylacrylate such as the 480N having a molecular weight of 4000, at a level from 0.5–20% by weight of composition can be added in the detergent compositions of the present invention.

The compositions of the invention may contain a lime soap peptiser compound, which has preferably a lime soap dispersing power (LSDP), as defined hereinafter of no more than 8, preferably no more than 7, most preferably no more than 6. The lime soap peptiser compound is preferably present at a level from 0% to 20% by weight.

A numerical measure of the effectiveness of a lime soap peptiser is given by the lime soap dispersant power (LSDP) which is determined using the lime soap dispersant test as described in an article by H. C. Borghetty and C. A. Bergman, J. Am. Oil. Chem. Soc., volume 27, pages 88–90, (1950). This lime soap dispersion test method is widely used by practitioners in this art field being referred to, for example, in the following review articles; W. N. Linfield, Surfactant science Series, Volume 7, page 3; W. N. Linfield, Tenside surf. det., volume 27, pages 159–163, (1990); and M. K. Nagarajan, W. F. Masler, Cosmetics and Toiletries, volume 104, pages 71–73, (1989). The LSDP is the % weight ratio of dispersing agent to sodium oleate required to disperse the lime soap deposits formed by 0.025 g of sodium oleate in 30 ml of water of 333 ppm $CaCo_3$ (Ca:Mg=3:2) equivalent hardness.

Surfactants having good lime soap peptiser capability will include certain amine oxides, betaines, sulfobetaines, alkyl ethoxysulfates and ethoxylated alcohols.

Exemplary surfactants having a LSDP of no more than 8 for use in accord with the present invention include $C_{16}$–$C_{18}$ dimethyl amine oxide, $C_{12}$–$C_{18}$ alkyl ethoxysulfates with an average degree of ethoxylation of from 1–5, particularly $C_{12}$–$C_{15}$ alkyl ethoxysulfate surfactant with a degree of ethoxylation of amount 3 (LSDP=4), and the $C_{14}$–$C_{15}$ ethoxylated alcohols with an average degree of ethoxylation of either 12 (LSDP=6) or 30, sold under the tradenames Lutensol A012 and Lutensol A030 respectively, by BASF GmbH.

Polymeric lime soap peptisers suitable for use herein are described in the article by M. K. Nagarajan, W. F. Masler, to be found in Cosmetics and Toiletries, volume 104, pages 71–73, (1989).

Hydrophobic bleaches such as 4-[N-octanoyl-6-aminohexanoyl]benzene sulfonate, 4-[N-nonanoyl-6-aminohexanoyl]benzene sulfonate, 4-[N-decanoyl-6-aminohexanoyl]benzene sulfonate and mixtures thereof; and nonanoyloxy benzene sulfonate together with hydrophilic/hydrophobic bleach formulations can also be used as lime soap peptisers compounds.

Dye Transfer Inhibition

The detergent compositions of the present invention can also include compounds for inhibiting dye transfer from one fabric to another of solubilized and suspended dyes encountered during fabric laundering operations involving colored fabrics.

Polymeric Dye Transfer Inhibiting Agents

The detergent compositions according to the present invention also comprise from 0.001% to 10%, preferably from 0.01% to 2%, more preferably from 0.05% to 1% by weight of polymeric dye transfer inhibiting agents. Said polymeric dye transfer inhibiting agents are normally incorporated into detergent compositions in order to inhibit the transfer of dyes from colored fabrics onto fabrics washed therewith. These polymers have the ability to complex or adsorb the fugitive dyes washed out of dyed fabrics before the dyes have the opportunity to become attached to other articles in the wash.

Especially suitable polymeric dye transfer inhibiting agents are polyamine N-oxide polymers, copolymers of N-vinylpyrrolidone and N-vinylimidazole, polyvinylpyrrolidone polymers, polyvinyloxazolidones and polyvinylimidazoles or mixtures thereof.

Addition of such polymers also enhances the performance of the enzymes according the invention.

a) Polyamine N-oxide Polymers

The polyamine N-oxide polymers suitable for use contain units having the following structure formula:

(I)

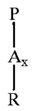

wherein

P is a polymerisable unit, whereto the R—N—O group can be attached to or wherein the R—N—O group forms part of the polymerisable unit or a combination of both.

A is 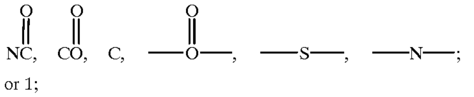

x is O or 1;

R are aliphatic, ethoxylated aliphatics, aromatic, heterocyclic or alicyclic groups or any combination thereof whereto the nitrogen of the N—O group can be attached or wherein the nitrogen of the N—O group is part of these groups.

The N—O group can be represented by the following general structures:

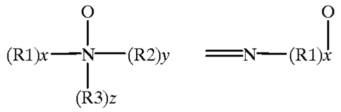

wherein

R1, R2, and R3 are aliphatic groups, aromatic, heterocyclic or alicyclic groups or combinations thereof, x or/and y or/and z is 0 or 1 and wherein the nitrogen of the N—O group can be attached or wherein the nitrogen of the N—O group forms part of these groups.

The N—O group can be part of the polymerisable unit (P) or can be attached to the polymeric backbone or a combination of both.

Suitable polyamine N-oxides wherein the N—O group forms part of the polymerisable unit comprise polyamine N-oxides wherein R is selected from aliphatic, aromatic, alicyclic or heterocyclic groups.

One class of said polyamine N-oxides comprises the group of polyamine N-oxides wherein the nitrogen of the N—O group forms part of the R-group. Preferred polyamine N-oxides are those wherein R is a heterocyclic group such as pyrridine, pyrrole, imidazole, pyrrolidine, piperidine, quinoline, acridine and derivatives thereof.

Another class of said polyamine N-oxides comprises the group of polyamine N-oxides wherein the nitrogen of the N—O group is attached to the R-group.

Other suitable polyamine N-oxides are the polyamine oxides whereto the N—O group is attached to the polymerisable unit.

Preferred class of these polyamine N-oxides are the polyamine N-oxides having the general formula (I) wherein R is an aromatic, heterocyclic or alicyclic groups wherein the nitrogen of the N-0 functional group is part of said R group.

Examples of these classes are polyamine oxides wherein R is a heterocyclic compound such as pyrridine, pyrrole, imidazole and derivatives thereof.

Another preferred class of polyamine N-oxides are the polyamine oxides having the general formula (I) wherein R are aromatic, heterocyclic or alicyclic groups wherein the nitrogen of the N-0 functional group is attached to said R groups.

Examples of these classes are polyamine oxides wherein R groups can be aromatic such as phenyl.

Any polymer backbone can be used as long as the amine oxide polymer formed is water-soluble and has dye transfer inhibiting properties. Examples of suitable polymeric backbones are polyvinyls, polyalkylenes, polyesters, polyethers, polyamide, polyimides, polyacrylates and mixtures thereof.

The amine N-oxide polymers of the present invention typically have a ratio of amine to the amine N-oxide of 10:1 to 1:1000000. However the amount of amine oxide groups present in the polyamine oxide polymer can be varied by appropriate copolymerization or by appropriate degree of N-oxidation. Preferably, the ratio of amine to amine N-oxide is from 2:3 to 1:1000000. More preferably from 1:4 to 1:1000000, most preferably from 1:7 to 1:1000000. The polymers of the present invention actually encompass random or block copolymers where one monomer type is an amine N-oxide and the other monomer type is either an amine N-oxide or not. The amine oxide unit of the polyamine N-oxides has a PKa <10, preferably PKa <7, more preferred PKa <6.

The polyamine oxides can be obtained in almost any degree of polymerisation. The degree of polymerisation is not critical provided the material has the desired water-solubility and dye-suspending power.

Typically, the average molecular weight is within the range of 500 to 1000,000; preferably from 1,000 to 50,000, more preferably from 2,000 to 30,000, most preferably from 3,000 to 20,000.

b) Copolymers of N-vinylpyrrolidone and N-vinylimidazole

The N-vinylimidazole N-vinylpyrrolidone polymers used in the present invention have an average molecular weight range from 5,000–1,000,000, preferably from 5,000–200,000.

Highly preferred polymers for use in detergent compositions according to the present invention comprise a polymer selected from N-vinylimidazole N-vinylpyrrolidone copolymers wherein said polymer has an average molecular weight range from 5,000 to 50,000 more preferably from 8,000 to 30,000, most preferably from 10,000 to 20,000.

The average molecular weight range was determined by light scattering as described in Barth H. G. and Mays J. W. Chemical Analysis Vol 113,"Modem Methods of Polymer Characterization".

Highly preferred N-vinylimidazole N-vinylpyrrolidone copolymers have an average molecular weight range from 5,000 to 50,000; more preferably from 8,000 to 30,000; most preferably from 10,000 to 20,000.

The N-vinylimidazole N-vinylpyrrolidone copolymers characterized by having said average molecular weight range provide excellent dye transfer inhibiting properties while not adversely affecting the cleaning performance of detergent compositions formulated therewith.

The N-vinylimidazole N-vinylpyrrolidone copolymer of the present invention has a molar ratio of N-vinylimidazole to N-vinylpyrrolidone from 1 to 0.2, more preferably from 0.8 to 0.3, most preferably from 0.6 to 0.4.

c) Polyvinylpyrrolidone

The detergent compositions of the present invention may also utilize polyvinylpyrrolidone ("PVP") having an average molecular weight of from about 2,500 to about 400,000, preferably from about 5,000 to about 200,000, more preferably from about 5,000 to about 50,000, and most preferably from about 5,000 to about 15,000. Suitable polyvinylpyrrolidones are commercially available from ISP Corporation, New York, N.Y. and Montreal, Canada under the product names PVP K-15 (viscosity molecular weight of 10,000), PVP K-30 (average molecular weight of 40,000), PVP K-60 (average molecular weight of 160,000), and PVP K-90 (average molecular weight of 360,000). Other suitable polyvinylpyrrolidones which are commercially available from BASF Cooperation include Sokalan HP 165 and Sokalan HP 12; polyvinylpyrrolidones known to persons skilled in the detergent field (see for example EP-A-262,897 and EP-A-256,696).

d) Polyvinyloxazolidone:

The detergent compositions of the present invention may also utilize polyvinyloxazolidone as a polymeric dye transfer inhibiting agent. Said polyvinyloxazolidones have an average molecular weight of from about 2,500 to about 400,000, preferably from about 5,000 to about 200,000, more preferably from about 5,000 to about 50,000, and most preferably from about 5,000 to about 15,000.

e) Polyvinylimidazole:

The detergent compositions of the present invention may also utilize polyvinylimidazole as polymeric dye transfer inhibiting agent. Said polyvinylimidazoles have an average about 2,500 to about 400,000, preferably from about 5,000 to about 200,000, more preferably from about 5,000 to about 50,000, and most preferably from about 5,000 to about 15,000.

f) Cross-linked Polymers:

Cross-linked polymers are polymers whose backbone are interconnected to a certain degree; these links can be of chemical or physical nature, possibly with active groups n the backbone or on branches; cross-linked polymers have been described in the Journal of Polymer Science, volume 22, pages 1035–1039.

In one embodiment, the cross-linked polymers are made in such a way that they form a three-dimensional rigid structure, which can entrap dyes in the pores formed by the three-dimensional structure. In another embodiment, the cross-linked polymers entrap the dyes by swelling. Such cross-linked polymers are described in the co-pending patent application 94870213.9.

Method of Washing

The compositions of the invention may be used in essentially any washing or cleaning methods, including soaking methods, pretreatment methods and methods with rinsing steps for which a separate rinse aid composition may be added.

The process described herein comprises contacting fabrics or dishware a cleaning solution in the usual manner and exemplified hereunder. The process of the invention is conveniently carried out in the course of the cleaning process. The method of cleaning is preferably carried out at 5° C. to 95° C., especially between 10° C. and 60° C. The pH of the treatment solution is preferably from 7 to 12.

A preferred machine dishwashing method comprises treating soiled articles with an aqueous liquid having dissolved or dispensed therein an effective amount of the machine diswashing or rinsing composition. A conventional effective amount of the machine dishwashing composition means from 8–60 g of product dissolved or dispersed in a wash volume from 3–10 litres. According to a manual dishwashing method, soiled dishes are contacted with an effective amount of the diswashing composition, typically from 0.5–20 g (per 25 dishes being treated). Preferred manual dishwashing methods include the application of a concentrated solution to the surfaces of the dishes or the soaking in large volume of dilute solution of the detergent composition.

The following examples are meant to exemplify compositions of the present invention, but are not necessarily meant to limit or otherwise define the scope of the invention. In the detergent compositions, the enzymes levels are expressed by pure enzyme by weight of the total composition and unless otherwise specified, the detergent ingredients are expressed by weight of the total compositions. The abbreviated component identifications therein have the following meanings:

| | |
|---|---|
| LAS | Sodium linear $C_{11-13}$ alkyl benzene sulphonate. |
| TAS | Sodium tallow alkyl sulphate. |
| CxyAS | Sodium $C_{1x}$–$C_{1y}$ alkyl sulfate. |
| CxySAS | Sodium $C_{1x}$–$C_{1y}$ secondary (2,3) alkyl sulfate. |
| CxyEz | $C_{1x}$–$C_{1y}$ predominantly linear primary alcohol condensed with an average of z moles of ethylene oxide. |
| CxyEzS | $C_{1x}$–$C_{1y}$ sodium alkyl sulfate condensed with an average of z moles of ethylene oxide. |
| QAS | $R_2.N + (CH_3)_2(C_2H_4OH)$ with $R_2 = C_{12}$–$C_{14}$. |
| QAS 1 | $R_2.N + (CH_3)_2(C_2H_4OH)$ with $R_2 = C_8$–$C_{11}$. |
| APA | $C_{8-10}$ amido propyl dimethyl amine. |

-continued

| | |
|---|---|
| Soap | Sodium linear alkyl carboxylate derived from a 80/20 mixture of tallow and coconut fatty acids. |
| Nonionic | $C_{13}$–$C_{15}$ mixed ethoxylated/propoxylated fatty alcohol with an average degree of ethoxylation of 3.8 and an average degree of propoxylation of 4.5. |
| Neodol 45-13 | C14–C15 linear primary alcohol ethoxylate, sold by Shell Chemical CO. |
| STS | Sodium toluene sulphonate. |
| CFAA | $C_{12}$–$C_{14}$ alkyl N-methyl glucamide. |
| TFAA | $C_{16}$–$C_{18}$ alkyl N-methyl glucamide. |
| TPKFA | $C_{12}$–$C_{14}$ topped whole cut fatty acids. |
| Silicate | Amorphous Sodium Silicate ($SiO_2$:$Na_2O$ ratio = 1.6–3.2). |
| Metasilicate | Sodium metasilicate ($SiO_2$:$Na_2O$ ratio = 1.0). |
| Zeolite A | Hydrated Sodium Aluminosilicate of formula $Na_{12}(AlO_2SiO_2)_{12}.27H_2O$ having a primary particle size in the range from 0.1 to 10 micrometers (Weight expressed on an anhydrous basis). |
| Na-SKS-6 | Crystalline layered silicate of formula $\delta$-$Na_2Si_2O_5$. |
| Citrate | Tri-sodium citrate dihydrate of activity 86.4% with a particle size distribution between 425 and 850 micrometers. |
| Citric | Anhydrous citric acid. |
| Borate | Sodium borate |
| Carbonate | Anhydrous sodium carbonate with a particle size between 200 and 900 micrometers. |
| Bicarbonate | Anhydrous sodium hydrogen carbonate with a particle size distribution between 400 and 1200 micrometers. |
| Sulphate | Anhydrous sodium sulphate. |
| Mg Sulphate | Anhydrous magnesium sulfate. |
| STPP | Sodium tripolyphosphate. |
| TSPP | Tetrasodium pyrophosphate. |
| MA/AA | Random copolymer of 4:1 acrylate/maleate, average molecular weight about 70,000–80,000. |
| MA/AA 1 | Random copolymer of 6:4 acrylate/maleate, average molecular weight about 10,000. |
| AA | Sodium polyacrylate polymer of average molecular weight 4,500. |
| PA30 | Polyacrylic acid of average molecular weight of between about 4,500–8,000. |
| 480N | Random copolymer of 7:3 acrylate/methacrylate, average molecular weight about 3,500. |
| Polygel/carbopol | High molecular weight crosslinked polyacrylates. |
| PB1 | Anhydrous sodium perborate monohydrate of nominal formula $NaBO_2.H_2O_2$. |
| PB4 | Sodium perborate tetrahydrate of nominal formula $NaBO_2.3H_2O.H_2O_2$. |
| Percarbonate | Anhydrous sodium percarbonate of nominal formula $2Na_2CO_3.3H_2O_2$. |
| NaDCC | Sodium dichloroisocyanurate. |
| TAED | Tetraacetylethylenediamine. |
| NOBS | Nonanoyloxybenzene sulfonate in the form of the sodium salt. |
| NACA-OBS | (6-nonamidocaproyl) oxybenzene sulfonate also named nonanoyl amino caproic oxybenzene sulfonate |
| DTPA | Diethylene triamine pentaacetic acid. |
| HEDP | 1,1-hydroxyethane diphosphonic acid. |
| DETPMP | Diethyltriamine penta (methylene) phosphonate, marketed by Monsanto under the Trade name Dequest 2060. |
| EDDS | Ethylenediamine-N,N'-disuccinic acid, (S,S) isomer in the form of its sodium salt |
| MnTACN | Manganese 1,4,7-trimethyl-1,4,7-triazacyclononane. |
| Photoactivated Bleach | Sulfonated zinc phtalocyanine encapsulated in dextrin soluble polymer. |
| Photoactivated Bleach 1 | Sulfonated alumino phtalocyanine encapsulated in dextrin soluble polymer. |
| PAAC | Pentaamine acetate cobalt (III) salt. |
| Paraffin | Paraffin oil sold under the tradename Winog 70 by Wintershall. |

-continued

| | |
|---|---|
| NaBz | Sodium benzoate. |
| BzP | Benzoyl Peroxide. |
| Mannanase | Mannanase from *Bacillus agaradherens*, NICMB 40482 |
| Protease | Proteolytic enzyme sold under the tradename Savinase, Alcalase, Durazym by Novo Nordisk A/S, Maxacal, Maxapem sold by Gist-Brocades and proteases described in patents WO91/06637 and/or WO95/10591 and/or EP 251 446. |
| Amylase | Amylolytic enzyme sold under the tradename Purafact Ox Am$^R$ described in WO94/18314, WO96/05295 sold by Genencor; Termamyl ®, Fungamyl ® and Duramyl ®, all available from Novo Nordisk A/S and those described in WO95/26397. |
| Lipase | Lipolytic enzyme sold under the tradename Lipolase, Lipolase Ultra by Novo Nordisk A/S and Lipomax by Gist-Brocades. |
| Cellulase | Cellulytic enzyme sold under the tradename Carezyme, Celluzyme and/or Endolase by Novo Nordisk A/S. |
| CMC | Sodium carboxymethyl cellulose. |
| PVP | Polyvinyl polymer, with an average molecular weight of 60,000. |
| PVNO | Polyvinylpyridine-N-Oxide, with an average molecular weight of 50,000. |
| PVPVI | Copolymer of vinylimidazole and vinylpyrrolidone, with an average molecular weight of 20,000. |
| Brightener 1 | Disodium 4,4'-bis(2-sulphostyryl)biphenyl. |
| Brightener 2 | Disodium 4,4'-bis(4-anilino-6-morpholino-1.3.5-triazin-2-yl) stilbene-2:2'-disulfonate. |
| Silicone antifoam | Polydimethylsiloxane foam controller with siloxane-oxyalkylene copolymer as dispersing agent with a ratio of said foam controller to said dispersing agent of 10:1 to 100:1. |
| Suds Suppressor | 12% Silicone/silica, 18% stearyl alcohol, 70% starch in granular form. |
| Opacifier | Water based monostyrene latex mixture, sold by BASF Aktiengesellschaft under the tradename Lytron 621. |
| SRP 1 | Anionically end capped poly esters. |
| SRP 2 | Diethoxylated poly (1,2 propylene terephthalate) short block polymer. |
| QEA | $bis((C_2H_5O)(C_2H_4O)_n)(CH_3)$—$N^+$—$C_6H_{12}$—$N^+$—$(CH_3)$ $bis((C_2H_5O)$—$(C_2H_4O))_n$, wherein n = from 20 to 30. |
| PEI | Polyethyleneimine with an average molecular weight of 1800 and an average ethoxylation degree of 7 ethyleneoxy residues per nitrogen. |
| SCS | Sodium cumene sulphonate. |
| HMWPEO | High molecular weight polyethylene oxide. |
| PEGx | Polyethylene glycol, of a molecular weight of x. |
| PEO | Polyethylene oxide, with an average molecular weight of 5,000. |
| TEPAE | Tetreaethylenepentaamine ethoxylate. |
| BTA | Benzotriazole. |
| pH | Measured as a 1% solution in distilled water at 20° C. |

EXAMPLE 1

The following high density laundry detergent compositions were prepared according to the present invention:

| | I | II | III |
|---|---|---|---|
| LAS | 8.0 | 8.0 | 2.0 |
| TAS | 0.5 | — | 0.5 |
| C46(S)AS | 2.5 | — | — |
| C25AS | — | — | 7.0 |
| C68AS | 5.0 | 7.0 | — |
| C25E5 | — | 3.4 | 10.0 |
| C25E7 | 3.4 | 1.0 | — |
| C25E3S | — | — | 2.0 |
| QAS | 0.8 | — | — |
| QAS 1 | — | — | 0.8 |
| Zeolite A | 18.0 | 14.1 | 18.1 |
| Citric | — | — | 2.5 |
| Carbonate | 13.0 | 27.0 | 10.0 |
| Na-SKS-6 | — | — | 10.0 |
| Silicate | 1.4 | 3.0 | 0.3 |
| Citrate | 1.0 | — | 3.0 |
| Sulfate | 26.1 | 26.1 | 6.0 |
| Mg sulfate | — | — | 0.2 |
| MA/AA | 0.3 | 0.3 | 4.0 |
| CMC | 0.2 | 0.2 | 0.2 |
| PB4 | 9.0 | 5.0 | — |
| Percarbonate | — | — | — |
| TAED | 0.4 | 1.5 | — |
| NACA-OBS | 2.0 | 1.0 | 1.0 |
| DETPMP | 0.25 | 0.25 | 0.25 |
| SRP 1 | — | — | 0.2 |
| EDDS | 0.25 | 0.4 | — |
| CFAA | 1.0 | — | 2.0 |
| HEDP | 0.3 | 0.3 | 0.3 |
| QEA | — | — | 0.2 |
| Mannanase | 0.001 | 0.002 | 0.01 |
| Protease | 0.009 | 0.01 | 0.04 |
| Amylase | 0.002 | 0.002 | 0.006 |
| Cellulase | — | — | 0.0007 |
| Lipase | — | — | 0.01 |
| Photoactivated bleach (ppm) | 15 | 15 | — |
| PVNO/PVPVI | — | — | 0.1 |
| Brightener 1 | 0.09 | 0.09 | — |
| Perfume | 0.3 | 0.3 | 0.4 |
| Silicone antifoam | 0.5 | 0.5 | — |
| Density in g/liter | 850 | 850 | 850 |
| Miscellaneous and minors | | Up to 100% | |

EXAMPLE 2

The following granular laundry detergent compositions of particular utility under European machine wash conditions were prepared according to the present invention:

| | I | II | III |
|---|---|---|---|
| LAS | 5.5 | 7.5 | 7.0 |
| TAS | 1.25 | 1.9 | 0.3 |
| C24AS/C25AS | — | 2.2 | 2.2 |
| C25E3S | — | 0.8 | 1.0 |
| C45E7 | 3.25 | — | 3.0 |
| TFAA | — | — | — |
| C25E5 | — | 5.5 | — |
| QAS | 0.8 | — | — |
| QAS 1 | — | 0.7 | 0.7 |
| STPP | 19.7 | — | — |
| Zeolite A | — | 19.5 | 17.0 |
| NaSKS-6/citric acid (79:21) | — | 10.6 | — |
| Na-SKS-6 | — | — | 10.0 |
| Carbonate | 6.1 | 21.4 | 18.0 |
| Bicarbonate | — | 2.0 | 2.0 |
| Silicate | 6.8 | — | — |
| Citrate | — | — | — |
| Sulfate | 39.8 | — | 12.0 |

-continued

| | I | II | III |
|---|---|---|---|
| Mg sulfate | — | — | — |
| MA/AA | 0.5 | 1.6 | 1.0 |
| CMC | 0.2 | 0.4 | 0.4 |
| PB4 | 5.0 | 12.7 | — |
| Percarbonate | — | — | 15.0 |
| TAED | 0.5 | 3.1 | — |
| NACA-OBS | 1.0 | 3.5 | 2.5 |
| DETPMP | 0.25 | 0.2 | 0.2 |
| HEDP | — | 0.3 | 0.3 |
| QEA | — | — | — |
| Mannanase | 0.001 | 0.02 | 0.001 |
| Protease | 0.009 | 0.03 | 0.02 |
| Lipase | 0.003 | 0.003 | 0.004 |
| Cellulase | 0.0006 | 0.0006 | 0.0007 |
| Amylase | 0.002 | 0.002 | 0.003 |
| PVNO/PVPVI | — | — | — |
| PVP | 0.9 | 1.3 | 0.9 |
| SRP 1 | — | — | — |
| Photoactivated bleach (ppm) | 15 | 27 | 20 |
| Photoactivated bleach 1 (ppm) | 15 | — | — |
| Brightener 1 | 0.08 | 0.2 | 0.15 |
| Brightener 2 | — | 0.04 | — |
| Perfume | 0.3 | 0.5 | 0.3 |
| Silicone antifoam | 0.5 | 2.4 | 2.0 |
| Density in g/liter | 750 | 750 | 750 |
| Miscellaneous and minors | | Up to 100% | |

EXAMPLE 3

The following detergent compositions of particular utility under European machine wash conditions were prepared according to the present invention:

| | I | II | III |
|---|---|---|---|
| Blown Powder | | | |
| LAS | 6.0 | 5.0 | 11.0 |
| TAS | 2.0 | — | — |
| Zeolite A | 24.0 | — | — |
| STPP | — | 27.0 | 24.0 |
| Sulfate | 4.0 | 6.0 | 13.0 |
| MA/AA | 1.0 | 4.0 | 6.0 |
| Silicate | 1.0 | 7.0 | 3.0 |
| CMC | 1.0 | 1.0 | 0.5 |
| Brightener 1 | 0.2 | 0.2 | 0.2 |
| Silicone antifoam | 1.0 | 1.0 | 1.0 |
| DETPMP | 0.4 | 0.4 | 0.2 |
| Spray On | | | |
| Brightener | 0.02 | — | — |
| C45E7 | — | — | — |
| C45E2 | 2.5 | 2.5 | 2.0 |
| C45E3 | 2.6 | 2.5 | 2.0 |
| Perfume | 0.5 | 0.3 | 0.5 |
| Silicone antifoam | 0.3 | 0.3 | 0.3 |
| Dry additives | | | |
| QEA | — | — | — |
| EDDS | 0.3 | — | — |
| Sulfate | 2.0 | 3.0 | 5.0 |
| Carbonate | 6.0 | 13.0 | 15.0 |
| Citric | 2.5 | — | — |
| QAS 1 | 0.5 | — | — |
| Na-SKS-6 | 10.0 | — | — |
| Percarbonate | 18.5 | — | — |
| PB4 | — | 18.0 | 10.0 |
| TAED | 2.0 | 2.0 | — |
| NACA-OBS | 3.0 | 2.0 | 4.0 |

-continued

| | I | II | III |
|---|---|---|---|
| Mannanase | 0.001 | 0.002 | 0.02 |
| Protease | 0.03 | 0.03 | 0.03 |
| Lipase | 0.008 | 0.008 | 0.008 |
| Amylase | 0.003 | 0.003 | 0.003 |
| Brightener 1 | 0.05 | — | — |
| Miscellaneous and minors | | Up to 100% | |

EXAMPLE 4

The following granular detergent compositions were prepared according to the present invention:

| | I | II | III |
|---|---|---|---|
| | Blown Powder | | |
| LAS | 23.0 | 7.0 | 7.0 |
| TAS | — | — | — |
| C45AS | 6.0 | 5.0 | — |
| C45AES | — | 1.0 | — |
| C45E35 | — | — | 4.0 |
| Zeolite A | 10.0 | 14.0 | 10.0 |
| MA/AA | — | — | 2.0 |
| MA/AA 1 | 7.0 | — | — |
| AA | — | 3.0 | 3.0 |
| Sulfate | 5.0 | 14.3 | 19.3 |
| Silicate | 10.0 | 1.0 | 1.0 |
| Carbonate | 15.0 | 10.0 | 6.0 |
| PEG 4000 | 0.4 | 1.5 | 1.0 |
| DTPA | — | 0.5 | 0.5 |
| Brightener 2 | 0.3 | 0.3 | 0.3 |
| | Spray On | | |
| C45E7 | — | — | 2.0 |
| C25E9 | 3.0 | — | — |
| C23E9 | — | 1.5 | 2.0 |
| Perfume | 0.3 | 0.3 | 0.3 |
| | Agglomerates | | |
| C45AS | — | 5.0 | 5.0 |
| LAS | — | 2.0 | 2.0 |
| Zeolite A | — | 7.5 | 7.5 |
| Carbonate | — | 4.0 | 4.0 |
| PEG 4000 | — | 0.5 | 0.5 |
| Misc (Water etc.) | — | 2.0 | 2.0 |
| | Dry additives | | |
| QAS | — | — | — |
| Citric | — | — | — |
| PB4 | — | — | 1.0 |
| PB1 | 4.0 | 3.0 | — |
| Percarbonate | — | — | 10.0 |
| Carbonate | — | 1.8 | 4.0 |
| NOBS | 4.0 | 6.0 | 0.6 |
| Methyl cellulose | 0.2 | — | — |
| Na-SKS-6 | 8.0 | — | — |
| STS | — | 2.0 | — |
| Culmene sulfonic acid | — | — | 2.0 |
| Mannanase | 0.001 | 0.02 | 0.001 |
| Protease | 0.02 | 0.02 | 0.02 |
| Lipase | 0.004 | 0.004 | 0.008 |
| Amylase | 0.003 | 0.002 | — |
| Cellulase | 0.0005 | 0.0005 | 0.0005 |
| PVPVI | — | — | 0.1 |
| PVP | — | — | — |
| PVNO | — | 0.5 | — |
| QEA | — | — | — |
| SRP 1 | 0.2 | 0.3 | — |
| Silicone antifoam | 0.2 | 0.2 | — |
| Mg sulfate | — | 0.2 | — |
| Miscellaneous and minors | | Up to 100% | |

EXAMPLE 5

The following detergent compositions were prepared according to the present invention:

| | I | II |
|---|---|---|
| Base granule | | |
| Zeolite A | 22.0 | 10.0 |
| Sulfate | 5.0 | 7.0 |
| MA/AA | — | — |
| AA | 1.6 | — |
| MA/AA 1 | 12.0 | 6.0 |
| LAS | 10.0 | 20.0 |
| C45AS | 7.0 | 7.0 |
| C45AES | 1.0 | — |
| Silicate | 1.0 | 10.0 |
| Soap | 2.0 | — |
| Brightener 1 | 0.2 | 0.2 |
| Carbonate | 9.0 | 10.0 |
| PEG 4000 | 1.0 | — |
| DTPA | 0.4 | — |
| Spray On | | |
| C25E9 | — | 5.0 |
| C45E7 | 1.0 | — |
| C23E9 | 1.0 | — |
| Perfume | 0.3 | — |
| Dry additives | | |
| Carbonate | 10.0 | 8.0 |
| PVPVI/PVNO | — | — |
| Mannanase | 0.001 | 0.02 |
| Protease | 0.03 | 0.02 |
| Lipase | — | 0.008 |
| Amylase | — | 0.002 |
| Cellulase | 0.0005 | 0.0002 |
| NOBS | 4.0 | 4.5 |
| PB1 | 5.0 | 6.0 |
| Sulfate | 5.0 | 5.0 |
| SRP 1 | 0.4 | — |
| Suds suppressor | 0.5 | — |
| Miscellaneous and minors | Up to 100% | |

EXAMPLE 6

The following detergent compositions were prepared according to the present invention:

| | I | II |
|---|---|---|
| LAS | 18.0 | 14.0 |
| QAS | 0.7 | 1.0 |
| TFAA | — | 1.0 |
| C23E56.5 | — | — |
| C45E7 | — | 1.0 |
| C45E3S | 1.0 | 2.5 |
| STPP | 32.0 | 18.0 |
| Silicate | 9.0 | 5.0 |
| Carbonate | 11.0 | 7.5 |
| Bicarbonate | — | 7.5 |
| PB1 | 3.0 | 1.0 |
| PB4 | — | 1.0 |
| NOBS | 2.0 | 1.0 |
| DETPMP | — | 1.0 |
| DTPA | 0.5 | — |
| SRP 1 | 0.3 | 0.2 |
| MA/AA | 1.0 | 1.5 |
| CMC | 0.8 | 0.4 |
| Sulfate | 20.0 | 10.0 |
| Mg sulfate | 0.2 | — |
| Mannanase | 0.001 | 0.02 |
| Protease | 0.03 | 0.03 |

-continued

| | I | II |
|---|---|---|
| Amylase | 0.008 | 0.007 |
| Lipase | 0.004 | — |
| Cellulase | 0.0003 | — |
| Photoactivated bleach | 30 ppm | 20 ppm |
| Perfume | 0.3 | 0.3 |
| Brightener 1/2 | 0.05 | 0.02 |
| Miscellaneous and minors | up to 100% | |

EXAMPLE 7

The following compact high density (0.96 Kg/l) dishwashing detergent compositions were prepared according to the present invention:

| | I | II | III | IV |
|---|---|---|---|---|
| STPP | — | — | — | 50.9 |
| Citrate | 35.0 | 17.0 | 46.1 | — |
| Carbonate | — | 17.5 | — | 32.1 |
| Bicarbonate | — | — | 25.4 | — |
| Silicate | 32.0 | 14.8 | 1.0 | 3.1 |
| Metasilicate | — | 2.5 | — | — |
| PB1 | 1.9 | 9.7 | — | — |
| PB4 | 8.6 | — | — | — |
| Percarbonate | — | — | 6.7 | 4.8 |
| Nonionic | 1.5 | 2.0 | 2.6 | 5.3 |
| NOBS | 5.2 | 2.4 | 2.2 | 1.4 |
| HEDP | — | 1.0 | — | — |
| DETPMP | — | 0.6 | — | — |
| Paraffin | 0.5 | 0.5 | 0.6 | — |
| Mannanase | 0.001 | 0.001 | 0.002 | 0.02 |
| Protease | 0.072 | 0.072 | 0.026 | 0.06 |
| Amylase | 0.012 | 0.012 | 0.009 | 0.03 |
| Lipase | — | 0.001 | — | — |
| BTA | 0.3 | 0.3 | — | 0.3 |
| MA/AA | — | — | — | — |
| 480N | 3.3 | 6.0 | — | 0.9 |
| Perfume | 0.2 | 0.2 | 0.2 | 0.1 |
| Sulphate | 7.0 | 20.0 | 12.0 | — |
| pH | 10.8 | 11.0 | 9.6 | 10.9 |
| Miscellaneous and water | | Up to 100% | | |

EXAMPLE 8

The following granular dishwashing detergent compositions of bulk density 1.02 Kg/L were prepared according to the present invention:

| | I | II | III | IV | V | VI | VII | VII |
|---|---|---|---|---|---|---|---|---|
| STPP | 30.0 | 30.0 | 33.0 | 34.2 | 29.6 | 31.1 | 26.6 | 17.6 |
| Carbonate | 30.5 | 30.5 | 31.0 | 30.0 | 23.0 | 39.4 | 4.2 | 45.0 |
| Silicate | 7.4 | 7.4 | 7.5 | 7.2 | 13.3 | 3.4 | 43.7 | 12.4 |
| Metasilicate | — | — | 4.5 | 5.1 | — | — | — | — |
| Percarbonate | — | — | — | — | — | 4.0 | — | — |
| PB1 | 4.4 | 4.2 | 4.5 | 4.5 | — | — | — | — |
| NADCC | — | — | — | — | 2.0 | — | 1.6 | 1.0 |
| Nonionic | 1.2 | 1.0 | 0.7 | 0.8 | 1.9 | 0.7 | 0.6 | 0.3 |
| NOBS | 1.0 | 0.7 | 0.7 | 0.7 | — | 0.8 | 1.0 | 1.0 |
| PAAC | — | 0.004 | 0.004 | 0.004 | — | — | — | — |
| BzP | — | — | — | 1.4 | — | — | — | — |
| Paraffin | 0.25 | 0.25 | 0.25 | 0.25 | — | — | — | — |
| Mannanase | 0.002 | 0.002 | 0.001 | .0005 | .0001 | 0.002 | 0.002 | .0001 |
| Protease | 0.036 | 0.015 | 0.03 | 0.028 | — | 0.03 | — | — |
| Amylase | 0.003 | 0.003 | 0.01 | 0.006 | — | 0.01 | — | — |
| Lipase | 0.005 | — | 0.001 | — | — | — | — | — |
| BTA | 0.15 | 0.15 | 0.15 | 0.15 | — | — | — | — |
| Perfume | 0.2 | 0.2 | 0.2 | 0.2 | 0.1 | 0.2 | 0.2 | — |
| Sulphate | 23.4 | 25.0 | 22.0 | 18.5 | 30.1 | 19.3 | 23.1 | 23.6 |
| pH | 10.8 | 10.8 | 11.3 | 11.3 | 10.7 | 11.5 | 12.7 | 10.9 |
| Miscellaneous and water | | | | Up to 100% | | | | |

EXAMPLE 9

The following tablet detergent compositions were prepared according to the present invention by compression of a granular dishwashing detergent composition at a pressure of $13KN/cm^2$ using a standard 12 head rotary press:

| | I | II | III | IV | V | VI |
|---|---|---|---|---|---|---|
| STPP | — | 48.8 | 49.2 | 38.0 | — | 46.8 |
| Citrate | 26.4 | — | — | — | 31.1 | — |
| Carbonate | — | 5.0 | 14.0 | 15.4 | 14.4 | 23.0 |
| Silicate | 26.4 | 14.8 | 15.0 | 12.6 | 17.7 | 2.4 |

-continued

| | I | II | III | IV | V | VI |
|---|---|---|---|---|---|---|
| Mannanase | 0.001 | 0.001 | 0.001 | 0.02 | 0.002 | 0.01 |
| Protease | 0.058 | 0.072 | 0.041 | 0.033 | 0.052 | 0.013 |
| Amylase | 0.01 | 0.03 | 0.012 | 0.007 | 0.016 | 0.002 |
| Lipase | 0.005 | — | — | — | — | — |
| PB1 | 1.6 | 7.7 | 12.2 | 10.6 | 15.7 | — |
| PB4 | 6.9 | — | — | — | — | 14.4 |
| Nonionic | 1.5 | 2.0 | 1.5 | 1.65 | 0.8 | 6.3 |
| PAAC | — | — | 0.02 | 0.009 | — | — |
| MnTACN | — | — | — | — | 0.007 | — |
| NOBS | 4.3 | 2.5 | 1.0 | 1.0 | 1.3 | 1.8 |
| HEDP | 0.7 | — | — | 0.7 | — | 0.4 |
| DETPMP | 0.65 | — | — | — | — | — |
| Paraffin | 0.4 | 0.5 | 0.5 | 0.55 | — | — |
| BTA | 0.2 | 0.3 | 0.3 | 0.3 | — | — |
| PA30 | 3.2 | — | — | — | — | — |
| MA/AA | — | — | — | — | 4.5 | 0.55 |
| Perfume | — | — | 0.05 | 0.05 | 0.2 | 0.2 |
| Sulphate | 24.0 | 13.0 | 2.3 | — | 10.7 | 3.4 |
| Weight of tablet | 25 g | 25 g | 20 g | 30 g | 18 g | 20 g |
| pH | 10.6 | 10.6 | 10.7 | 10.7 | 10.9 | 11.2 |
| Miscellaneous and water | Up to 100% | | | | | |

EXAMPLE 10

The following high density laundry detergent compositions were prepared according to the present invention:

| | I | II | III | IV | V | VI |
|---|---|---|---|---|---|---|
| LAS | 8.0 | 8.0 | 8.0 | 2.0 | 6.0 | 6.0 |
| TAS | — | 0.5 | — | 0.5 | 1.0 | 0.1 |
| C46(S)AS | 2.0 | 2.5 | — | — | — | — |
| C25AS | — | — | — | 7.0 | 4.5 | 5.5 |
| C68AS | 2.0 | 5.0 | 7.0 | — | — | — |
| C25E5 | — | — | 3.4 | 10.0 | 4.6 | 4.6 |
| C25E7 | 3.4 | 3.4 | 1.0 | — | — | — |
| C25E3S | — | — | — | 2.0 | 5.0 | 4.5 |
| QAS | — | 0.8 | — | — | — | — |
| QAS 1 | — | — | — | 0.8 | 0.5 | 1.0 |
| Zeolite A | 18.1 | 18.0 | 14.1 | 18.1 | 20.0 | 18.1 |
| Citric | — | — | — | 2.5 | — | 2.5 |
| Carbonate | 13.0 | 13.0 | 27.0 | 5.0 | 10.0 | 13.0 |
| Na-SKS-6 | — | — | — | 10.0 | — | 10.0 |
| Silicate | 1.4 | 1.4 | 3.0 | 0.3 | 0.5 | 0.3 |
| Citrate | — | 1.0 | — | 3.0 | — | — |
| Sulfate | 26.1 | 26.1 | 26.1 | 6.0 | — | — |
| Mg sulfate | 0.3 | — | — | 0.2 | — | 0.2 |
| MA/AA | 0.3 | 0.3 | 0.3 | 4.0 | 1.0 | 1.0 |
| CMC | 0.2 | 0.2 | 0.2 | 0.2 | 0.4 | 0.4 |
| Mannanase | 0.001 | 0.002 | 0.05 | 0.001 | 0.002 | 0.003 |
| Percarbonate | 9.0 | 9.0 | 5.0 | 5.0 | 18.0 | 18.0 |
| TAED | 1.5 | 0.4 | 1.5 | — | 3.9 | 4.2 |
| NACA-OBS | — | 2.0 | 1.0 | — | — | — |
| DETPMP | 0.25 | 0.25 | 0.25 | 0.25 | — | — |
| SRP 1 | — | — | — | 0.2 | — | 0.2 |
| EDDS | — | 0.25 | 0.4 | — | 0.5 | 0.5 |
| CFAA | — | 1.0 | — | 2.0 | — | — |
| HEDP | 0.3 | 0.3 | 0.3 | 0.3 | 0.4 | 0.4 |
| QEA | — | — | — | 0.2 | — | 0.5 |
| Protease | 0.009 | 0.009 | 0.01 | 0.04 | 0.05 | 0.03 |
| Amylase | 0.002 | 0.002 | 0.002 | 0.006 | 0.008 | 0.008 |
| Cellulase | 0.0007 | — | — | 0.0007 | 0.0007 | 0.0007 |
| Lipase | 0.006 | — | — | 0.01 | 0.01 | 0.01 |
| Photoactivated bleach (ppm) | 15 | 15 | 15 | — | 20 | 20 |
| PVNO/PVPVI | — | — | — | 0.1 | — | — |
| Brightener 1 | 0.09 | 0.09 | 0.09 | — | 0.09 | 0.09 |
| Perfume | 0.3 | 0.3 | 0.3 | 0.4 | 0.4 | 0.4 |
| Silicone antifoam | 0.5 | 0.5 | 0.5 | — | 0.3 | 0.3 |
| Density in g/liter | 850 | 850 | 850 | 850 | 850 | 850 |
| Miscellaneous and minors | Up to 100% | | | | | |

EXAMPLE 11

The following granular laundry detergent compositions of particular utility under European machine wash conditions were prepared according to the present invention:

| | I | II | III | IV | V | VI |
|---|---|---|---|---|---|---|
| LAS | 5.5 | 7.5 | 5.0 | 5.0 | 6.0 | 7.0 |
| TAS | 1.25 | 1.9 | — | 0.8 | 0.4 | 0.3 |
| C24AS/C25AS | — | 2.2 | 5.0 | 5.0 | 5.0 | 2.2 |
| C25E3S | — | 0.8 | 1.0 | 1.5 | 3.0 | 1.0 |
| C45E7 | 3.25 | — | — | — | — | 3.0 |
| TFAA | — | — | 2.0 | — | — | — |
| C25E5 | — | 5.5 | — | — | — | — |
| QAS | 0.8 | — | — | — | — | — |
| QAS 1 | — | 0.7 | 1.0 | 0.5 | 1.0 | 0.7 |
| STPP | 19.7 | — | — | — | — | — |
| Zeolite A | — | 19.5 | 20.0 | 14.5 | 20.0 | 17.0 |
| NaSKS-6/citric acid (79:21) | — | 10.6 | — | 10.6 | — | — |
| Na-SKS-6 | — | — | 9.0 | — | 10.0 | 10.0 |
| Carbonate | 6.1 | 21.4 | 9.0 | 10.0 | 10.0 | 18.0 |
| Bicarbonate | — | 2.0 | 7.0 | 5.0 | — | 2.0 |
| Silicate | 6.8 | — | — | 0.3 | 0.5 | — |
| Citrate | — | — | 4.0 | 4.0 | — | — |
| Sulfate | 39.8 | — | — | 5.0 | — | 12.0 |
| Mg sulfate | — | — | 0.1 | 0.2 | 0.2 | — |
| MA/AA | 0.5 | 1.6 | 3.0 | 4.0 | 1.0 | 1.0 |
| CMC | 0.2 | 0.4 | 1.0 | 1.0 | 0.4 | 0.4 |
| Mannanase | 0.001 | 0.002 | 0.02 | 0.001 | 0.002 | 0.02 |
| Percarbonate | 5.0 | 12.7 | 5.0 | 5.0 | 18.0 | 15.0 |
| TAED | 0.5 | 3.1 | — | — | 5.0 | — |
| NACA-OBS | 1.0 | 3.5 | — | — | — | 2.5 |
| DETPMP | 0.25 | 0.2 | 0.3 | 0.4 | — | 0.2 |
| HEDP | — | 0.3 | — | 0.3 | 0.3 | 0.3 |
| QEA | — | — | 1.0 | 1.0 | 1.0 | — |
| Protease | 0.009 | 0.03 | 0.03 | 0.05 | 0.05 | 0.02 |
| Lipase | 0.003 | 0.003 | 0.006 | 0.006 | 0.006 | 0.004 |
| Cellulase | 0.0006 | 0.0006 | 0.0005 | 0.0005 | 0.0007 | 0.0007 |
| Amylase | 0.002 | 0.002 | 0.006 | 0.006 | 0.01 | 0.003 |
| PVNO/PVPVI | — | — | 0.2 | 0.2 | — | — |
| PVP | 0.9 | 1.3 | — | — | — | 0.9 |
| SRP 1 | — | — | 0.2 | 0.2 | 0.2 | — |
| Photoactivated bleach (ppm) | 15 | 27 | — | — | 20 | 20 |
| Photoactivated bleach 1 (ppm) | 15 | — | — | — | — | — |
| Brightener 1 | 0.08 | 0.2 | — | — | 0.09 | 0.15 |
| Brightener 2 | — | 0.04 | — | — | — | — |
| Perfume | 0.3 | 0.5 | 0.4 | 0.3 | 0.4 | 0.3 |
| Silicone antifoam | 0.5 | 2.4 | 0.3 | 0.5 | 0.3 | 2.0 |
| Density in g/liter | 750 | 750 | 750 | 750 | 750 | 750 |
| Miscellaneous and minors | Up to 100% | | | | | |

EXAMPLE 12

The following detergent compositions of particular utility under European machine wash conditions were prepared according to the present invention:

| | I | II | III | IV |
|---|---|---|---|---|
| Blown Powder | | | | |
| LAS | 6.0 | 5.0 | 11.0 | 6.0 |
| TAS | 2.0 | — | — | 2.0 |
| Zeolite A | 24.0 | — | — | 20.0 |
| STPP | — | 27.0 | 24.0 | — |
| Sulfate | 4.0 | 6.0 | 13.0 | — |
| MA/AA | 1.0 | 4.0 | 6.0 | 2.0 |
| Silicate | 1.0 | 7.0 | 3.0 | 3.0 |
| CMC | 1.0 | 1.0 | 0.5 | 0.6 |
| Brightener 1 | 0.2 | 0.2 | 0.2 | 0.2 |
| Silicone antifoam | 1.0 | 1.0 | 1.0 | 0.3 |
| DETPMP | 0.4 | 0.4 | 0.2 | 0.4 |
| Spray On | | | | |
| Brightener | 0.02 | — | — | 0.02 |
| C45E7 | — | — | — | 5.0 |
| C45E2 | 2.5 | 2.5 | 2.0 | — |
| C45E3 | 2.6 | 2.5 | 2.0 | — |
| Perfume | 0.5 | 0.3 | 0.5 | 0.2 |
| Silicone antifoam | 0.3 | 0.3 | 0.3 | — |
| Dry additives | | | | |
| QEA | — | — | — | 1.0 |
| EDDS | 0.3 | — | — | — |
| Sulfate | 2.0 | 3.0 | 5.0 | 10.0 |
| Carbonate | 6.0 | 13.0 | 15.0 | 14.0 |
| Citric | 2.5 | — | — | 2.0 |
| QAS 1 | 0.5 | — | — | 0.5 |
| Na-SKS-6 | 10.0 | — | — | — |
| Percarbonate | 18.5 | 18.0 | 10.0 | 21.5 |
| Mannanase | 0.001 | 0.002 | 0.02 | 0.02 |
| TAED | 2.0 | 2.0 | — | 2.0 |
| NACA-OBS | 3.0 | 2.0 | 4.0 | — |
| Protease | 0.03 | 0.03 | 0.03 | 0.03 |
| Lipase | 0.008 | 0.008 | 0.008 | 0.004 |
| Amylase | 0.003 | 0.003 | 0.003 | 0.006 |
| Brightener 1 | 0.05 | — | — | 0.05 |
| Miscellaneous and minors | | Up to 100% | | |

EXAMPLE 13

The following granular detergent compositions were prepared according to the present invention:

| | I | II | III | IV | V | VI |
|---|---|---|---|---|---|---|
| Blown Powder | | | | | | |
| LAS | 23.0 | 8.0 | 7.0 | 9.0 | 7.0 | 7.0 |
| TAS | — | — | — | — | 1.0 | — |
| C45AS | 6.0 | 6.0 | 5.0 | 8.0 | — | — |
| C45AES | — | 1.0 | 1.0 | 1.0 | — | — |
| C45E35 | — | — | — | — | 2.0 | — |
| Zeolite A | 10.0 | 18.0 | 14.0 | 12.0 | 10.0 | 10.0 |
| MA/AA | — | 0.5 | — | — | — | 2.0 |
| MA/AA 1 | 7.0 | — | — | — | — | — |
| AA | — | 3.0 | 3.0 | 2.0 | 3.0 | 3.0 |
| Sulfate | 5.0 | 6.3 | 14.3 | 11.0 | 15.0 | 19.3 |
| Silicate | 10.0 | 1.0 | 1.0 | 1.0 | 1.0 | 1.0 |
| Carbonate | 15.0 | 20.0 | 10.0 | 20.7 | 8.0 | 6.0 |
| PEG 4000 | 0.4 | 1.5 | 1.5 | 1.0 | 1.0 | 1.0 |
| DTPA | — | 0.9 | 0.5 | — | — | 0.5 |
| Brightener 2 | 0.3 | 0.2 | 0.3 | — | 0.1 | 0.3 |
| Spray On | | | | | | |
| C45E7 | — | 2.0 | — | — | 2.0 | 2.0 |
| C25E9 | 3.0 | — | — | — | — | — |
| C23E9 | — | — | 1.5 | 2.0 | — | 2.0 |
| Perfume | 0.3 | 0.3 | 0.3 | 2.0 | 0.3 | 0.3 |

-continued

| | I | II | III | IV | V | VI |
|---|---|---|---|---|---|---|
| Agglomerates | | | | | | |
| C45AS | — | 5.0 | 5.0 | 2.0 | — | 5.0 |
| LAS | — | 2.0 | 2.0 | — | — | 2.0 |
| Zeolite A | — | 7.5 | 7.5 | 8.0 | — | 7.5 |
| Carbonate | — | 4.0 | 4.0 | 5.0 | — | 4.0 |
| PEG 4000 | — | 0.5 | 0.5 | — | — | 0.5 |
| Misc (Water etc.) | — | 2.0 | 2.0 | 2.0 | — | 2.0 |
| Dry additives | | | | | | |
| QAS | — | — | — | — | 1.0 | — |
| Citric | — | — | — | — | 2.0 | — |
| Mannanase | 0.001 | 0.02 | 0.001 | 0.02 | 0.001 | 0.01 |
| Percarbonate | 4.0 | 1.0 | 3.0 | 2.0 | 14.0 | 11.0 |
| Carbonate | — | 5.3 | 1.8 | — | 4.0 | 4.0 |
| NOBS | 4.0 | — | 6.0 | — | — | 0.6 |
| Methyl cellulose | 0.2 | — | — | — | — | — |
| Na-SKS-6 | 8.0 | — | — | — | — | — |
| STS | — | — | 2.0 | — | 1.0 | — |
| Culmene sulfonic acid | — | 1.0 | — | — | — | 2.0 |
| Protease | 0.02 | 0.02 | 0.02 | 0.01 | 0.02 | 0.02 |
| Lipase | 0.004 | — | 0.004 | — | 0.004 | 0.008 |
| Amylase | 0.003 | — | 0.002 | — | 0.003 | — |
| Cellulase | 0.0005 | 0.0005 | 0.0005 | 0.0007 | 0.0005 | 0.0005 |
| PVPVI | — | — | — | — | 0.5 | 0.1 |
| PVP | — | — | — | — | 0.5 | — |
| PVNO | — | — | 0.5 | 0.3 | — | — |
| QEA | — | — | — | — | 1.0 | — |
| SRP 1 | 0.2 | 0.5 | 0.3 | — | 0.2 | — |
| Silicone antifoam | 0.2 | 0.4 | 0.2 | 0.4 | 0.1 | — |
| Mg sulfate | — | — | 0.2 | — | 0.2 | — |
| Miscellaneous and minors | | | Up to 100% | | | |

EXAMPLE 14

The following detergent compositions were prepared according to the present invention:

| | I | II | III | IV |
|---|---|---|---|---|
| Base granule | | | | |
| Zeolite A | 30.0 | 22.0 | 24.0 | 10.0 |
| Sulfate | 10.0 | 5.0 | 10.0 | 7.0 |
| MA/AA | 3.0 | — | — | — |
| AA | — | 1.6 | 2.0 | — |
| MA/AA 1 | — | 12.0 | — | 6.0 |
| LAS | 14.0 | 10.0 | 9.0 | 20.0 |
| C45AS | 8.0 | 7.0 | 9.0 | 7.0 |
| C45AES | — | 1.0 | 1.0 | — |
| Silicate | — | 1.0 | 0.5 | 10.0 |
| Soap | — | 2.0 | — | — |
| Brightener 1 | 0.2 | 0.2 | 0.2 | 0.2 |
| Carbonate | 6.0 | 9.0 | 10.0 | 10.0 |
| PEG 4000 | — | 1.0 | 1.5 | — |
| DTPA | — | 0.4 | — | — |
| Spray On | | | | |
| C25E9 | — | — | — | 5.0 |
| C45E7 | 1.0 | 1.0 | — | — |
| C23E9 | — | 1.0 | 2.5 | — |
| Perfume | 0.2 | 0.3 | 0.3 | — |
| Dry additives | | | | |
| Carbonate | 5.0 | 10.0 | 18.0 | 8.0 |
| PVPVI/PVNO | 0.5 | — | 0.3 | — |
| Mannanase | 0.001 | 0.001 | 0.02 | 0.02 |

-continued

| | I | II | III | IV |
|---|---|---|---|---|
| Protease | 0.03 | 0.03 | 0.03 | 0.02 |
| Lipase | 0.008 | — | — | 0.008 |
| Amylase | 0.002 | — | — | 0.002 |
| Cellulase | 0.0002 | 0.0005 | 0.0005 | 0.0002 |
| NOBS | — | 4.0 | — | 4.5 |
| Percarbonate | 1.0 | 5.0 | 1.5 | 6.0 |
| Sulfate | 4.0 | 5.0 | — | 5.0 |
| SRP 1 | — | 0.4 | — | — |
| Suds suppressor | — | 0.5 | 0.5 | — |
| Miscellaneous and minors | | Up to 100% | | |

EXAMPLE 15

The following granular detergent compositions were prepared according to the present invention:

| | I | II | III |
|---|---|---|---|
| Blown Powder | | | |
| Zeolite A | 20.0 | — | 15.0 |
| STPP | — | 20.0 | — |
| Sulfate | — | — | 5.0 |
| Carbonate | — | — | 5.0 |
| TAS | — | — | 1.0 |
| LAS | 6.0 | 6.0 | 6.0 |
| C68AS | 2.0 | 2.0 | — |
| Silicate | 3.0 | 8.0 | — |
| MA/AA | 4.0 | 2.0 | 2.0 |
| CMC | 0.6 | 0.6 | 0.2 |
| Brightener 1 | 0.2 | 0.2 | 0.1 |
| DETPMP | 0.4 | 0.4 | 0.1 |
| STS | — | — | 1.0 |
| Spray On | | | |
| C45E7 | 5.0 | 5.0 | 4.0 |
| Silicone antifoam | 0.3 | 0.3 | 0.1 |
| Perfume | 0.2 | 0.2 | 0.3 |
| Dry additives | | | |
| QEA | — | — | 1.0 |
| Carbonate | 14.0 | 9.0 | 10.0 |
| Percarbonate | 20.0 | 15.0 | 13.0 |
| TAED | 2.0 | 2.0 | 2.0 |
| QAS | — | — | 1.0 |
| Photoactivated bleach | 15 ppm | 15 ppm | 15 ppm |
| Na-SKS-6 | — | — | 3.0 |
| Mannanase | 0.001 | 0.02 | 0.0015 |
| Protease | 0.03 | 0.03 | 0.007 |
| Lipase | 0.004 | 0.004 | 0.004 |
| Amylase | 0.006 | 0.006 | 0.003 |
| Cellulase | 0.0002 | 0.0002 | 0.0005 |
| Sulfate | 10.0 | 20.0 | 5.0 |
| Density (g/liter) | 700 | 700 | 700 |
| Miscellaneous and minors | | Up to 100% | |

EXAMPLE 16

The following detergent compositions were prepared according to the present invention:

| | I | II | III |
|---|---|---|---|
| Blown Powder | | | |
| Zeolite A | 15.0 | 15.0 | 15.0 |
| Sulfate | — | 5.0 | — |

-continued

| | I | II | III |
|---|---|---|---|
| LAS | 3.0 | 3.0 | 3.0 |
| QAS | — | 1.5 | 1.5 |
| DETPMP | 0.4 | 0.2 | 0.4 |
| EDDS | — | 0.4 | 0.2 |
| CMC | 0.4 | 0.4 | 0.4 |
| MA/AA | 4.0 | 2.0 | 2.0 |
| Agglomerate | | | |
| LAS | 5.0 | 5.0 | 5.0 |
| TAS | 2.0 | 2.0 | 1.0 |
| Silicate | 3.0 | 3.0 | 4.0 |
| Zeolite A | 8.0 | 8.0 | 8.0 |
| Carbonate | 8.0 | 8.0 | 4.0 |
| Spray On | | | |
| Perfume | 0.3 | 0.3 | 0.3 |
| C45E7 | 2.0 | 2.0 | 2.0 |
| C25E3 | 2.0 | — | — |
| Dry Additives | | | |
| Citrate | 5.0 | — | 2.0 |
| Bicarbonate | — | 3.0 | — |
| Carbonate | 8.0 | 15.0 | 10.0 |
| TAED | 6.0 | 2.0 | 5.0 |
| Percarbonate | 14.0 | 7.0 | 10.0 |
| PEO | — | — | 0.2 |
| Bentonite clay | — | — | 10.0 |
| Mannanase | 0.001 | 0.02 | 0.01 |
| Protease | 0.03 | 0.03 | 0.03 |
| Lipase | 0.008 | 0.008 | 0.008 |
| Cellulase | 0.001 | 0.001 | 0.001 |
| Amylase | 0.01 | 0.01 | 0.01 |
| Silicone antifoam | 5.0 | 5.0 | 5.0 |
| Sulfate | — | 3.0 | — |
| Density (g/liter) | 850 | 850 | 850 |
| Miscellaneous and minors | | Up to 100% | |

EXAMPLE 17

The following detergent compositions were prepared according to the present invention:

| | I | II | III | IV |
|---|---|---|---|---|
| LAS | 18.0 | 14.0 | 24.0 | 20.0 |
| QAS | 0.7 | 1.0 | — | 0.7 |
| TFAA | — | 1.0 | — | — |
| C23E56.5 | — | — | 1.0 | — |
| C45E7 | — | 1.0 | — | — |
| C45E3S | 1.0 | 2.5 | 1.0 | — |
| STPP | 32.0 | 18.0 | 28.0 | 20.0 |
| Silicate | 9.0 | 5.0 | 9.0 | 8.0 |
| Carbonate | 11.0 | 7.5 | 10.0 | 5.0 |
| Bicarbonate | — | 7.5 | — | — |
| Percarbonate | 3.0 | 2.0 | 2.0 | 2.0 |
| NOBS | 2.0 | 1.0 | — | — |
| DETPMP | — | 1.0 | — | — |
| DTPA | 0.5 | — | 0.2 | 0.3 |
| SRP 1 | 0.3 | 0.2 | — | 0.1 |
| MA/AA | 1.0 | 1.5 | 2.0 | 0.5 |
| CMC | 0.8 | 0.4 | 0.4 | 0.2 |
| PEI | — | — | 0.4 | — |
| Sulfate | 20.0 | 10.0 | 20.0 | 30.0 |
| Mg sulfate | 0.2 | — | 0.4 | 0.9 |
| Mannanase | 0.001 | 0.001 | 0.02 | 0.03 |
| Protease | 0.03 | 0.03 | 0.02 | 0.02 |
| Amylase | 0.008 | 0.007 | — | 0.004 |

-continued

| | I | II | III | IV |
|---|---|---|---|---|
| Lipase | 0.004 | — | 0.002 | — |
| Cellulase | 0.0003 | — | — | 0.0001 |
| Photoactivated bleach | 30 ppm | 20 ppm | — | 10 ppm |
| Perfume | 0.3 | 0.3 | 0.1 | 0.2 |
| Brightener 1/2 | 0.05 | 0.02 | 0.08 | 0.1 |
| Miscellaneous and minors | | up to 100% | | |

EXAMPLE 18

The following granular fabric detergent compositions which provide "softening through the wash" capability were prepared according to the present invention:

| | I | II |
|---|---|---|
| C45AS | — | 10.0 |
| LAS | 7.6 | — |
| C68AS | 1.3 | — |
| C45E7 | 4.0 | — |
| C25E3 | — | 5.0 |
| Coco-alkyl-dimethyl hydroxy-ethyl ammonium chloride | 1.4 | 1.0 |
| Citrate | 5.0 | 3.0 |
| Na-SKS-6 | — | 11.0 |
| Zeolite A | 15.0 | 15.0 |
| MA/AA | 4.0 | 4.0 |
| DETPMP | 0.4 | 0.4 |
| Percarbonate | 15.0 | 15.0 |
| TAED | 5.0 | 5.0 |
| Smectite clay | 10.0 | 10.0 |
| HMWPEO | — | 0.1 |
| Mannanase | 0.001 | 0.02 |
| Protease | 0.02 | 0.01 |
| Lipase | 0.02 | 0.01 |

-continued

| | I | II |
|---|---|---|
| Amylase | 0.03 | 0.005 |
| Cellulase | 0.001 | — |
| Silicate | 3.0 | 5.0 |
| Carbonate | 10.0 | 10.0 |
| Suds suppressor | 1.0 | 4.0 |
| CMC | 0.2 | 0.1 |
| Miscellaneous and minors | Up to 100% | |

EXAMPLE 19

The following detergent additive compositions were prepared according to the present invention:

| | I | II |
|---|---|---|
| LAS | — | 5.0 |
| STPP | 30.0 | — |
| Zeolite A | — | 35.0 |
| Percarbonate | 20.0 | 15.0 |
| TAED | 10.0 | 8.0 |
| Mannanase | 0.001 | 0.02 |
| Protease | — | 0.3 |
| Amylase | — | 0.06 |
| Minors, water and miscellaneous | | Up to 100% |

EXAMPLE 20

The following compact high density (0.96 Kg/l) dishwashing detergent compositions were prepared according to the present invention:

| | I | II | III | IV | V | VI | VII | VIII |
|---|---|---|---|---|---|---|---|---|
| STPP | — | — | 54.3 | 51.4 | 51.4 | — | — | 50.9 |
| Citrate | 35.0 | 17.0 | — | — | — | 46.1 | 40.2 | — |
| Carbonate | — | 17.5 | 14.0 | 14.0 | 14.0 | — | 8.0 | 32.1 |
| Bicarbonate | — | — | — | — | — | 25.4 | — | — |
| Silicate | 32.0 | 14.8 | 14.8 | 10.0 | 10.0 | 1.0 | 25.0 | 3.1 |
| Metasilicate | — | 2.5 | — | 9.0 | 9.0 | — | — | — |
| Percarbonate | 10.5 | 9.7 | 7.8 | 7.8 | 7.8 | 6.7 | 11.8 | 4.8 |
| Nonionic | 1.5 | 2.0 | 1.5 | 1.7 | 1.5 | 2.6 | 1.9 | 5.3 |
| TAED | 5.2 | 2.4 | — | — | — | 2.2 | — | 1.4 |
| HEDP | — | 1.0 | — | — | — | — | — | — |
| DETPMP | — | 0.6 | — | — | — | — | — | — |
| MnTACN | — | — | — | — | — | — | 0.008 | — |
| PAAC | — | — | 0.008 | 0.01 | 0.007 | — | — | — |
| BzP | — | — | — | — | 1.4 | — | — | — |
| Paraffin | 0.5 | 0.5 | 0.5 | 0.5 | 0.5 | 0.6 | — | — |
| Mannanase | 0.001 | 0.02 | 0.015 | 0.02 | 0.001 | 0.001 | 0.02 | 0.02 |
| Protease | 0.072 | 0.072 | 0.029 | 0.053 | 0.046 | 0.026 | 0.059 | 0.06 |
| Amylase | 0.012 | 0.012 | 0.006 | 0.012 | 0.013 | 0.009 | 0.017 | 0.03 |
| Lipase | — | 0.001 | — | 0.005 | — | — | — | — |
| BTA | 0.3 | 0.3 | 0.3 | 0.3 | 0.3 | — | 0.3 | 0.3 |
| MA/AA | — | — | — | — | — | — | 4.2 | — |
| 480N | 3.3 | 6.0 | — | — | — | — | — | 0.9 |
| Perfume | 0.2 | 0.2 | 0.2 | 0.2 | 0.2 | 0.2 | 0.1 | 0.1 |
| Sulphate | 7.0 | 20.0 | 5.0 | 2.2 | 0.8 | 12.0 | 4.6 | — |
| pH | 10.8 | 11.0 | 10.8 | 11.3 | 11.3 | 9.6 | 10.8 | 10.9 |
| Miscellaneous and water | | | | Up to 100% | | | | |

EXAMPLE 21

The following granular dishwashing detergent compositions of bulk density 1.02 Kg/L were prepared according to the present invention:

| | I | II | III | IV | V |
|---|---|---|---|---|---|
| STPP | 30.0 | 30.0 | 33.0 | 34.2 | 31.1 |
| Carbonate | 30.5 | 30.5 | 31.0 | 30.0 | 39.4 |
| Silicate | 7.4 | 7.4 | 7.5 | 7.2 | 3.4 |
| Metasilicate | — | — | 4.5 | 5.1 | — |
| Percarbonate | 4.4 | 4.2 | 4.5 | 4.5 | 4.0 |
| NADCC | — | — | — | — | — |
| Nonionic | 1.2 | 1.0 | 0.7 | 0.8 | 0.7 |
| TAED | 1.0 | — | — | — | 0.8 |
| PAAC | — | 0.004 | 0.004 | 0.004 | — |
| BzP | — | — | — | 1.4 | — |
| Paraffin | 0.25 | 0.25 | 0.25 | 0.25 | — |
| Mannanase | 0.01 | 0.001 | 0.02 | 0.001 | 0.001 |
| Protease | 0.036 | 0.015 | 0.03 | 0.028 | 0.03 |
| Amylase | 0.003 | 0.003 | 0.01 | 0.006 | 0.01 |
| Lipase | 0.005 | — | 0.001 | — | — |
| BTA | 0.15 | 0.15 | 0.15 | 0.15 | — |
| Perfume | 0.2 | 0.2 | 0.2 | 0.2 | 0.2 |
| Sulphate | 23.4 | 25.0 | 22.0 | 18.5 | 19.3 |
| pH | 10.8 | 10.8 | 11.3 | 11.3 | 11.5 |
| Miscellaneous and water | Up to 100% | | | | |

EXAMPLE 22

The following tablet detergent compositions were prepared according to the present invention by compression of a granular dishwashing detergent composition at a pressure of 13KN/cm$^2$ using a standard 12 head rotary press:

| | I | II | III | IV | V | VI |
|---|---|---|---|---|---|---|
| STPP | — | 48.8 | 49.2 | 38.0 | — | 46.8 |
| Citrate | 26.4 | — | — | — | 31.1 | — |
| Carbonate | — | 5.0 | 14.0 | 15.4 | 14.4 | 23.0 |
| Silicate | 26.4 | 14.8 | 15.0 | 12.6 | 17.7 | 2.4 |
| Mannanase | 0.001 | 0.02 | 0.001 | 0.002 | 0.03 | 0.002 |
| Protease | 0.058 | 0.072 | 0.041 | 0.033 | 0.052 | 0.013 |
| Amylase | 0.01 | 0.03 | 0.012 | 0.007 | 0.016 | 0.002 |
| Lipase | 0.005 | — | — | — | — | — |
| Percarbonate | 8.5 | 7.7 | 12.2 | 10.6 | 15.7 | 14.4 |
| Nonionic | 1.5 | 2.0 | 1.5 | 1.65 | 0.8 | 6.3 |
| PAAC | — | — | 0.02 | 0.009 | — | — |
| MnTACN | — | — | — | — | 0.007 | — |
| TAED | 4.3 | 2.5 | — | — | 1.3 | 1.8 |
| HEDP | 0.7 | — | — | 0.7 | — | 0.4 |
| DETPMP | 0.65 | — | — | — | — | — |
| Paraffin | 0.4 | 0.5 | 0.5 | 0.55 | — | — |
| BTA | 0.2 | 0.3 | 0.3 | 0.3 | — | — |

-continued

| | I | II | III | IV | V | VI |
|---|---|---|---|---|---|---|
| PA30 | 3.2 | — | — | — | — | — |
| MA/AA | — | — | — | — | 4.5 | 0.55 |
| Perfume | — | — | 0.05 | 0.05 | 0.2 | 0.2 |
| Sulphate | 24.0 | 13.0 | 2.3 | — | 10.7 | 3.4 |
| Weight of tablet | 25 g | 25 g | 20 g | 30 g | 18 g | 20 g |
| pH | 10.6 | 10.6 | 10.7 | 10.7 | 10.9 | 11.2 |
| Miscellaneous and water | Up to 100% | | | | | |

While particular embodiments of the subject invention have been described, it will be obvious to those skilled in the art that various changes and modifications of the subject invention can be made without departing from the spirit and scope of the invention. It is intended to cover, in the appended claims, all such modifications that are within the scope of the invention.

The compositions of the present invention can be suitably prepared by any process chosen by the formulator, non-limiting examples of which are described in U.S. Pat. No. 5,691,297 Nassano et al., issued Nov. 11, 1997; U.S. Pat. No. 5,574,005 Welch et al., issued Nov. 12, 1996; U.S. Pat. No. 5,569,645 Dinniwell et al., issued Oct. 29, 1996; U.S. Pat. No. 5,565,422 Del Greco et al., issued Oct. 15, 1996; U.S. Pat. No. 5,516,448 Capeci et al., issued May 14, 1996; U.S. Pat. No. 5,489,392 Capeci et al., issued Feb. 6, 1996; U.S. Pat. No. 5,486,303 Capeci et al., issued Jan. 23, 1996 all of which are incorporated herein by reference.

In addition to the above examples, the cleaning compositions of the present invention can be formulated into any suitable laundry detergent composition, non-limiting examples of which are described in U.S. Pat. No. 5,679,630 Baeck et al., issued Oct. 21, 1997; U.S. Pat. No. 5,565,145 Watson et al., issued Oct. 15, 1996; U.S. Pat. No. 5,478,489 Fredj et al., issued Dec. 26, 1995; U.S. Pat. No. 5,470,507 Fredj et al., issued Nov. 28, 1995; U.S. Pat. No. 5,466,802 Panandiker et al., issued Nov. 14, 1995; U.S. Pat. No. 5,460,752 Fredj et al., issued Oct. 24, 1995; U.S. Pat. No. 5,458,810 Fredj et al., issued Oct. 17, 1995; U.S. Pat. No. 5,458,809 Fredj et al., issued Oct. 17, 1995; U.S. Pat. No. 5,288,431 Huber et al., issued Feb. 22, 1994 all of which are incorporated herein by reference.

Having described the invention in detail with reference to preferred embodiments and the examples, it will be clear to those skilled in the art that various changes and modifications may be made without departing from the scope of the invention and the invention is not to be considered limited to what is described in the specification.

What is claimed is:

1. A detergent composition comprising a mannanase enzyme, and a bleach system comprising one or more of the following components: a hydrogen peroxide source and a hydrophobic bleach activator wherein said mannanase is present at a level of from 0.0001% to 2% pure enzyme by weight of total composition.

2. A detergent composition according to claim 1 wherein the hydrophobic bleach activator is comprised at a level of from 0.01 to 20% by weight of the total composition.

3. A detergent composition according to claim 1 wherein the source of hydrogen peroxide is selected from the group consisting of: perborate, percarbonate and mixtures thereof.

4. A detergent composition according to claim 1 wherein said hydrophobic bleach activator is selected from the group consisting of: nonanoyloxybenzene sulfonate, nonanoyl amino caproic oxybenzene sulfonate and mixtures thereof.

5. A detergent composition according to claim 1 further comprising a detergent ingredient selected from the group consisting of: a cationic surfactant, a chelant and mixtures thereof.

6. A method of cleaning a fabric with a detergent composition comprising contacting the fabric with the composition according to claim 1 to provide cleaning and whiteness performance benefits to the fabric.

7. A method of cleaning a dishware with a detergent composition comprising contacting the dishware with the composition according to claim 1 to provide cleaning and performance benefits to the dishware.

8. A detergent composition comprising a mannanase enzyme and a percarbonate.

9. A detergent composition according to claim 8 wherein said mannanase is present from 0.0001% to 2% pure enzyme by weight of total composition.

10. A detergent composition according to claim 8 wherein said percarbonate is present from 0.1% to 50% by weight of total composition.

11. A detergent composition according to claim 8 wherein the percarbonate has an average particle size of from 250 to 900 micrometers.

12. A detergent composition according to claim 8 further comprising a protease.

13. A detergent composition according to claim 12 wherein the protease is a protease from the IUPAC classification EC 3.4.

14. A detergent composition according to claim 13 wherein the protease is an Endo-serine protease from the IUPAC classification EC 3.4.21.

15. A detergent composition according to claim 14 wherein the protease is a Subtilisin protease from the IUPAC classification EC 3.4.21.62.

16. A method for removal stains and/or providing whiteness maintenance on an article in need of treatment comprising contacting the article with the detergent composition according to claim 8.

17. A method for removing mannans-containing cosmetic and/or food stains from an article in need of treatment comprising contacting the article with the detergent composition according to claim 8.

* * * * *